(12) United States Patent
Kadu et al.

(10) Patent No.: US 12,143,644 B1
(45) Date of Patent: Nov. 12, 2024

(54) APPLYING MINIMUM AND AVERAGE DISTANCE CONSTRAINT IN VIDEO STREAMING

(71) Applicant: Dolby Laboratories Licensing Corporation, San Francisco, CA (US)

(72) Inventors: Harshad Kadu, Santa Clara, CA (US); Guan-Ming Su, Freemont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/684,098

(22) PCT Filed: Aug. 14, 2022

(86) PCT No.: PCT/US2022/040282
§ 371 (c)(1),
(2) Date: Feb. 15, 2024

(87) PCT Pub. No.: WO2023/022956
PCT Pub. Date: Feb. 23, 2023

Related U.S. Application Data

(60) Provisional application No. 63/233,458, filed on Aug. 16, 2021.

(30) Foreign Application Priority Data

Aug. 16, 2021 (EP) .................................. 21191429

(51) Int. Cl.
*H04N 19/85* (2014.01)
*H04N 19/119* (2014.01)
*H04N 19/186* (2014.01)

(52) U.S. Cl.
CPC ........... *H04N 19/85* (2014.11); *H04N 19/119* (2014.11); *H04N 19/186* (2014.11)

(58) Field of Classification Search
CPC ............................ H04N 19/85; H04N 19/119
See application file for complete search history.

(56) References Cited

U.S. PATENT DOCUMENTS 8,811,490 B2  8/2014  Su
10,080,026 B2  9/2018  Su
(Continued)

FOREIGN PATENT DOCUMENTS

EP        3510772 A1    7/2019
JP      2021510885 A    4/2021
(Continued)

OTHER PUBLICATIONS

ITU Rec. ITU-R BT.2020-2, "Parameter values for ultra-high definition television systems for production and international programme exchange," (Oct. 2015). 8 pages.
(Continued)

*Primary Examiner* — Jerry T Jean Baptiste

(57) ABSTRACT

Input images are received as input to a multi-node system. The input images are divided into segments assigned to respective nodes of the multi-node system. Primary and secondary scenes are identified in the segments to ensure compliance with minimum and average distance constraints. Scene-level forward reshaping mappings are generated for the scenes by a respective node for an assigned segment. Forward reshaped images in the segment are generated by the node using the forward reshaping mappings and encoded into an output video signal, which enables a recipient device to generate reconstructed images and to render display images derived from the reconstructed images on an image display.

11 Claims, 29 Drawing Sheets

(56) References Cited

U.S. PATENT DOCUMENTS

| | | |
|---|---|---|
| 10,575,028 B2 | 2/2020 | Kadu |
| 10,659,749 B2 | 5/2020 | Kadu |
| 11,277,627 B2 | 3/2022 | Song |
| 2018/0098094 A1 | 4/2018 | Wen |
| 2019/0110054 A1 | 4/2019 | Su |
| 2020/0128307 A1* | 4/2020 | Li ............... H04N 19/119 |
| 2023/0164366 A1 | 5/2023 | Su |
| 2023/0300381 A1 | 9/2023 | Su |
| 2023/0343100 A1 | 10/2023 | Kadu |
| 2023/0388555 A1 | 11/2023 | Kadu |

FOREIGN PATENT DOCUMENTS

| | | |
|---|---|---|
| WO | 2018049335 A1 | 3/2018 |
| WO | 2019217751 A1 | 11/2019 |
| WO | 2020117603 A1 | 6/2020 |
| WO | 2021067204 A1 | 4/2021 |
| WO | 2022011194 A1 | 1/2022 |
| WO | 2022061089 A1 | 3/2022 |
| WO | 2022061169 A1 | 3/2022 |

OTHER PUBLICATIONS

ITU-R BT. 2100-2 (Jul. 2018) Image Parameter Values for High Dynamic Range Television for Use in Production and International Programme Exchange, International Telecommunication Union (ITU), Geneva, 16 pgs.

ITU-R BT. 1886 "Reference Electro-Optical Transfer Function for Flat Panel Displays Used in HDTV Studio Production" Mar. 2011.

SMPTE ST 2084:2014 "High Dynamic Range Electro-Optical Transfer Function of Mastering Reference Displays".

* cited by examiner

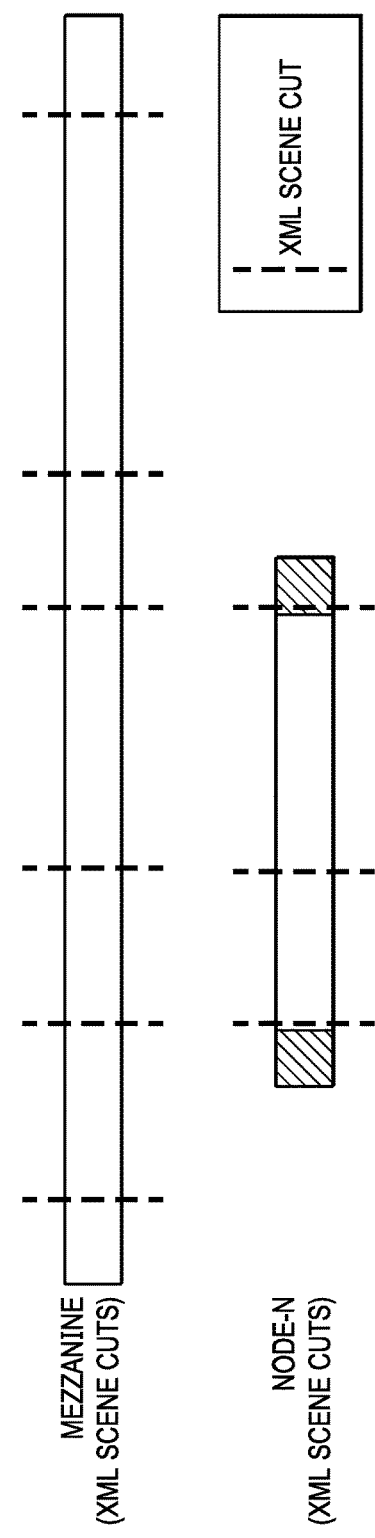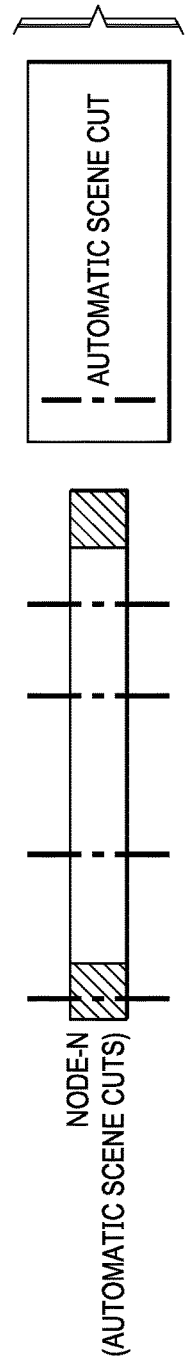

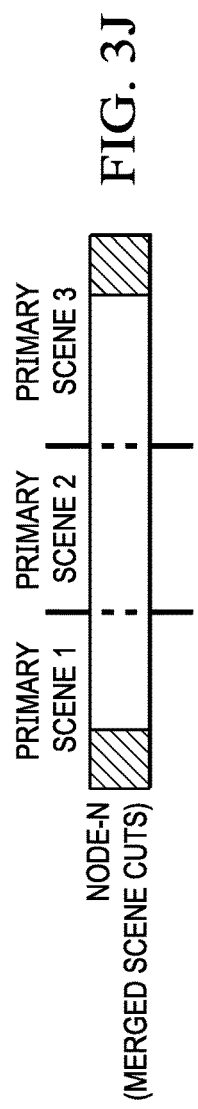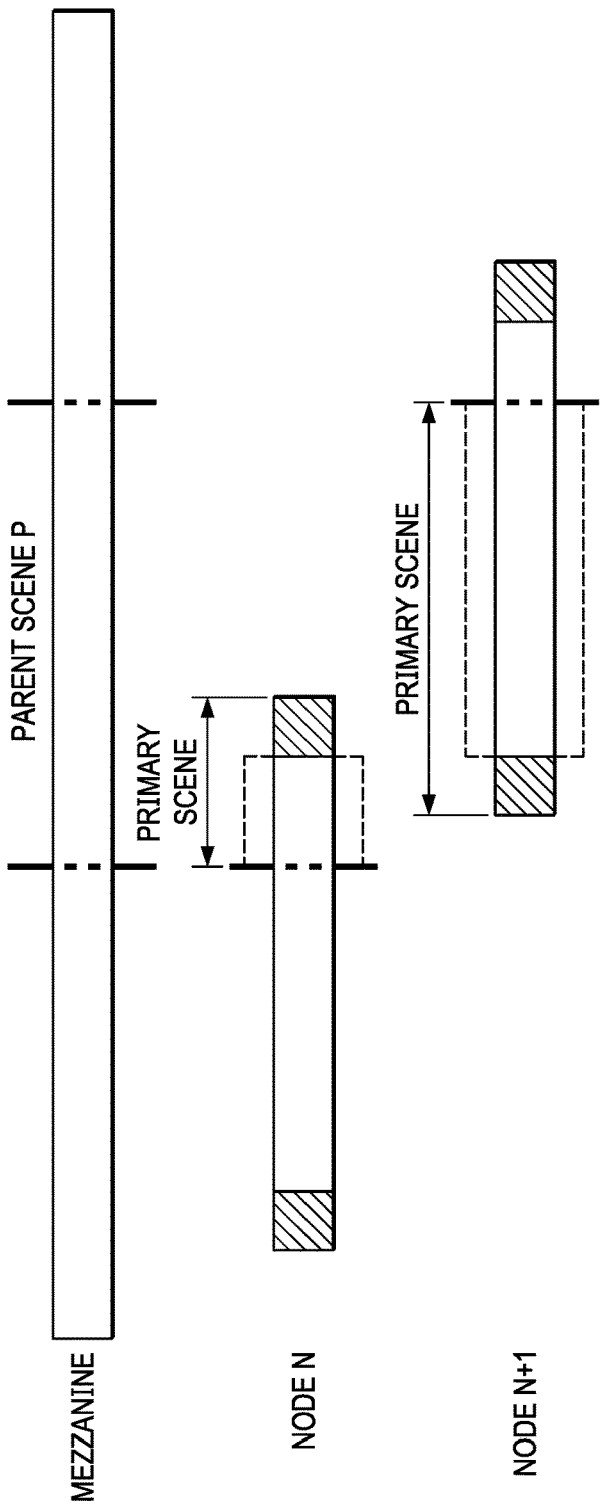

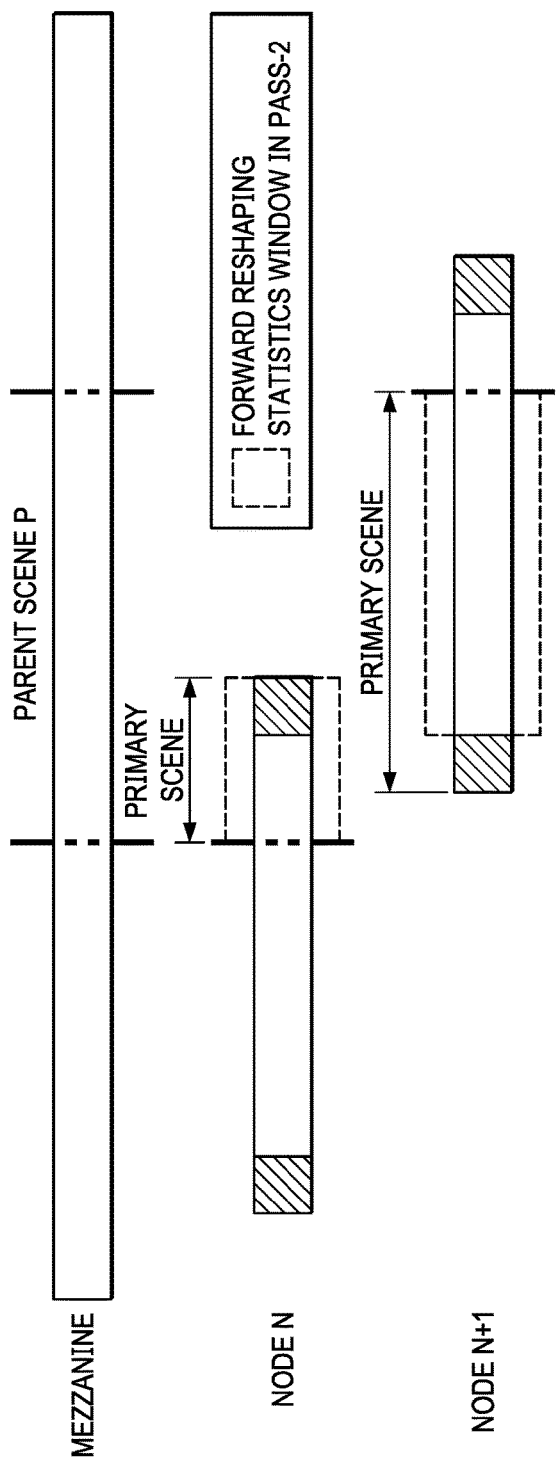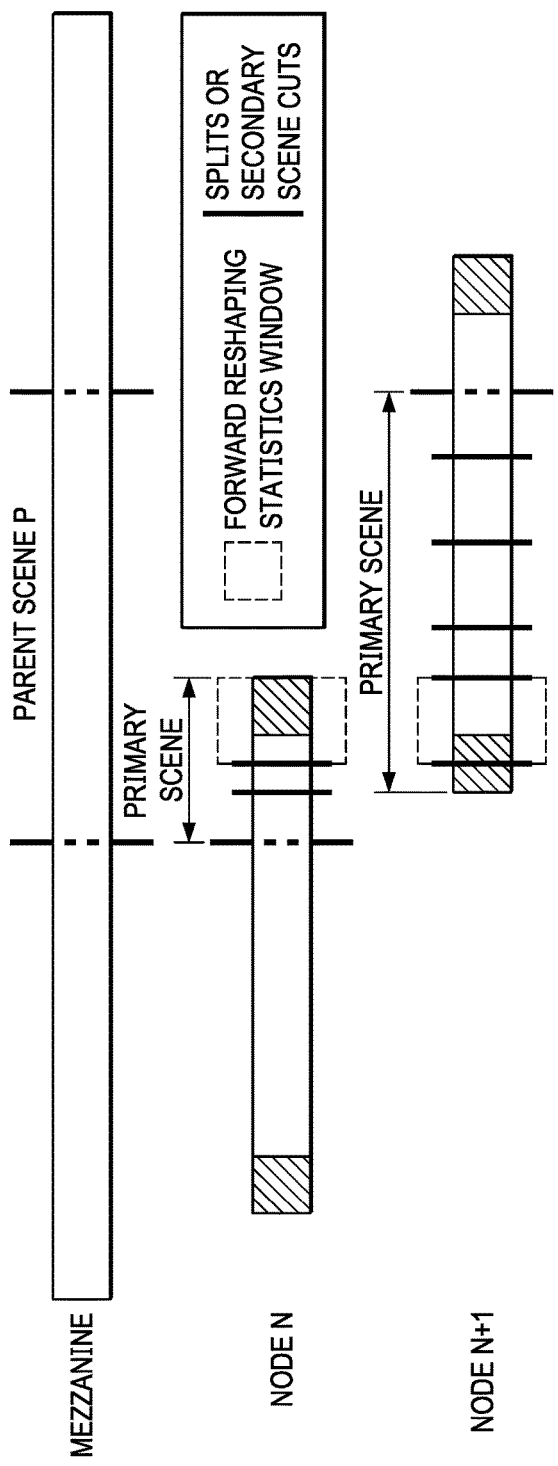

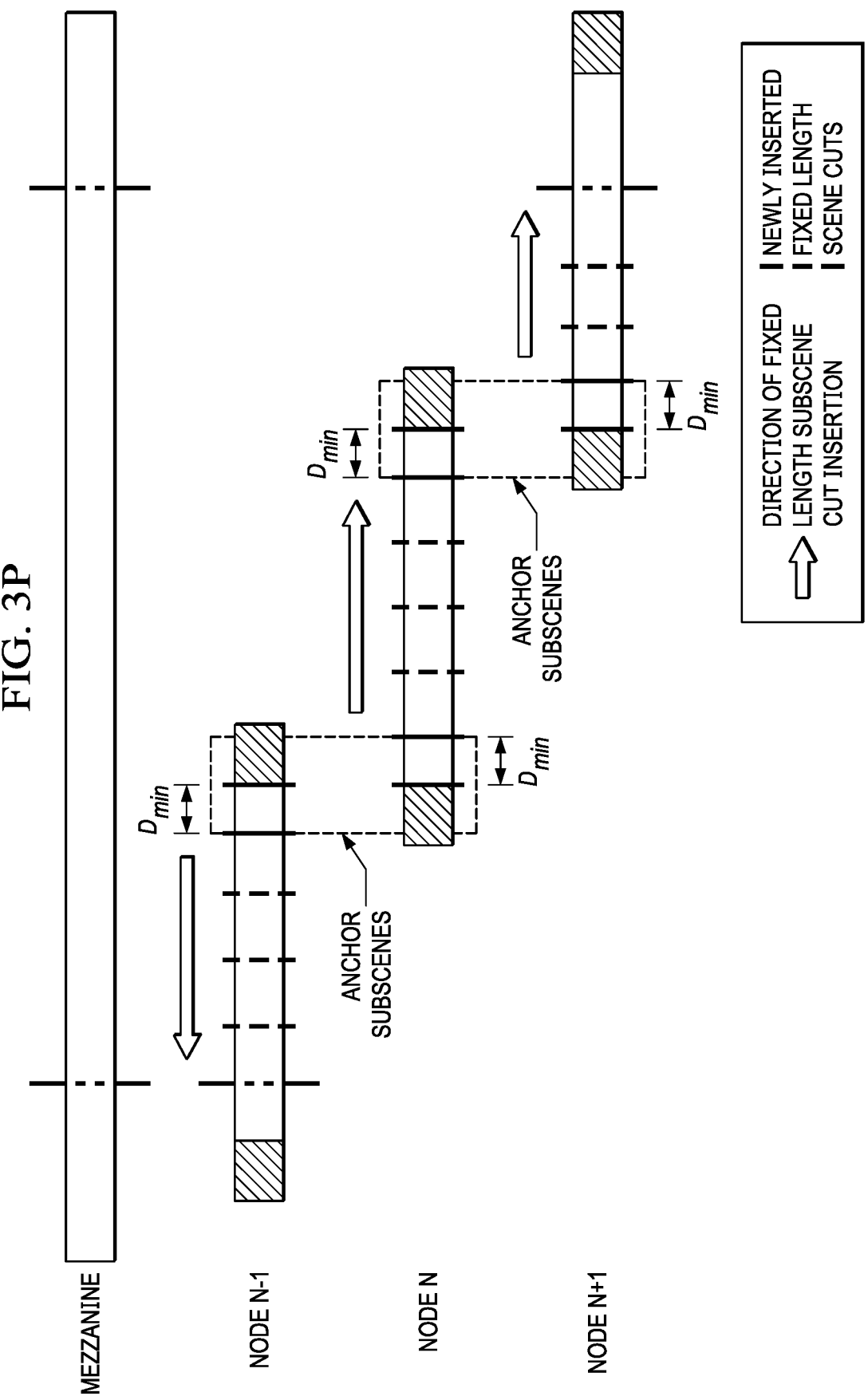

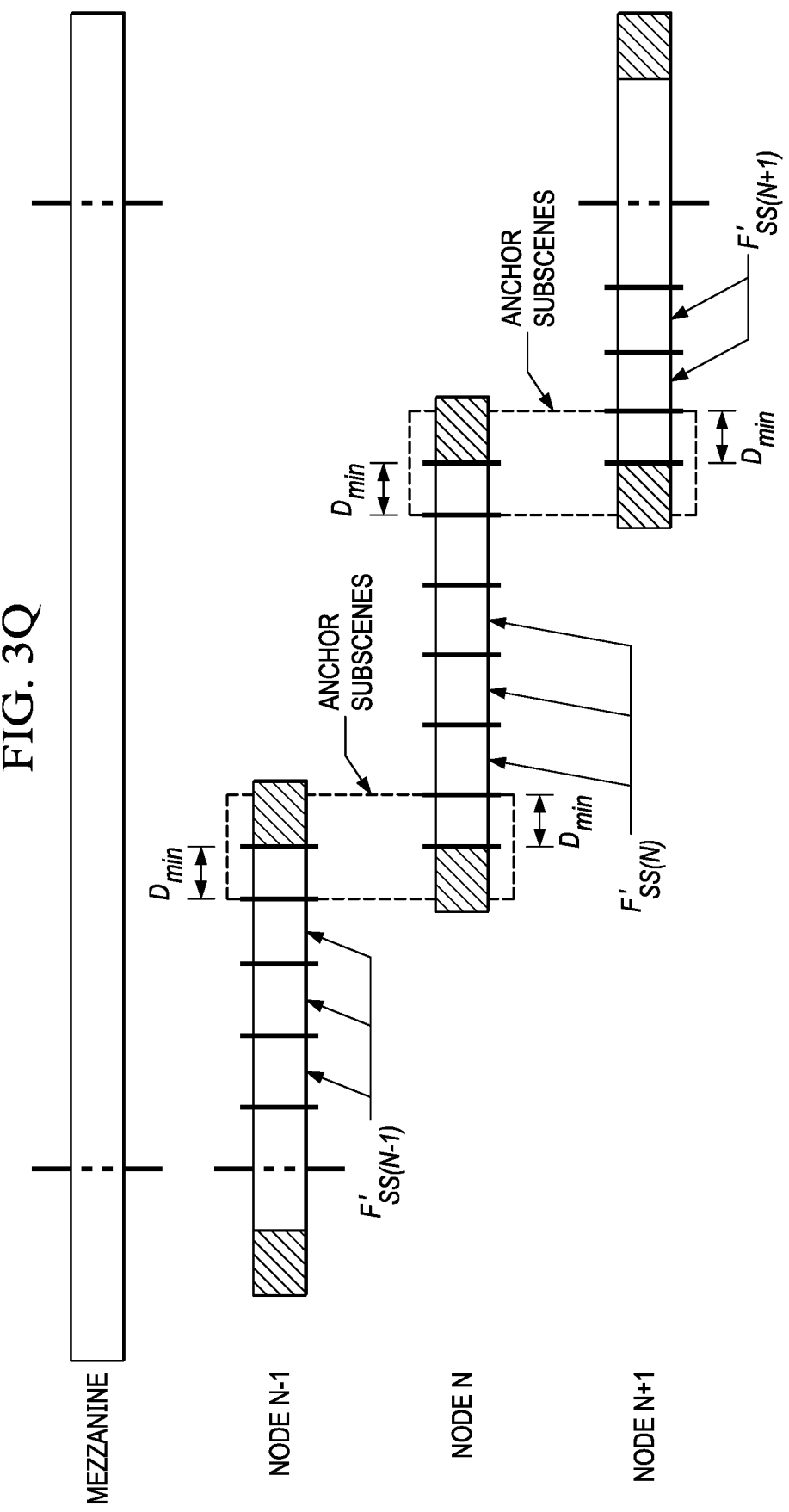

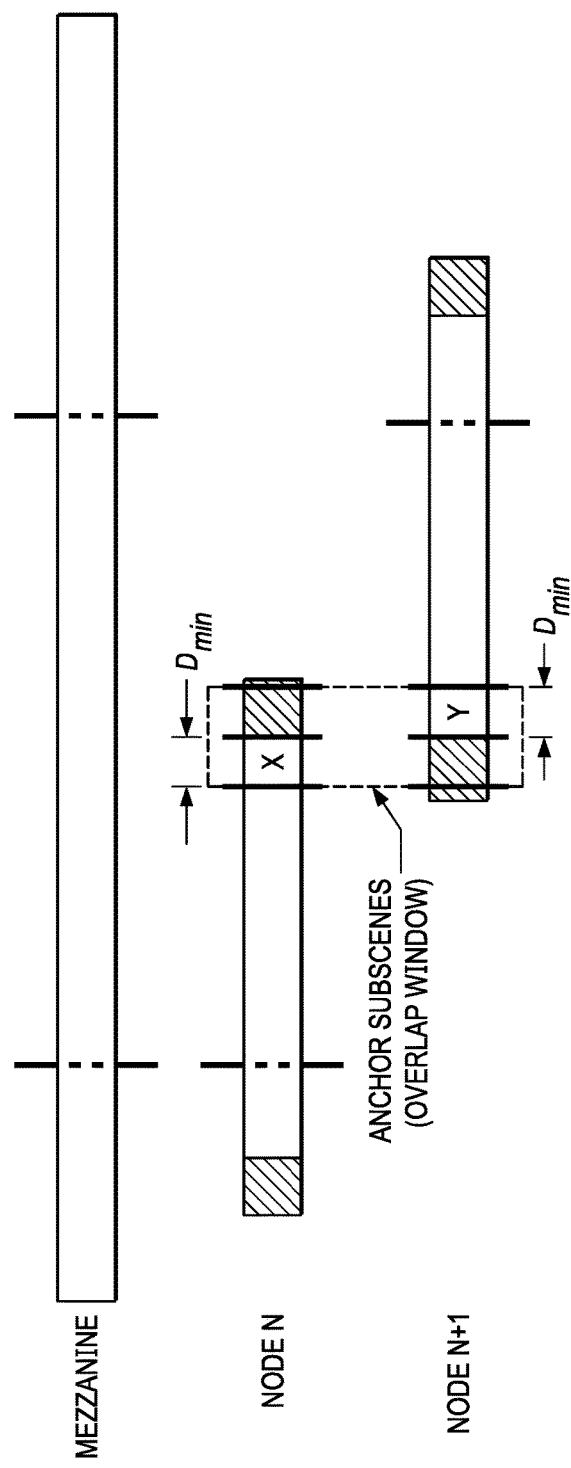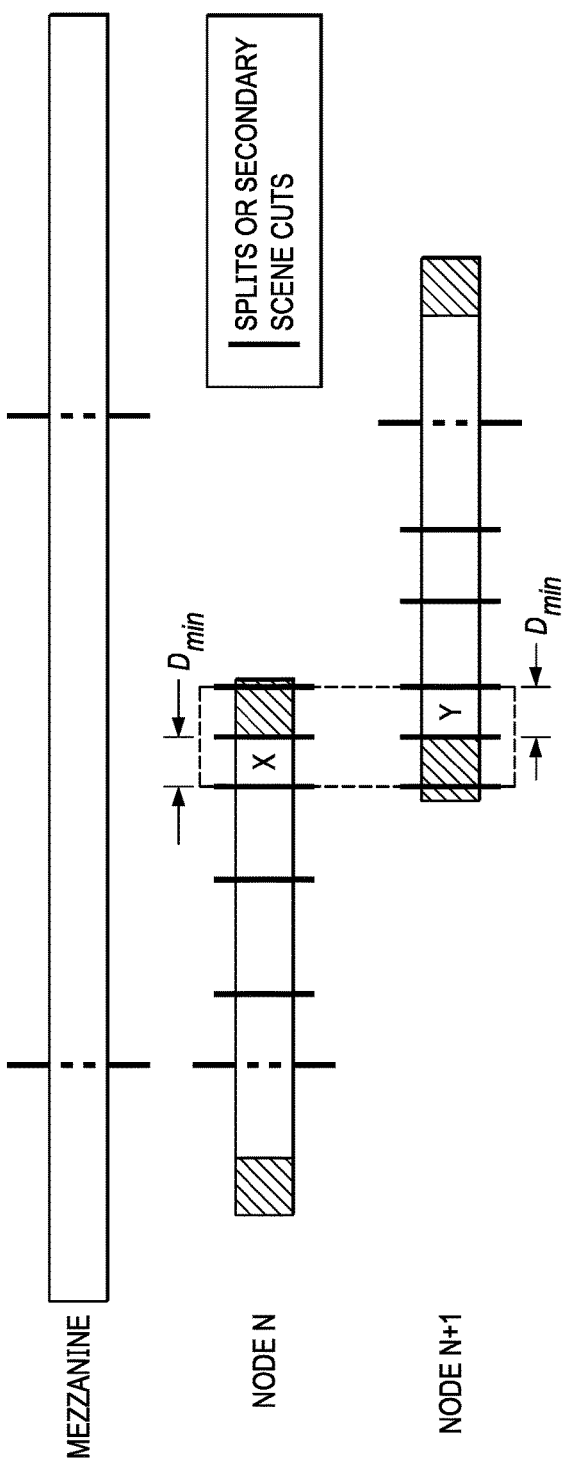

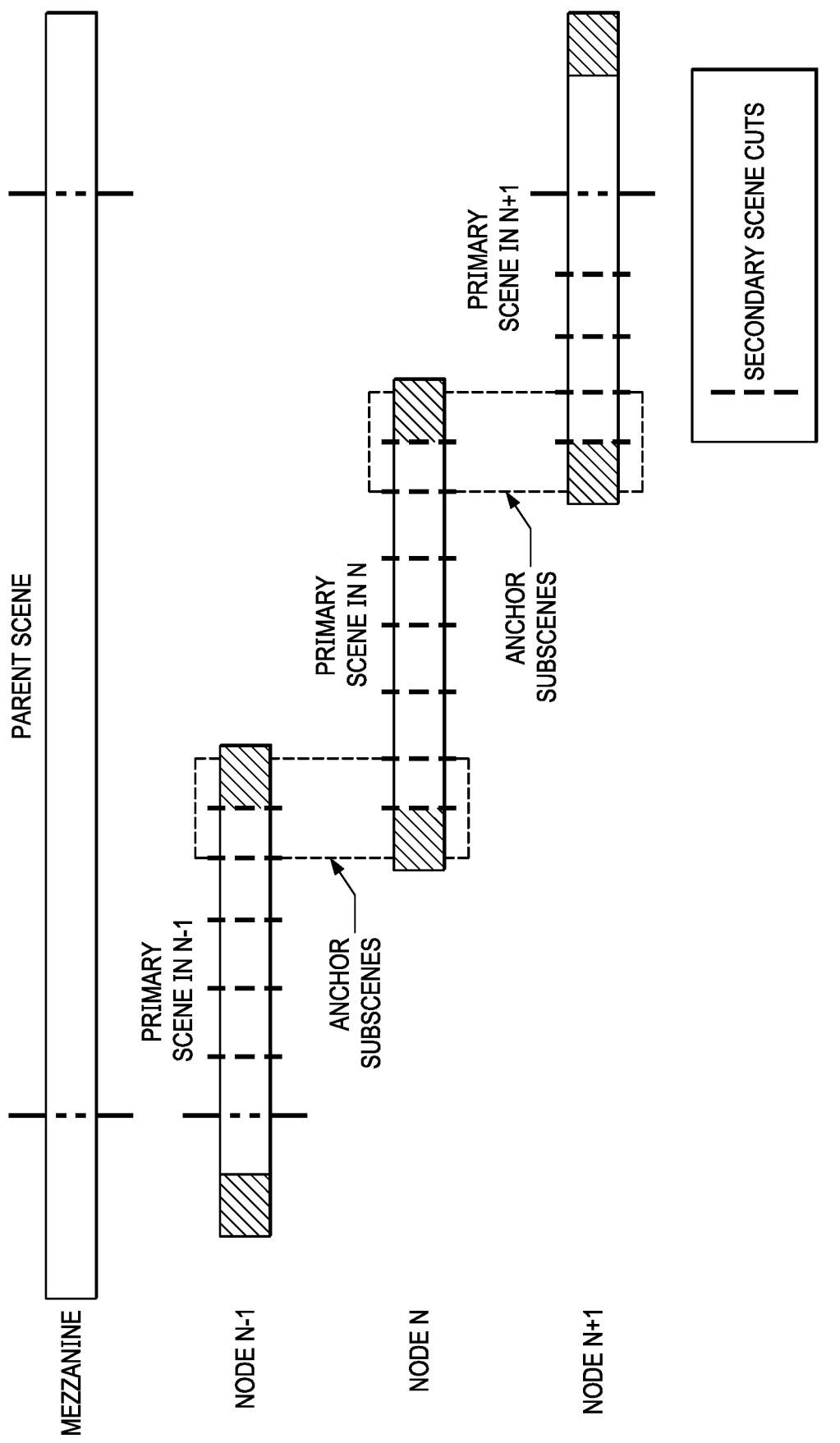

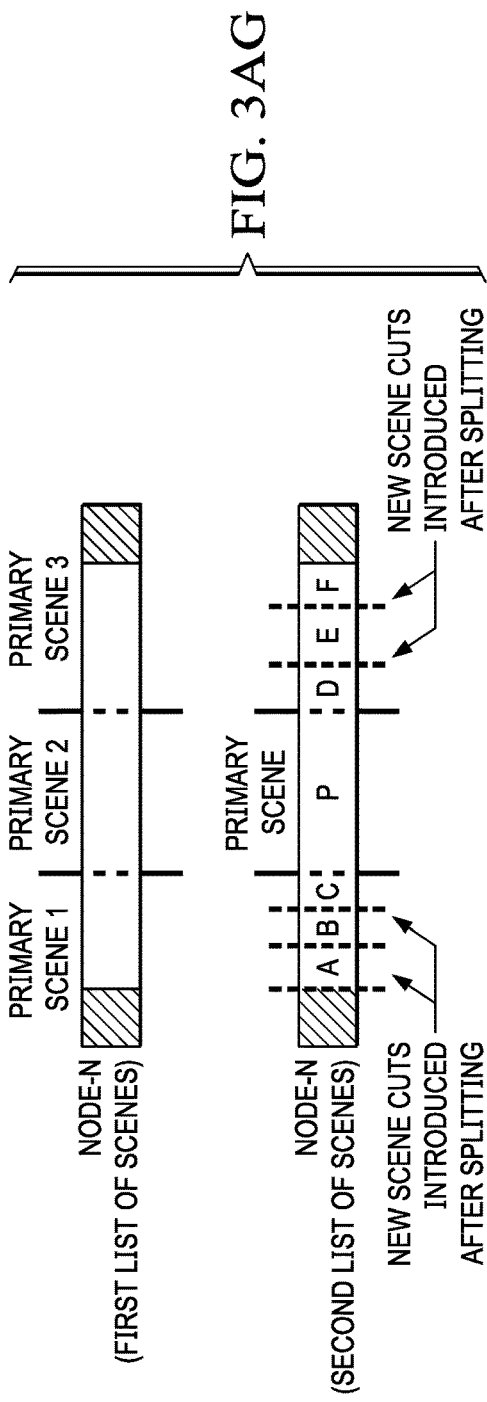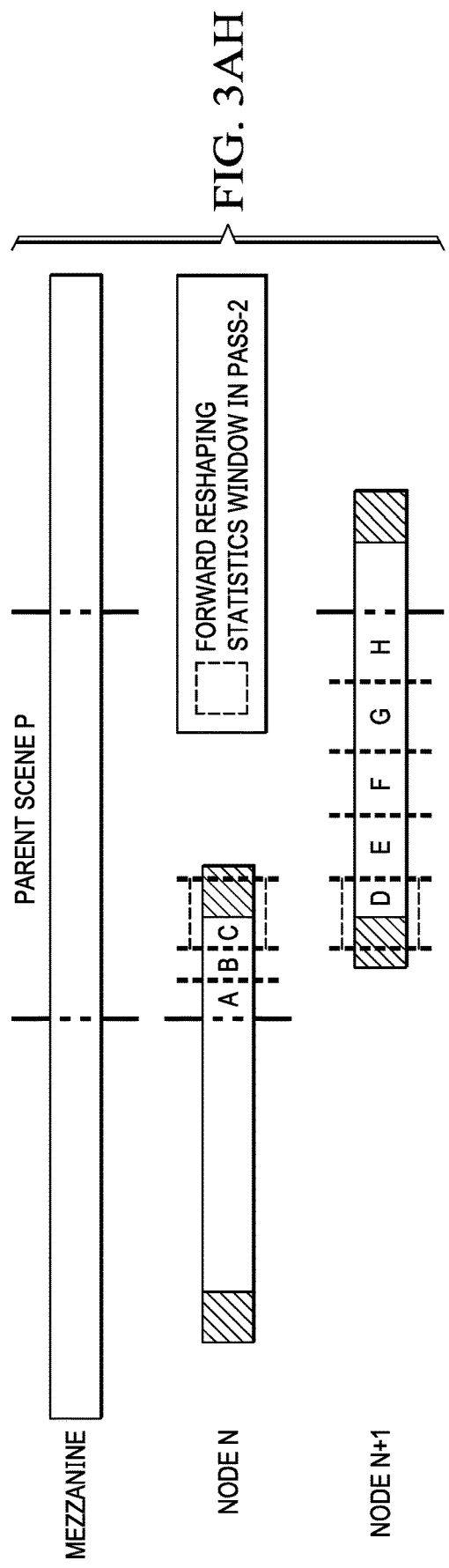

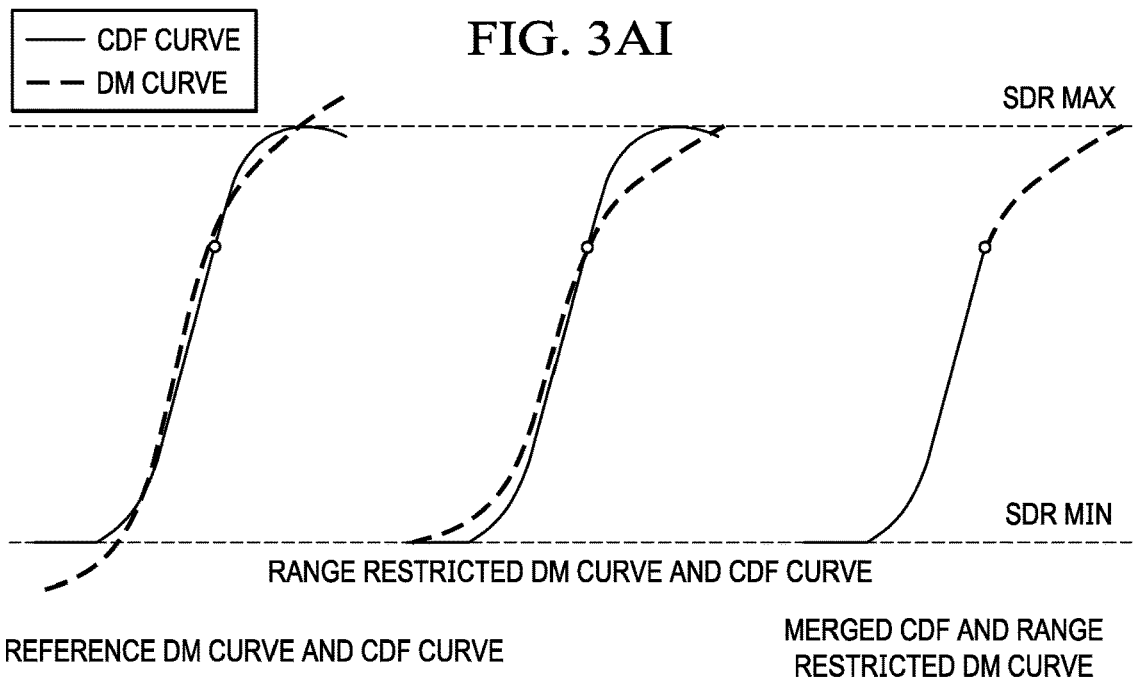
FIG. 3AI
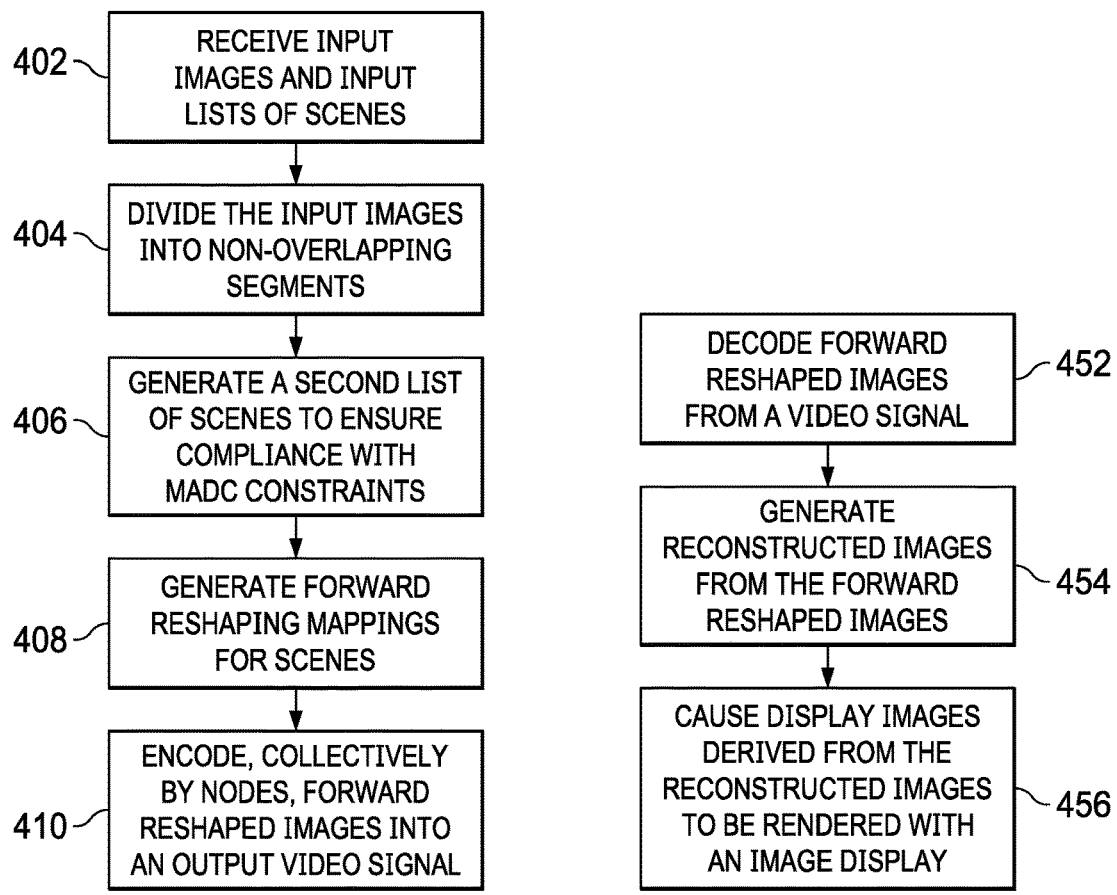
FIG. 4A
FIG. 4B

APPLYING MINIMUM AND AVERAGE DISTANCE CONSTRAINT IN VIDEO STREAMING

CROSS-REFERENCE TO RELATED APPLICATIONS

This application is a U.S. National Stage of International Application No. PCT/US2022/040282, filed Aug. 14, 2022, which claims priority from European Patent application Ser. No. 21191429.6, filed on Aug. 16, 2021, and U.S. Provisional Patent Application No. 63/233,458, filed on Aug. 16, 2021, each one incorporated herein by reference in their entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense. e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components/channels (e.g., luma Y and chroma Cb and Cr) of a color space, where each color component/channel is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance, represented in a codeword among codewords representing an image, etc.) of an input video signal to output screen color values (e.g., screen luminance, represented in a display drive value among display drive values used to render the image, etc.) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system (HVS) responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2044:2014 "*High Dynamic Range EOTF of Mastering Reference Displays*" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 302 to 1,000 $cd/m^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). Example (e.g., HDR, Hybrid Log Gamma or HLG, etc.) EOTFs are defined in SMPTE 2044 and Rec. ITU-R BT.2060, "*Image parameter values for high dynamic range television for use in production and international programme exchange.*" (June 2017). See also ITU Rec. ITU-R BT.3040-2, "*Parameter values for ultra-high definition television systems for production and international programme exchange.*" (October 2015), which is incorporated herein by reference in its entirety and relates to Rec. 3040 or BT. 3040 color space. As appreciated by the inventors here, improved techniques for coding high quality video content data to be rendered with a wide variety of display devices are desired.

EP 3 510 772 A1 discloses segment-based methods to generate a backward-compatible reshaped SDR video which preserves the artistic intent or "look" of a given EDR input. For each frame in a segment, reshaping functions are generated based on a support frames set determined based on a sliding window of frames that is adjusted based on scene cuts in the segment and which may include frames from both the current segment and neighboring segments. For luma reshaping, a mapping that preserves the cumulative density function of the luminance histogram values in the EDR and SDR inputs is combined with a minimum codeword allocation derived based on the EDR signal and the support frame set. For chroma reshaping, methods for segment-based forward and backward reshaping using multivariate, multi-regression models are also presented.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

The invention is defined by the independent claims. The dependent claims concern optional features of some embodiments of the invention.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 3B illustrates example scene cuts identified by video professionals; FIG. 3C illustrates example manually automatic scene cuts identified by automatic scene detection; FIG. 3J illustrates an example distribution of primary scenes; FIG. 3K illustrates an example parent scene distributed across two nodes; FIG. 3L illustrates an example statistics window that include bumper images/frames; FIG. 3M illustrates example operations for splitting portions of a primary/parent scene across two nodes into secondary scenes; FIG. 3O, FIG. 3P and FIG. 3Q illustrate example segments in fixed length splitting operations; FIG. 3V and FIG. 3W illustrate example anchor subscenes in variable length scene splitting; FIG. 3AA illustrates example partitions of a primary or parent scene; FIG. 3AB, FIG. 3AC, FIG. 3AD and FIG. 3AF illustrate example DC changes across partitions of a primary or parent scene after adjustment and/or offset; FIG. 3AG illustrates example initial scene cuts after short scene merging and example final scene cuts after scene splitting; FIG. 3AH illustrates example forward reshaping statistics windows in two segments assigned to two nodes; FIG. 3AI illustrates example display management (DM) curve and cumulative density function (CDF) curve before and after trim correction;

FIG. 4A and FIG. 4B illustrate example process flows; and

DESCRIPTION OF EXAMPLE EMBODIMENTS

Figure 1:
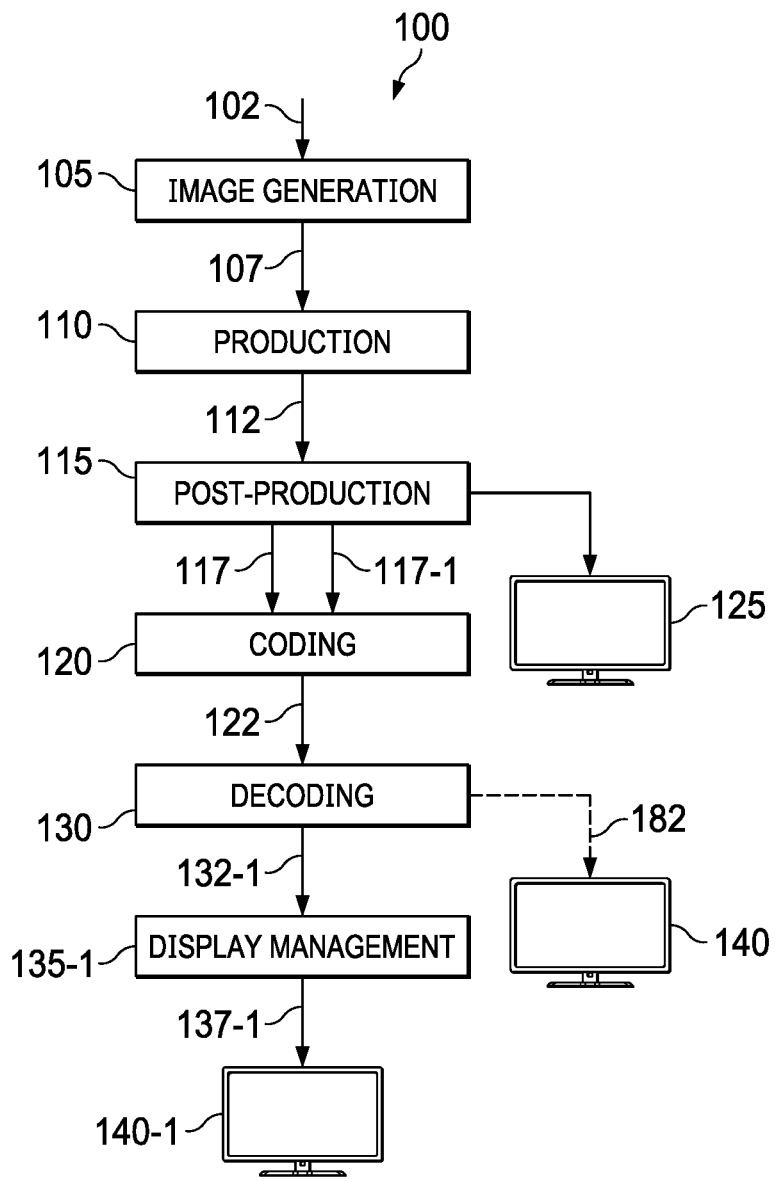
FIG. 1 illustrates an example video/image processing pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

An operational mode, referred to as Minimum and Average Distance Constraint (MADC) mode, may be implemented or operated by a video codec. Example video codecs as described herein may include, but are not necessarily limited to only, Single Layer Backward Compatible (SLBC) codecs. MADC can be used to guarantee a minimum image metadata (e.g., reference processing unit data or RPU data, etc.) refresh time interval and maintains an average number of image metadata refresh in a given time interval, while encoding fixed-length video segments in an upstream video encoding system such as a cloud-based multi-node video encoding system.

In some operational scenarios, the MADC mode can be implemented or operated by a SLBC video encoder that is designed for generating composite video bitstreams, each of which comprises SDR video content/data optimized for viewing on SDR image displays/screens as well as image metadata for enabling reconstructing, from the SDR video content/data, HDR video content/data optimized for viewing on HDR (or compatible) displays/screens. The composite video bitstreams may comprise base layer video streams for carrying SDR video content/data as well as other streams/containers to carry some or all image metadata used for mapping base layer video content/data of a lower dynamic range such as SDR video content/data to reconstructed video content/data of a higher dynamic range such as reconstructed HDR video content/data for HDR displays.

To achieve the best visual quality on HDR displays, dynamic image metadata, which may change for every image/frame, can be encoded in a video signal. Some recipient device such as relatively low-end battery-powered mobile devices may find it difficult to keep up with rapidly changing image metadata that varies from frame to frame in the video signal. As a result, some video image/frames and/or their corresponding image metadata may end up being dropped by these recipient devices.

These recipient devices can function more reliably when image metadata changes are less frequent. Maintaining a reasonable visual quality, while allowing the image metadata to change only after a specified number—which may be referred to as a minimum distance constraint—of (consecutive) images/frames, can be challenging. The minimum distance constraint—or a minimum distance—can be specifically selected to provide additional decoding time for avoiding frame dropping, which could otherwise happen due to wrong display timing caused by extra decoding time at the decoder side. Decoding a "refresh" composer metadata portion—for instance, to build lookup table(s) (e.g., three-dimensional lookup table(s) or 3D-LUT(s), etc) to be used in decoding operations—at the decoder side may need additional computation/time. If a distance between two time adjacent "refresh" composer metadata portions are too small, there may not be sufficient time to allow computing or building lookup tables or 3D-LUTs, thereby leading to playback jitter and even frame dropping. By way of example but not limitation, the minimum distance constraint—or the minimum distance denoted as $D_{min}$—can be 1, 4, 8 or 10 frames or more.

A bitrate for dynamic image metadata (e.g., composer metadata, display management or DM metadata, etc.) can increase significantly with an increase in frame rate. For a relatively low-resolution base layer, overheads for the per-frame image metadata can be relatively significant. The MADC mode not only helps keep image metadata constant for a certain number of images/frames, but also reduces the bitrate for image metadata at the same time.

In some operational scenarios, composer metadata—which refers to a part of image metadata used to reconstruct a higher dynamic range image from a corresponding lower dynamic range image carried in the base layer—for a (current) image/frame can point to previous composer metadata for one of previous frames preceding the image/frame. This can be done by simply setting a composer metadata ID for the one of previous frames in (e.g., a non-payload header of, etc.) the current image/frame, without any image metadata payload, thereby achieving a relatively high composer metadata compression.

In addition to maintaining or forcing image metadata to remain unchanged or fixed for a number of chunk of contiguous images/frames, the MADC mode can be implemented or operated to deliver a further reduced bitrate for carrying image metadata bitrate, for example by controlling an average number—which may be referred to as an average distance constraint—of image metadata changes in a given time interval or duration. Lowering metadata update frequency saves precious battery life in recipient devices such as relatively low-end mobile phones. The average distance constraint—or an average distance—can be specifically selected to be complied with a desired or budgeted power consumption and/or to be complied with a desired or budgeted bitstream overhead. For instance, constructing 3D-LUT consumes computation power. The longer the average distance for refresh composer metadata, the lower power a decoding device consumes, and the lower the bitstream overhead as there is less composer metadata in a coded bitstream. By way of example but not limitation, the average distance constraint—or the average distance denoted as $D_{avg}$—can be 12 frames or more or fewer frames.

For images/frames belonging to the same scene, image metadata may change very little from one frame to the next. The same image metadata or the same set of metadata parameters can be used for every image/frame in the scene. The first image/frame in the scene can be given (fresh) image metadata in a video signal, while the rest of the images/frames in the scene can be signaled to use or reuse the image metadata already provided in the video signal for the first image/frame. In operational scenarios in which every scene has a total number of image/frames greater than the minimum distance as well as greater than the average number of frames, both the minimum distance and the average distance constraints can be met at the same time while a consistent visual quality still is achieved with all images/frames of the scene.

In many if not all operational scenarios, $D_{avg} \geq D_{min}$. For example, the average distance constraint may be 12 frames, while the minimum distance constraint may be 10 frames. Hence, every scene should have 10 or more frames to meet the minimum distance constraint as well as should have 12 or more frames on average to meet the average distance constraint, assuming the entire sequence of images/frames is encoded serially by a single processing node (or a single video coding node).

An upstream encoding system may comprise multiple processing nodes (or multiple video coding nodes). A sequence of images/frames constituting a scene may be partitioned into multiple fixed-length segments, assigned to the multiple nodes, and encoded in parallel using the multiple nodes.

The partitioning of the same scene into multiple fixed-length segments may cause a part of the scene to one node and a different part of the same scene to a different node. Extra (e.g., fragmented, partial, etc.) scenes—or fragments in short—can be created as a result, thereby making meeting both the minimum and average distance constraints a relatively complicated task.

Moreover, each node assigned to handle a fragment of the same (original) scene may have incomplete knowledge of those parts or fragments in the same (original) scene that are assigned to other nodes. Sending the same image metadata or a single set of metadata parameters for all the images/frames of the original scene may become impossible.

While the same image metadata can be sent for all the image/frames in a fragment or a partial scene to which a node has access, for the overall original scene, however, image metadata for different fragments or different partials scenes encoded by different nodes can have significant if not drastically different metadata parameters (e.g., reshaping parameters, etc.). This is so because these metadata parameters are computed by the different nodes on different partial scene video data.

More specifically, a first node may encode a first image/frame belonging to an original scene as well as first metadata parameters for the first image/frame. A second different node may encode a second image/frame (e.g., the next scene to the first image/frame, etc.) belonging to the same original scene as well as second metadata parameters for the second image/frame. Because the two different nodes may accumulate different image related statistics in respective encoding operations, the first metadata parameters as encoded by the first node for the first image/frame can be significantly different from the second metadata parameters as encoded by the second node for the second image/frame. As a result, when a recipient uses these metadata parameters to render the first and second images, the first image/frame can have relatively large visual differences in comparison with the second image/frame. These visual differences may lead to temporal inconsistencies in visual qualities of images/ frames, abrupt or sudden brightness change, flashing, flickering, color changes, visual artifacts, etc.

Example embodiments described herein relate to encoding video images. A sequence of input images in an input video signal and one or more input lists of scenes are received as input to a multi-node video encoding system having a plurality of video encoding nodes. The one or more input lists of scenes collectively identify a plurality of primary scenes in the sequence of input images. The sequence of input images is divided into a plurality of non-overlapping segments. Each segment in the plurality of non-overlapping segments is assigned to a respective node in the plurality of video encoding nodes. The respective node receives input images within the segment as in-segment images for the segment and input images in one or two bumper sections of the segment as bumper images for the segment. The plurality of primary scenes identified with the one or more input lists of scenes and segment boundaries delineating neighboring segments in the plurality of non-overlapping segments are used to generate a second list of scenes to ensure compliance with minimum and average distance constraints. The second list of scenes identifies one or more in-segment scenes in the segment. The one or more in-segment scenes include zero or more primary scenes not on any segment boundary of the segment and one or more secondary scenes divided from one or more primary scenes on one or both segment boundaries of the segment. One or more scene-level forward reshaping mappings are generated for the one or more secondary scenes. Each scene-level forward reshaping mapping of the one or more scene-level forward reshaping mappings is generated at least in part from reshaping statistics collected from input images in an overlap window determined for a respective secondary scene of the one or more secondary scenes in the segment. Forward reshaped images in the segment are encoded by the respective node into an output video signal encoded collectively by the plurality of video encoding nodes. The output video signal includes an image metadata portion generated by the respective node to enable a recipient device to generate reconstructed images from the forward reshaped images in the segment and to render display images derived from the reconstructed images on an image display.

Example embodiments described herein relate to decoding video images. A sequence of forward reshaped images is decoded from a video signal. The video signal having been generated by a plurality of video encoding nodes in a multi-node video encoding system. The video signal includes image metadata generated by the plurality of video encoding nodes. The sequence of forward reshaped images includes forward reshaped images encoded into the video signal by a node in the plurality of video encoding nodes for a segment in a plurality of segments used to partition a sequence of source images. The sequence of forward reshaped images includes a segment of forward reshaped images that was generated by a node of the multi-node video encoding system using forward reshaping functions for one or more scenes identified in a segment of pre-reshaped source images. The one or more scenes identified in the segment of pre-reshaped source images were ensured by the node to be in compliance with minimum and average distance constraints. An image metadata portion in the image metadata is used to generate reconstructed images from the forward reshaped images in the segment. The image metadata portion having been generated by the node. Display images derived from the reconstructed images are rendered on an image display.

Example Image Processing Pipeline

FIG. 1 depicts an example video/image delivery pipeline 100 showing various stages from video capture to video content display. A sequence of video frames 102 is captured or generated using an image generation block 105. The video frames (102) may be digitally captured (e.g., by a digital camera, etc.) or generated by a computer (e.g., using computer animation, etc.) to provide video data 107. Additionally, optionally or alternatively, the video frames (102) may be captured on film by a film camera. The film can be converted to a digital format to provide the video data (107). The film can be converted to a digital format to provide the video data (107). Additionally, optionally or alternatively, some or all of the video frames (102) may be partially or entirely generated by computers using image rendering/generation and/or computer graphics techniques. In a production phase 110, the video data (107) is edited to provide a video production stream 112.

The video data of the production stream (112) is then provided to a processor for post-production editing 115. The post-production editing (115) may include (e.g., automatically, manually, automatically in part manually in part, etc.) adjusting or modifying colors or brightness in particular areas of an image to enhance the image quality or achieve a particular appearance for the image in accordance with the video creator's creative intent. This is sometimes called "color timing" or "color grading." Other editing (e.g., scene selection and sequencing, manual and/or automatic scene cut information generation, image cropping, addition of computer-generated visual special effects, etc.) may be performed at the post-production editing (115) to yield, through content mapping and/or color grading, an original input video signal 117 (e.g., HDR images, etc.) to a coding block 120 collectively implemented by a plurality of video encoding nodes in a multi-node video encoding system. Additionally, optionally or alternatively, from the video data of the production stream (112), the post-production editing (115) may yield, through content mapping and/or color grading, a reference video signal 117-1—e.g., SDR images depicting the same visual semantic content as the HDR images in the original input video signal (117-1), etc.—to the coding block (120). The reference color grade (117-1) may be derived from the original input video signal through content mapping and/or color grading performed manually, automatically or a combination of manual and automatic image processing operations.

The original input video signal and/or the reference video signal (117-1) may be used by the coding block (120) or the multi-node coding system—to perform segment-based video encoding and generate an output video signal 122. The output video signal (122) may comprise reshaped images the same as or closely approximate (e.g., through minimization of prediction errors, through closed-form solutions to unconstrained or constrained optimization problems, etc.) images in the reference video signal (117-1). Example reshaping operations are described in U.S. Pat. No. 10,080,026, "Signal reshaping approximation," by G-M. Su et al., the entire content of which is hereby incorporated by reference as if fully set forth herein.

For the purpose of illustration only, the original input video signal (117) represents an input color grade of HDR images. The reference video signal (117-1) represents a reference color grade of reference images to be approximated by a reshaped color grade represented in the output video signal (122). In some operational scenarios, the reference images may be content mapped (e.g., using an appropriate profile of a video encoding tool such as Dolby Vision coding tools commercially available from Dolby Laboratories, Inc., San Francisco, California, etc.) from the HDR images in the original input video signal (117). In some operational scenarios, during the post-production editing (115), the HDR images in the input video signal (117) are viewed or reviewed on an HDR reference display that supports the high dynamic range by a colorist who is performing post-production editing operations on the HDR images. Additionally, optionally or alternatively, in some operational scenarios, during the post-production editing (115), the SDR images in the reference video signal (117-1) are viewed or reviewed on an SDR reference display (e.g., 125 of FIG. 1, etc.) that supports the standard dynamic range.

The coding block (120) may implement some or all multi-node segment based video encoding operations as described herein to generate operational parameters for (e.g., forward, backward, etc.) reshaping to map input images in the input video signal to reshaped images and/or to map the reshaped images to reconstructed images approximating the input images. The (e.g., forward, etc.) reshaped images can be compressed/encoded by the coding block (120) into the output video signal (122) or a coded bitstream representing the output video signal (122). Some or all of the operational parameters for reshaping functions (e.g., backward reshaping functions, inverse reshaping functions, etc.) may be included or encoded in the same coded bitstream as a part of image metadata.

The coding block (120) may include audio and video encoders, such as those defined by ATSC, DVB, DVD, Blu-Ray, and other delivery formats, to generate the coded bitstream (122).

In some operational scenarios, the output video signal (122) may represent a video signal (e.g., an 8-bit SDR video signal, a 10-bit SDR video signal, etc.) that is backward compatible with a wide variety of SDR display devices (e.g., SDR displays, etc.). In a non-limiting example, the video signal encoded with the reshaped SDR images may be a single-layer backward compatible video signal. Here, a "single-layer backward compatible video signal" may refer to a video signal that carries SDR images that are specifically optimized or color graded for SDR displays in a single signal layer. Example single layer video coding operations are described in U.S. Patent Application Publication No. 2019/0110054, "Encoding and decoding reversible production-quality single-layer video signals," by G-M. Su et al., the entire contents of which are hereby incorporated by reference as if fully set forth herein.

The output video signal (122) is then delivered downstream to receivers such as mobile devices, handsets, tablet computers, decoding and playback devices, media source devices, media streaming client devices, television sets (e.g., smart TVs, etc.), set-top boxes, movie theaters, and the like. In a receiver (or a downstream device), the output video signal (122) is decoded by decoding block (130) to generate decoded images 182, which may be the same as images (e.g., forward reshaped SDR images, etc.) encoded by the coding block (120) into the bitstream (122), subject to quantization errors generated in compression performed by the coding block (120) and decompression performed by the decoding block (130).

In some operational scenarios, the decoded images represent SDR images that were forward reshaped by an upstream video encoder (e.g., with the coding block (120), etc.) from the color graded HDR images to approximate a reference SDR color grade.

The operational parameters for the reshaping functions may be decoded and used in prediction operations by a recipient device of the video signal (122) or coded bitstream to generate reconstructed images of another color grade from the decoded images of one color grade.

Additionally, optionally, or alternatively, the output video signal (122) or coded bitstream is encoded with additional image metadata including but not limited to display management (DM) metadata that can be used by the downstream decoders to perform display management operations on decoded images or backward reshaped images to generate display images optimized for rendering on target displays, which may or may not have the same display capabilities as reference displays for which the input and reference color grades have been graded.

In operational scenarios in which the receiver operates with (or is attached or operatively linked to) a target display 140 that supports rendering the decoded images (182), the decoding block (130) can decode the images (182) from (e.g., the single layer in, etc.) the coded bitstream (122), and use the decoded images (182) (e.g., forward reshaped SDR images, etc.) directly or indirectly for rendering on the target display (140).

In some operational scenarios, the target display (140) is of similar characteristics as the SDR reference display (125), and the decoded images (182) are forward reshaped SDR images directly watchable on the target display (140).

In some embodiments, the receiver operates with (or is attached or operatively linked to) a target display that has different display capabilities from those of a reference display for which the decoded images (182) were optimized. Some or all of the operational parameters for the reshaping functions in the image metadata (or composer metadata) may be used to compose or reconstruct images from the decoded images (182) that are optimized for the target display.

For example, the receiver may operate with an HDR target display 140-1 that supports a high dynamic range (e.g., 100 nits, 302 nits, 300 nits, 500 nits, 1,000 nits, 4,000 nits, 10,000 nits or more, etc.) than that of the decoded images (182). The receiver can extract the image metadata from (e.g., metadata container(s) in, etc.) the coded bitstream representing the output video signal (122), and use the operational parameters for the reshaping functions in the image metadata (or composer metadata) to compose or reconstruct images 132-1 from the decoded images (182) such as forward reshaped SDR images.

In some operational scenarios, the reconstructed images (132-1) represent reconstructed (e.g., HDR, EDR, images optimized for 1000-nit display devices, images optimized for 4000-nit display devices, etc.) images optimized for viewing on a display that is the same as, or comparable with, a target display operating in conjunction with the receiver. The receiver may directly use the reconstructed images (132-1) for rendering on the target display.

In some operational scenarios, the reconstructed images (132-1) represent reconstructed images optimized for viewing on a (e.g., reference, etc.) display that is not the same as a target display (140-1) operating in conjunction with the receiver. A display management block (e.g., 135-1, etc.)—which may be in the receiver, in the target display (140-1), or in a separate device-further adjusts the reconstructed images (132-1) to characteristics of the target display (140-1) by generating a display-mapped signal (137-1) adapted to the characteristics of the target display (140-1). Display images or the adjusted reconstructed images may be rendered on the target display (140-1).

SLBC MADC Operations

Figure 2A:
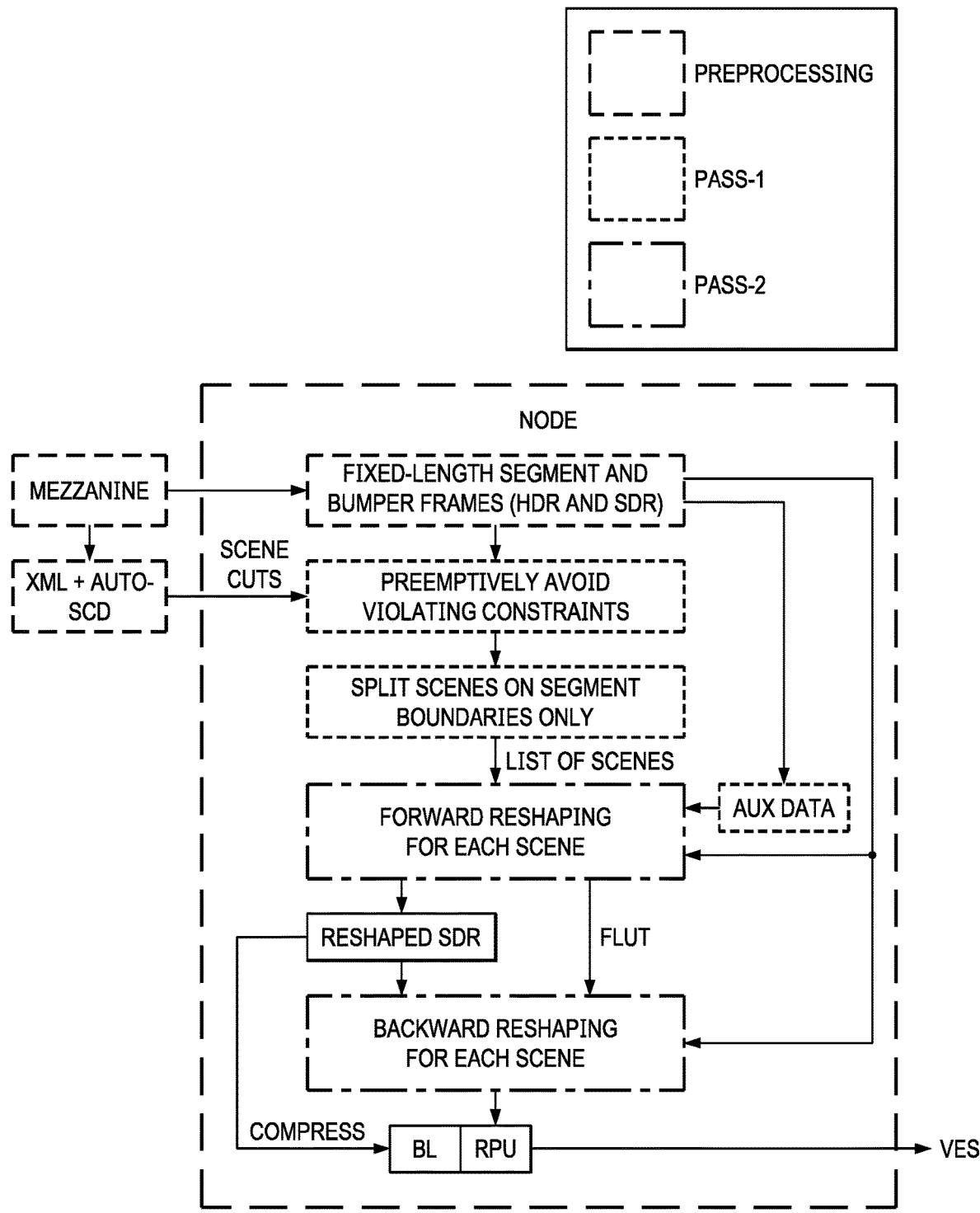
FIG. 2A illustrates an example process flow for performing tasks in two passes.

FIG. 2A illustrates an example process flow for SLBC MADC operations. These SLBC MADC operations can be performed by a parallel video encoding system to reduce the bitrate used to transmit image metadata in a SLBC video signal generated by multiple nodes of the video coding system and guarantee or comply with a minimum separation between image metadata updates, while maintaining or keeping temporal consistency among (e.g., all, 99%, etc.) images/frames within a scene, even if the scene is partitioned to be processed by more than one nodes of the video coding system.

As shown in FIG. 2A, an input video signal (denoted as "Mezzanine") may be received as input. The input video signal may comprise—or may be decoded into—a sequence (e.g., 302 of FIG. 3A, etc.) of (e.g., consecutive, sequential, etc.) images/frames as well as input scene data (denoted as "XML+Auto-SCD").

The multi-node video encoding operations of FIG. 2A may include a preprocessing step that distributes the sequence (302 of FIG. 3A) of images/frames received in the input video signal ("Mezzanine") into a sequence of fixed-length segments and accompanying bumper frames. Each fixed-length segment can be assigned to a different computing node (or a video encoding node) among a plurality of computing nodes (or video encoding nodes) of the multi-node video encoding system.

Figure 3A:
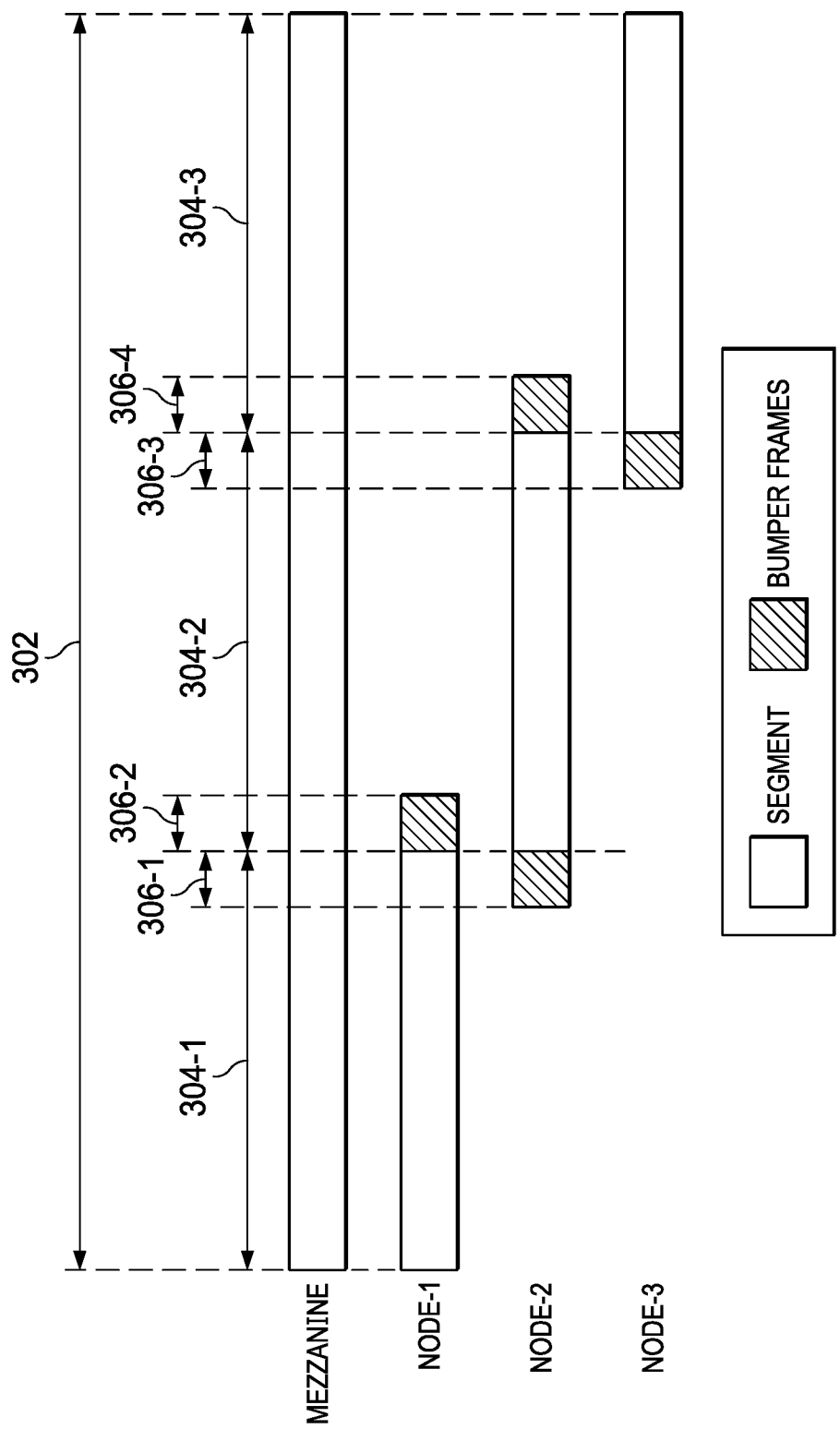
FIG. 3A illustrates example fixed-length segments assigned to respective nodes in a plurality of computing nodes (or cloud-based computers) in a multi-node video encoding system.

For the purpose of illustration only, referring to FIG. 3A, the sequence of fixed-length segments may comprise three segments 304-1, 304-2, 304-3, etc. These segments (e.g., 304-1, 304-2, 304-3, etc.) are mutually exclusive, or have no frames in common. Each segment comprises a sub-sequence of (e.g., consecutive, sequential, etc.) images/frames in the sequence (302). The three segments (e.g., 304-1, 304-2, 304-3, etc.) can be assigned to three different computing nodes denoted as "Node-1", "Node-2" and "Node-3", respectively. Input images/frames in the three segments (e.g., 304-1, 304-2, 304-3, etc.) can be provided-along with input images/frames in respective sections 306-1 through 306-4, etc., of bumper frames—to the computing nodes ("Node-1", "Node-2" and "Node-3"), respectively.

As shown in FIG. 3A, the segment (304-1) is assigned to the first node among the three nodes or Node-1. Input images/frames in the segment (304-1) are provided—along with input images/frames in the section (306-2) of bumper frames—to Node-1. Similarly, the segment (304-2) is assigned to the second node among the three nodes or Node-2. Input images/frames in the segment (304-2) are provided-along with input images/frames in the sections (306-1 and 306-4) of bumper frames—to Node-2. The segment (304-3) is assigned to the third node among the three nodes or Node-3. Input images/frames in the segment (304-3) are provided-along with input images/frames in the section (306-3) of bumper frames—to Node-3.

Each section (one of 306-1 through 306-4) of the bumper frames comprises a certain (e.g., preconfigured, dynamically adjustable, 4, 8, 16, 32, etc.) number of images in the sequence (302) that precede before the first image/frame, or succeed after the last image/frame, of a fixed length segment (one of 304-1, 304-2, 304-3, etc.). In some operational scenarios, a bumper section comprises more input images/frames than each of the minimum and average distances.

Bumper frames immediately preceding/succeeding a fixed length segment provide to a current node (e.g., Node-2, etc.)—to which the segment is assigned—additional image data that may be used for maintaining temporal consistency with neighboring (e.g., previous, next, etc.) fixed length segment(s) encoded by neighboring (e.g., previous, next, etc.) node(s) to the current node. The current node is assigned to encode the fixed length segment and does not encode the bumper frames preceding or succeeding the fixed length segment into the video signal.

Hence, each node is provided with its share of images/frames in the form of segment and bumper images/frames. In some operational scenarios, except the first and last nodes (e.g., among three or more nodes, etc.), any other node—e.g., an intermediate node assigned with an intermediate segment in the sequence of fixed length segments—are provided with the same number of input images/frames in connection with a fixed length segment to which such other node is assigned. In an example, the segment length—or the total number of input images/frames—in a fixed length segment can cover thirty (30) seconds of normal playing or playback time and each bumper section can cover two (2) seconds of normal playing or playback time. Hence, for 24 fps videos, a fixed length segment comprise 720 input images/frames and each bumper section comprise 48 input images/frames.

Referring back to FIG. 2A, after the preprocessing step is over, each node receives or obtain access to its share of input images/frames in assigned fixed length segment(s) and respective bumper sections. In some operational scenarios, multi-node encoding operations of FIG. 2A that are performed by each node after the preprocessing step can be implemented or performed using a two-pass approach. For simplicity, the two passes may be respectively denoted as "Pass-1" and "Pass-2".

Pass-1 or tasks therein mainly focus on generating a list of scenes in a fixed length segment to which the node is assigned. Scene cuts from the input scene data provided with the XML file and Automatic Scene Cut Detector (Auto-SCD) can be combined to generate a first list of scenes. A scene may be identified—e.g., in a list of scenes—by a scene cut representing a combination of a starting image/frame index and an ending image/frame index in a sequence of consecutive images/frames.

To avoid minimum and average distance constraints violations, one or more fixed or variable length scene splitting operations/algorithms/methods/processes that use or analyze input images/frames in an assigned segment along with its respective bumper (frame) section(s) can be implemented or performed for the purpose of maintaining temporal consistency in scenes distributed across multiple nodes. Example scene splitting operations including variable length scene splitting are described in U.S. Provisional Patent Application No. 63/080,255, "RECURSIVE SEGMENT TO SCENE SEGMENTATION FOR CLOUD-BASED CODING OF HDR VIDEO," by HARSHAD KADU et al., filed on 18 Sep. 2020, the entire contents of which are hereby incorporated by reference as if fully set forth herein. These scene splitting operations//algorithms/methods/processes produce additional scenes that are added to the first list of scenes to generate a second list of scenes, while still respecting or complying with the minimum and average distance constraints. The second list of scenes is provided to Pass-2 or tasks therein. In the meantime, auxiliary data (denoted as "Aux data") is cached or stored or otherwise made accessible to Pass-2 for the purpose of reducing computation overhead in Pass-2.

Pass-2 or tasks therein use the second list of scenes received from Pass-1 and the Aux data to perform forward and backward reshaping for each scene identified in the second list for the fixed length segment. Trim correction may be performed in a forward (processing) path that implements or performs the forward reshaping. The forward reshaping produces reshaped SDR video images/frames from the input images/frames in the fixed length segment, whereas the backward reshaping—e.g., implemented in a backward (processing) path—generates a single set of composer metadata parameters for a given scene identified in the second list for the fixed length segment. Each image/frame in the scene can use the same set of composer metadata parameters to reconstruct HDR images from the reshaped SDR video images/frames decodable from the video signal generated from the multi-node video encoding operations.

Denote the total number of input images/frames in a segment as L and the total number of input images/frames in each bumper section as B. Denote an input image/frame at the i-th frame index in the sequence of input images/frames ("Mezzanine") as $f_i$.

The first node among the plurality of multiple nodes encodes the images/frames $f_0 \sim f_{L-1}$ that are in the first fixed length segment. The first fixed length segment has no left (or preceding) bumper section. The right (or succeeding) bumper section of the first fixed length segment spans an image/frame range $f_L \sim f_{L+B-1}$.

The N-th node or node-N among the plurality of multiple nodes encodes the images/frames $f_{(N-1)L} \sim f_{NL-1}$ that are in the N-th fixed length segment. The N-th fixed length segment has a left (or preceding) bumper section with input images/frames $f_{(N-1)L-B} \sim f_{(N-1)L-1}$ and a right (or succeeding) bumper section with input images/frames $f_{NL} \sim f_{NL+B-1}$.

The last node among the plurality of multiple nodes encodes the images/frames that are in the last fixed length segment. The last fixed length segment has only a left (or preceding) bumper section but has no right (or succeeding) bumper section. In addition, the last fixed length segment may have fewer than L input images/frames.

The plurality of nodes can be ordered, for example in a sequential order of node index/identifiers. For a node N, node N−1 is the left or preceding (or previous) neighbor. Node N+1 is the right or succeeding (or next) neighbor. Left nodes of N may include all the nodes from 0 to N−1. Right nodes of N may include all the nodes from N+1 to the last node.

Figure 2B:
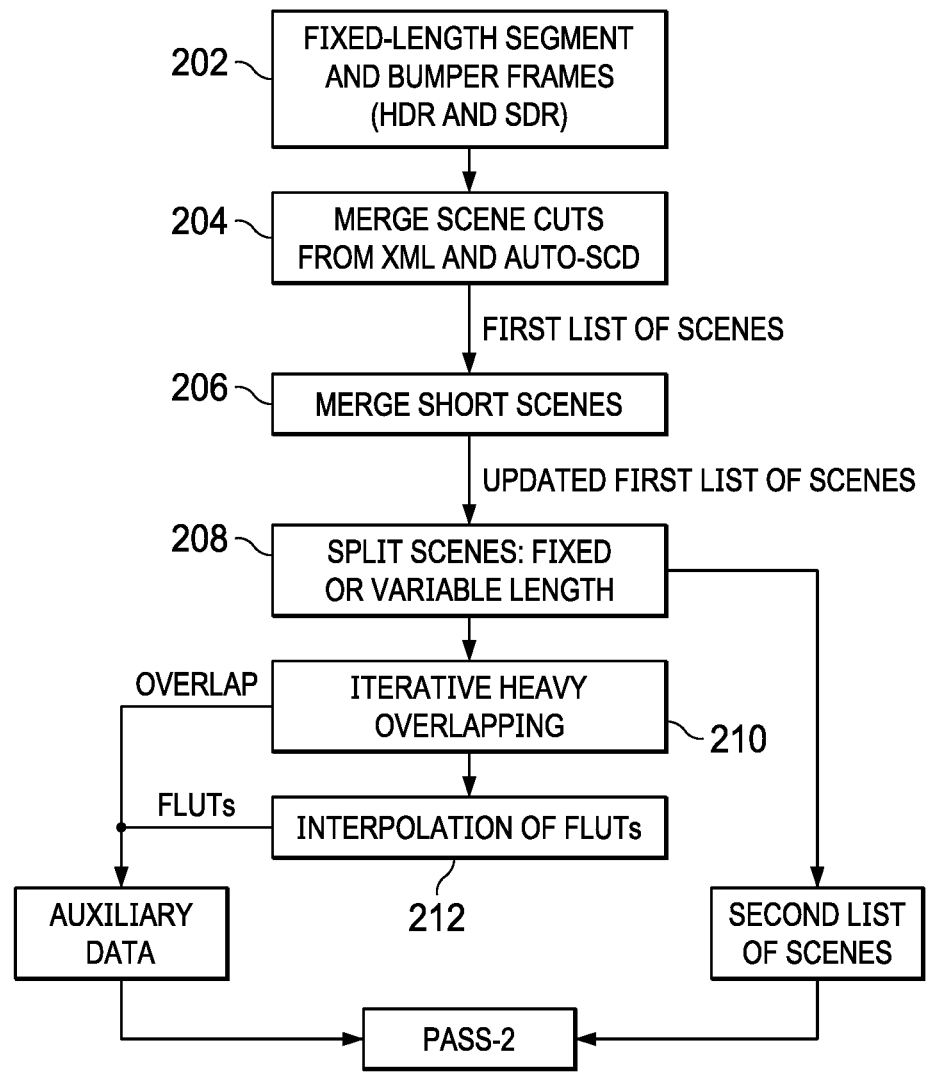
FIG. 2B illustrates an example process flow for performing tasks in the second pass of the two passes.

As illustrated in FIG. 2A, tasks in Pass-1, as performed by a node with respect to an assigned fixed length segment, may comprise preemptively avoiding violating the minimum and average distance constraints, splitting scenes on segment boundaries only, and generating auxiliary data ("Aux Data"), etc. FIG. 2B illustrates an example process flow for performing these tasks in Pass-1. An objective of these tasks of FIG. 2B is to generate or get a (second) list of scenes in the assigned segment that meet the minimum and average distance constraints/requirements. For scene cuts in the segment and the bumper section(s), only those scene cuts inside the segment will eventually be used by scene-based encoding (in Pass-2; not shown in FIG. 2B). The scene cuts in the bumper section(s) are still useful for maintaining temporal consistency (in Pass-2; not shown in FIG. 2B) with neighboring nodes or neighboring segments assigned to these nodes.

Referring to FIG. 2B, block 202 comprises receiving input images/frames in the assigned fixed length segment and section(s) of bumper frames preceding and/or succeeding the assigned fixed length segment.

Colorist-specified scene cuts can be read in from an XML file. Additionally, optionally or alternatively, an automatic scene cut detector identifies (e.g., possible, candidate, etc.) scene cuts or image/frame locations/indexes delineating the scene cuts.

Block 204 comprises merging these scene cuts from the colorists and the automatic detector to generate or get a first list of scenes for the segment.

Denote an optimal (e.g., selected, preconfigured, preferred, etc.) distance between two successive sets of fresh image metadata as $D_{opt}$. In some operational scenarios, the optimal distance may be given as follows:

$$D_{opt} = \max(D_{min}, D_{avg}) \quad (1)$$

Scenes that are smaller, or have fewer images/frames, than the optimal distance can be merged with the neighboring scenes until the combined scene becomes larger, or has more images/frames, than the optimal distance. This produces an updated first list of scenes, which may be referred to as primary scenes. At this point, every primary scene in the segment assigned to the node is larger, or has more input images/frames, than the optimal distance. Hence, the minimum and average distance constraints are already met then by the primary scenes identified in the updated first list of scenes.

Block 206 comprises splitting scenes by applying or performing a fixed or variable length scene splitting algorithm/method/process. In this block, primary scenes on segment boundaries (separating the segment from the bumper section(s)) are split into secondary scenes. The scene splitting algorithm/method/process may be implemented or performed in a manner that complies with, or intrinsically handles, the minimum distance constraint, but may violate the average distance requirement in the secondary scenes after primary scene splitting. MADC operations as described herein can be implemented or performed to prevent this violation even before it happens. These MADC operations can be used or implemented to estimate or establish a worse-case number represented with a maximum number of scenes that may be created in the assigned segment after scene splitting, such that the predicted worst-case number meet the average distance constraint. In operational scenarios in which the worse-case number does not meet or comply with the average distance constraint, a preemptive action may be taken to avoid or prevent such violation.

Block 208 comprises splitting the primary scenes on the segment boundaries into the secondary scenes (including but not limited to input images/frames in the bumper (frame) section(s)) using fixed-length or variable-length scene splitting techniques, as further adjusted by a possible preemptive action (if applicable). The secondary scenes can be added to the updated first list of scenes to generate or get a second list of scenes. This second list can then be provided to tasks in Pass-2 for scene-based encoding. The minimum and average distance constraints are already met at this point given the worst-case handling in which a preemptive action can be possibly performed to remedy any possible or potential violation of the average distance constraint.

Blocks 210 and 212 comprise respectively performing iterative heavy overlapping operations and interpolation of forward lookup tables (FLUTs)—for example with respect to input images/frames in the secondary scenes—for the purpose of achieving temporal consistency in a scene split among or between different nodes. These operations generate auxiliary data ("Aux data"), in addition to the second list of scenes, which may be used for forward reshaping the input images/frames in the secondary scenes.

Identifying Scene Cuts

As noted, scene cuts from a XML file and an automatic scene cut detector (Auto-SCD) can be merged to generate a first list of scenes containing scene cuts. These cuts constitute the first list of scenes.

For example, colorists and professional color graders can manually review a sequence ("Mezzanine") of (e.g., input, consecutive, etc.) images/frames containing a visual depiction of a number of scenes and detect candidate scene cuts (denoted as "XML Scene Cuts" or "XML Scene Cut" in FIG. 3B) in the sequence.

As illustrated in FIG. 3B, the XML scene cuts can be represented and stored in the XML file. A dashed vertical line indicates the first frame of a candidate scene represented in the XML file. Each node (e.g., Node-N, etc.) may read (e.g., only, inclusive of, etc.) a subset of XML scene cuts from the XML file. The subset of XML scene cuts may comprise XML scene cuts located in a (e.g., video, fixed-length, etc.) segment assigned to the node or in bumper section(s) immediately adjacent to the assigned segment.

Even though XML scene cuts are detected by the colorists, they may or may not be completely accurate. For grading purpose, sometimes colorists introduce scene cuts in the middle of a dissolving scene or at the start of fade in or fade out portion of a scene. These scene cuts may cause flashing (or false positive) and can be avoided or removed, for example by combining the XML scene cuts with automatic scene cut information-which identifies candidate scene cuts (denoted as "Automatic Scene Cuts" or "Automatic Scene Cut" in FIG. 3C) for the assigned segment-generated by the automatic scene cut detector (Auto-SCD).

The Automatic scene cut detector or Auto-SCD may use changes in luminance or brightness levels in the sequence of images/frames or different sub-sequences therein to detect a candidate scene change (or cut). This automatic detector may be oblivious or agnostic to dissolving, fade in or fade out parts of a video and hence can avoid the false positive problem in connection with the colorists. As illustrated in FIG. 3C, the automatic scene cuts generated by Auto-SCD can also be in the assigned segment or its bumper section(s).

However, the automatic detector may have its own false positive problem. Sometimes there are luminance or brightness changes within a scene due to camera panning, movements, occlusions etc. These luminance or brightness changes may be falsely detected as automatic scene cuts by Auto-SCD. To discard or remove these false positives, the candidate scene cuts from the XML file and Auto-SCD can be merged, for example in block 206 of FIG. 2B.

Merging XML and Automatic Detections

Figure 3D:
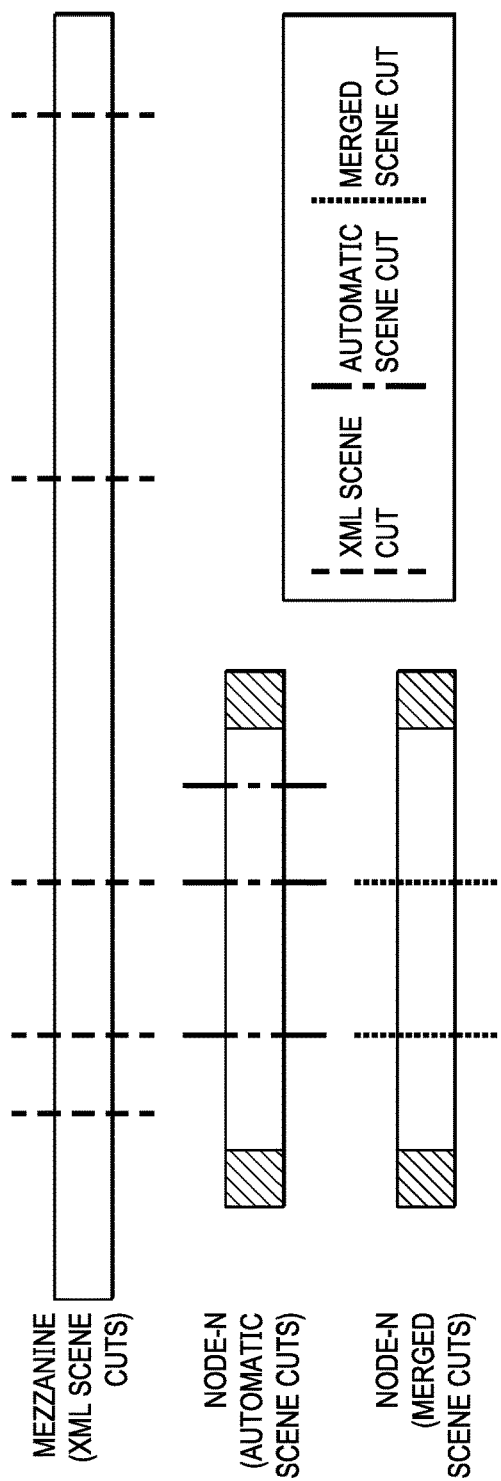
FIG. 3D illustrates example merged scene cuts.

Let $\Psi N_{XML}^N$ denote the set of frame indices each of which represents a scene start frame of a respective XML scene cut in a plurality of XML scene cuts (as illustrated in FIG. 3B and FIG. 3D) in the assigned segment and its bumper section(s) provided to node N (or Node-N), where the subscript indicates that these scene start frames are read from or represented in the XML file.

Similarly, let $\Psi_{Auto-SCD}^N$ denote the set of frame indices each of which represents a scene start frame of a respective automatic scene cut in a plurality of automatic scene cuts (as illustrated in FIG. 3C and FIG. 3D) in the assigned segment and its bumper section(s) provided to node N (or Node-N), where the subscript indicates that these scene start frames are detected by Auto-SCD.

Merging the XML and automatic scene cuts from these two sets is equivalent to taking the intersection of these two sets, as follows:

$$\Psi_1^N = \Psi_{XML}^N \cap \Psi_{AutoSCD}^N \qquad (2)$$

where $\Psi_1^N$ represents the first list of scene cuts (or scenes; denoted as "Merged Scene Cuts" in FIG. 3D) for the node N (or Node-N).

Short Scene Merging

The first list of scenes may contain scene cuts that are closer than the optimal distance. These short scenes may be merged to ensure a scene has more images/frames than the optimal distance. For example, in set $\Psi_1^N$, if two neighboring scene cuts are at frames $f_i$ and $f_j$, with $|j-i|<D_{opt}$, then one of the scene cuts can be removed to avoid any constraint violation. Removing a scene cut is equivalent to merging a scene with its neighbor (or neighboring scene).

To facilitate segmented processing across multiple nodes, a scene cut removal strategy can be designed, implemented or performed to obtain or achieve consistent results across different neighboring nodes that receives overlapping input images/frames.

Figure 3E:
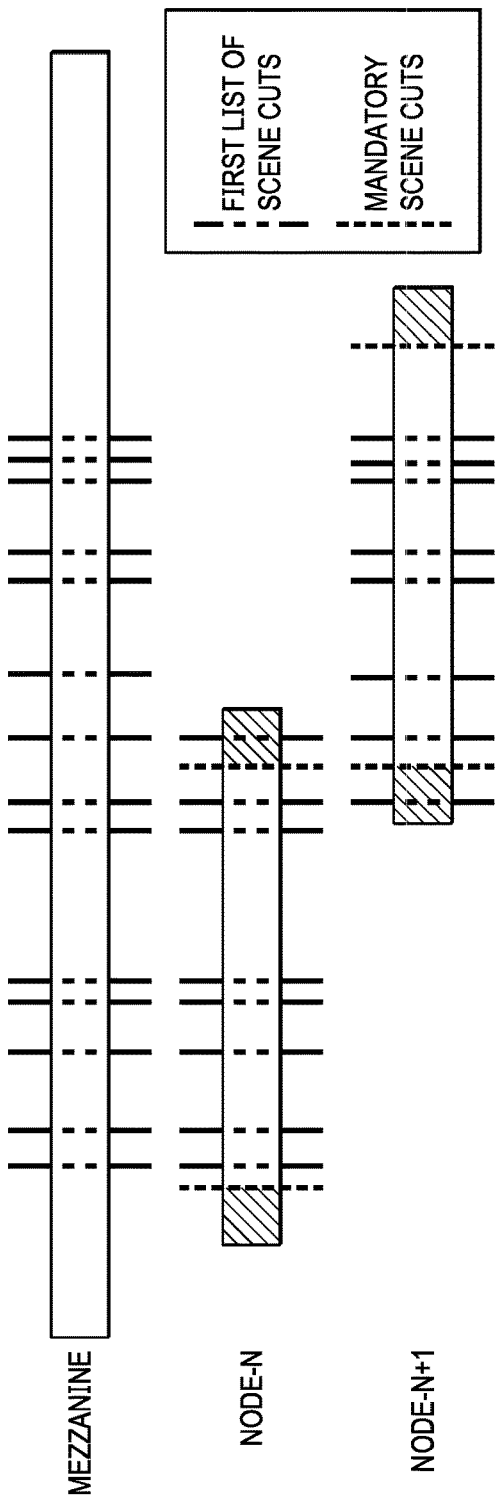
FIG. 3E illustrates an example first list of scenes and mandatory scene cuts.

FIG. 3E illustrates an example first list of scenes $\Psi_1^N$ in the sequence of input images/frames ("Mezzanine") as well as mandatory scene cuts in two neighboring nodes N and N+1. For each of the two nodes N and N+1, scene cuts derived from the first list of scenes are indicated by dashed vertical lines, whereas mandatory scene cuts occurring at segment boundaries are indicated by solid vertical lines. As shown, the scene cuts in the common regions ($f_{NL-B}$~$f_{NL+B-1}$) of nodes N and N+1 are perfectly aligned.

A simple technique to remove short scene cuts is to traverse the segment and its bumper section(s) from left to right (or alternatively right to left) and remove any scene cut that (e.g., first found to, etc.) violates the optimal distance. However, this simple strategy may not be able to maintain perfect alignment of the resultant scene cuts in the common region for the two neighboring nodes N and N+1.

Figure 3F:
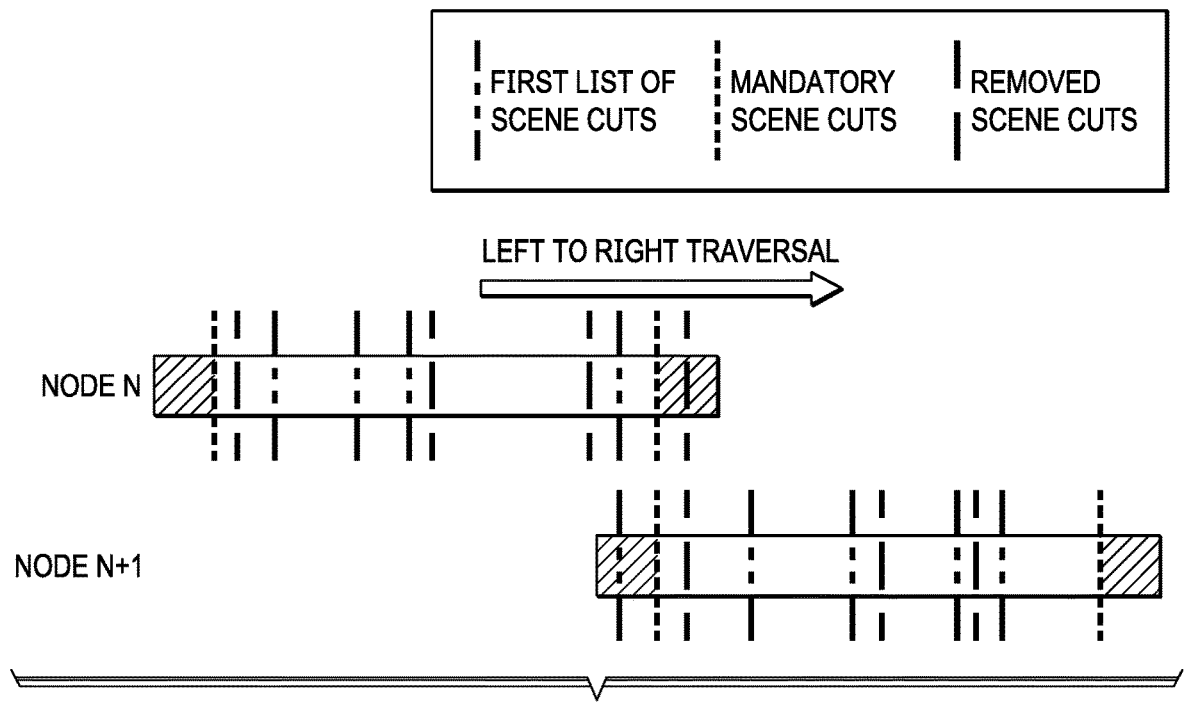
FIG. 3F illustrates example scene cuts after removing short scene cuts first encountered in a single traversal direction approach.

FIG. 3F illustrates example scene cuts after removing short scene cuts first encountered in a single traversal direction approach. As shown, resultant scene cuts in the common regions of nodes N and N+1 are misaligned. While node N removes both the scene cuts in the common region on both sides of the solid vertical line, node N+1 removes only one of these two scene cuts on only one side of the solid vertical line. As a result of using different scene cuts in the common region, temporal inconsistency can be generated in base layer video data of the video signal encoded by the multiple nodes including these two neighboring nodes N and N+1.

Figure 3G:
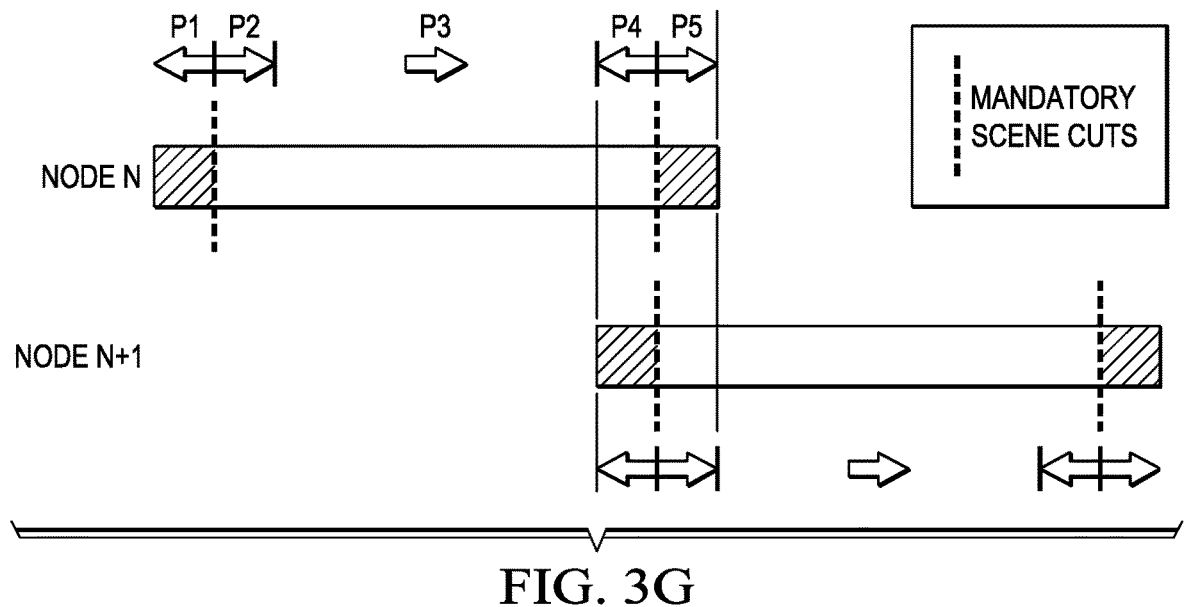
FIG. 3G and FIG. 3H illustrate example operations and scene cuts after removing short scene cuts in a multi-traversal-direction approach.

A better approach can be used or implemented to cause a node (e.g., node N) to traverse images/frames in multiple directions as illustrated in FIG. 3G. As shown, under this approach, traversing images/frames by a node—e.g., any of the two neighboring nodes N or N+1—starts at the same location in the common region and move in the same direction in both nodes. In other words, the same traversal (process) is replicated or implemented in the two neighboring nodes with respect to the common region. More specifically, input images/frames in the segment and its bumper section(s) provided to the node (node N in the present example) can be partitioned into five portions P1 through P5 with their respective traversal directions as indicated in FIG. 3G.

P1 represents a preceding bumper section, if any, of the segment. P2 represents a first sub-segment (of the assigned segment) overlapping with a trailing bumper section of a previous segment assigned to a previous node (node N−1 in the present example; not shown in FIG. 3G). P3 represents a second sub-segment (of the assigned segment) not overlapping with any input images/frames provided to either the previous node (node N−1) or the subsequent node (node N+1). P4 represents a third sub-segment (of the assigned segment) overlapping with a leading (or previous) bumper section of a subsequent segment assigned to the subsequent node (node N+1 in the present example). P5 represents a trailing (or subsequent) bumper section, if any, of the segment.

Figure 2C:
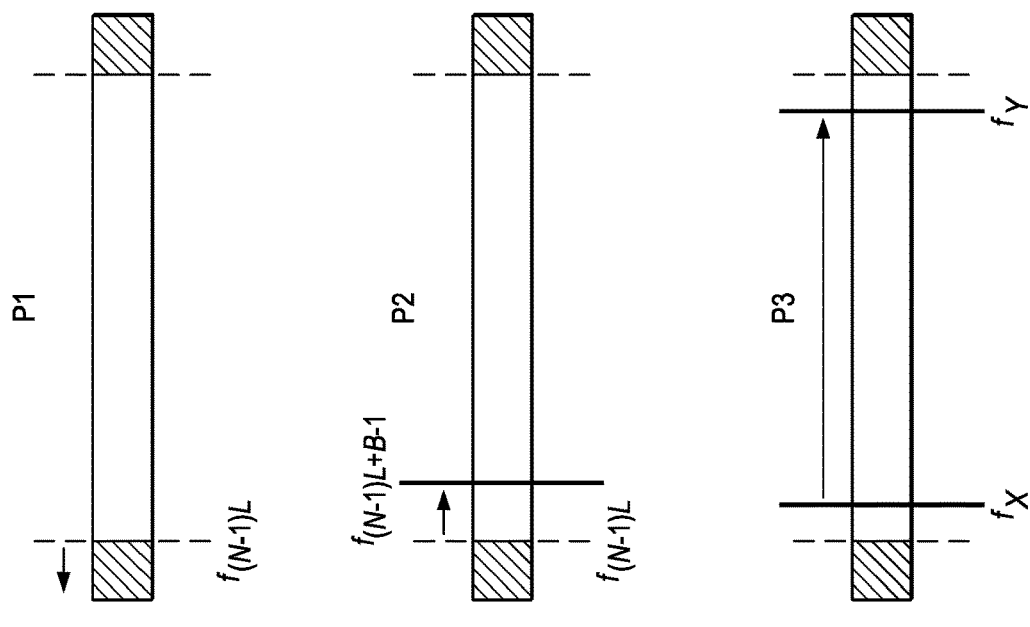
FIG. 2C illustrates an example process flow for a node to traverse input images/frames.
Figure 2C:
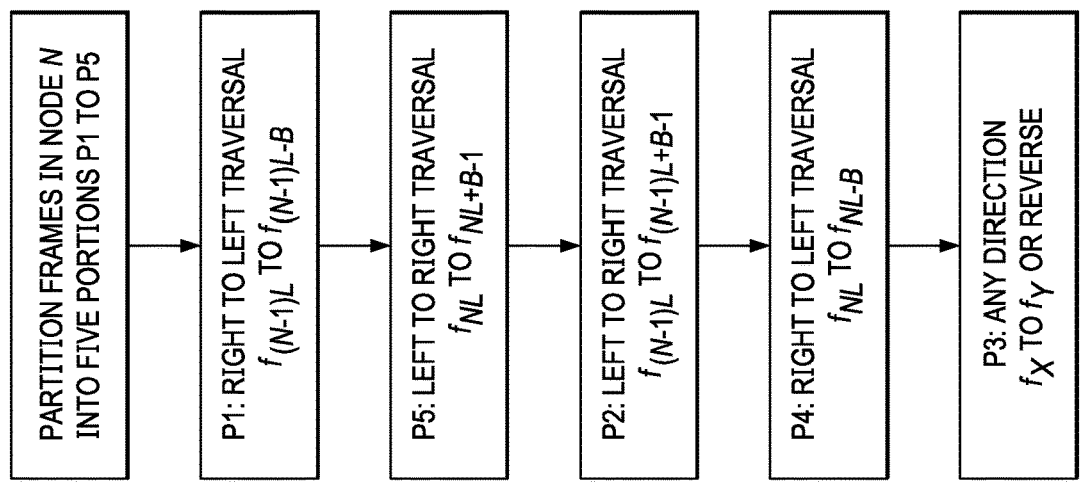
Figure 2C:
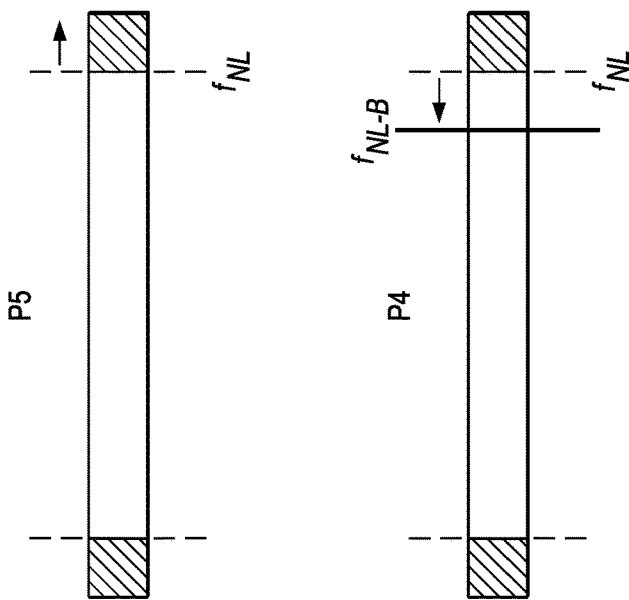

FIG. 2C illustrates an example process flow for a node (e.g., Node-N, etc.) to traverse input images/frames of a segment assigned to the node and bumper section(s).

In P4, the traversal starts moving from a mandatory scene cut ($f_{NL}$) at the end of the segment from right to left until reach the first frame ($f_{NL-B}$) in a common region shared between the node and the subsequent node (node N+1 in the present example). Short scenes are merged along the way (whenever first encountered). The same traversal (or path) is followed or replicated by node N+1.

In P5, the traversal starts moving at the mandatory scene cut ($f_{NL}$) from left to right towards the last frame ($f_{NL+B-1}$) in the trailing (or right) bumper section. The same traversal (or path) is followed or imitated/replicated in node N+1.

Similar strategy can be followed by node N in traversing P1 and P2, so that these traversals in P1 and P2 by node N mirror or follow the same traversals by node N−1 in the same overlapping input images/frames of P1 and P2. More specifically, the traversal in P1 goes from $f_{(N-1)L}$ to $f_{(N-1)L-B}$, whereas the traversal in P2 goes from $f_{(N-1)L}$ to $f_{(N-1)L+B-1}$.

The traversal P3 can be made after scene cuts in P2 and P4 are completely resolved by the traversals in P2 and P4, and can make use of information about the scene cuts in P2 and P4. As input images/frames in P3 are not common to input images/frames assigned to either previous or next node, the traversal in P3 can go in any direction. For instance, the traversal in P3 may be (e.g., additionally, alternatively, optionally, etc.) the same as illustrated in FIG. 3G from left to right, which starts at the last intact scene cut ($f_X$ such that $f_{(N-1)L} \leq f_X \leq f_{(N-1)L+B-1}$) in P2 and ends at the first intact scene cut ($f_Y$ such that $f_{NL} \geq f_Y \geq f_{NL-B}$) in P4. In other words, the traversal in P3 by node N starts at the last intact scene cut in P2, moves towards right, and ends at the first intact scene cut in P4.

Figure 3H:
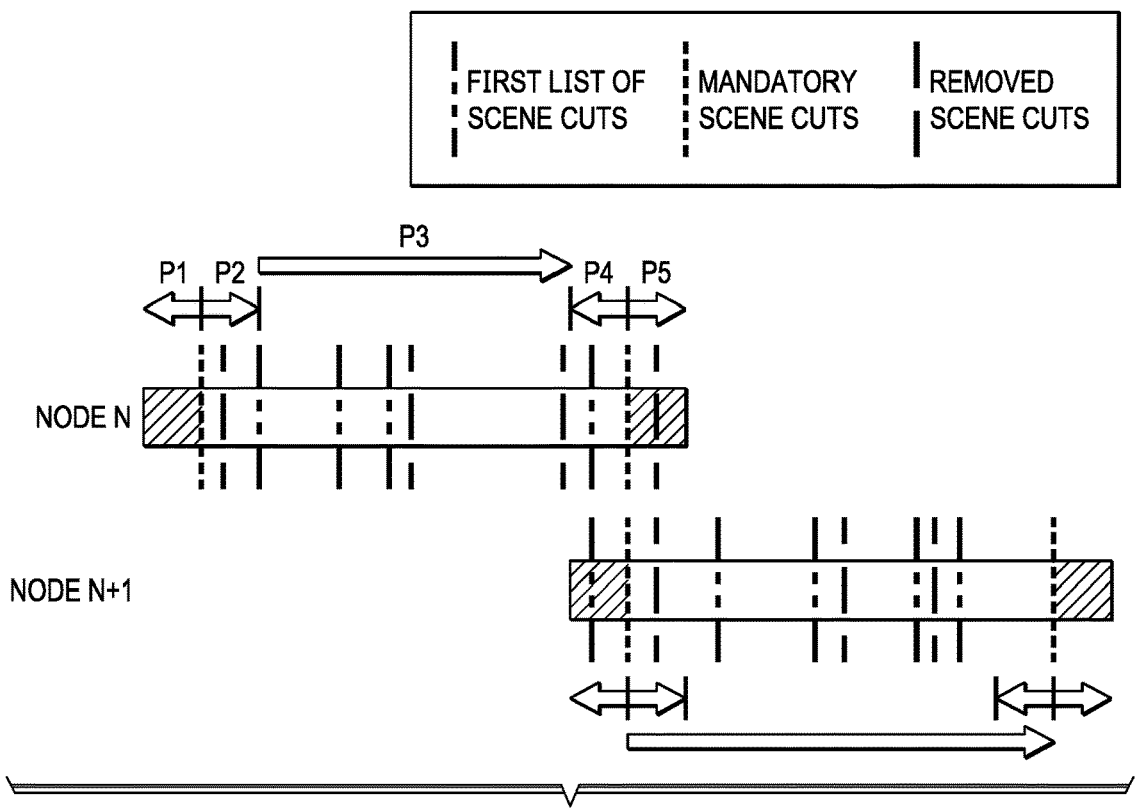

Short scenes encountered in the traversals are merged on the way. The merging process generates an updated list of scene cuts denoted $\Psi_1^N$, as illustrated in FIG. 3H. The total number of images/frames in the i-th primary scene belonging to this updated list is denoted by $\mathcal{F}_{PS}^i$, where $\mathcal{F}_{PS}^i \geq D_{opt} \forall i$ in the updated list $\Psi_1^N$.

For the example distribution of scene cuts illustrated in FIG. 3E, primary scenes in the updated list of scene cuts following short scene merging are illustrated in FIG. 3H by applying the multi-directional traversal strategy or process flow as illustrated in FIG. 2C. The same scene cuts are removed in the common region of nodes N and N+1. Alignment of scene cuts is hence preserved across different neighboring nodes and provide temporal stability in scenes that overlap common sections between or among the different neighboring nodes.

The same scene merging procedure can be followed by each node of the multiple nodes in the multi-node video coding system in the common region. As a result, the update list of scenes generated by short scene merging from the first list of scenes maintains the optimal distance between any two neighboring scene cuts that separate scenes.

Preemptive Measures to Meet the Average Distance Constraint

At this point every primary scene identified in the updated list $\Psi_1^N$ has at least $D_{opt}=\max(D_{min}, D_{avg})$ images/frames. In other words, the minimum and average distance constraints are met with $\Psi_1^N$.

For temporal consistency, primary scenes on (or overlapping) segment boundaries are split. This splitting results in creating additional scenes and leads to possible constraint violation with respect to the minimum and average distance constraints. Preemptive measures or actions as described herein can be taken to prevent such constraint violation.

In some operational scenarios, preemptive measures or actions can be taken by applying fixed length (primary) scene splitting operations to primary scenes on segment boundaries to generate secondary scenes (or subscenes).

Denote a default length of the j-th secondary scene-which may be referred to subscene—as $\mathcal{F}_{SS}^j$, where $\mathcal{F}_{SS}^j \geq D_{min} \forall j$, which alternatively may be expressed as $\mathcal{F}_{SS} \geq D_{min}$, by dropping the superscript j for simplicity. Hence the (fixed length) scene splitting operations fulfil or comply with the minimum distance constraint by design. It should be noted that any other primary scene in the segment-which is not on any of the segment boundaries—already meet both the minimum and average distance constraints, as such primary scene has a total number of images/frames greater than or equal to $D_{opt}$ images/frames.

Figure 3I:
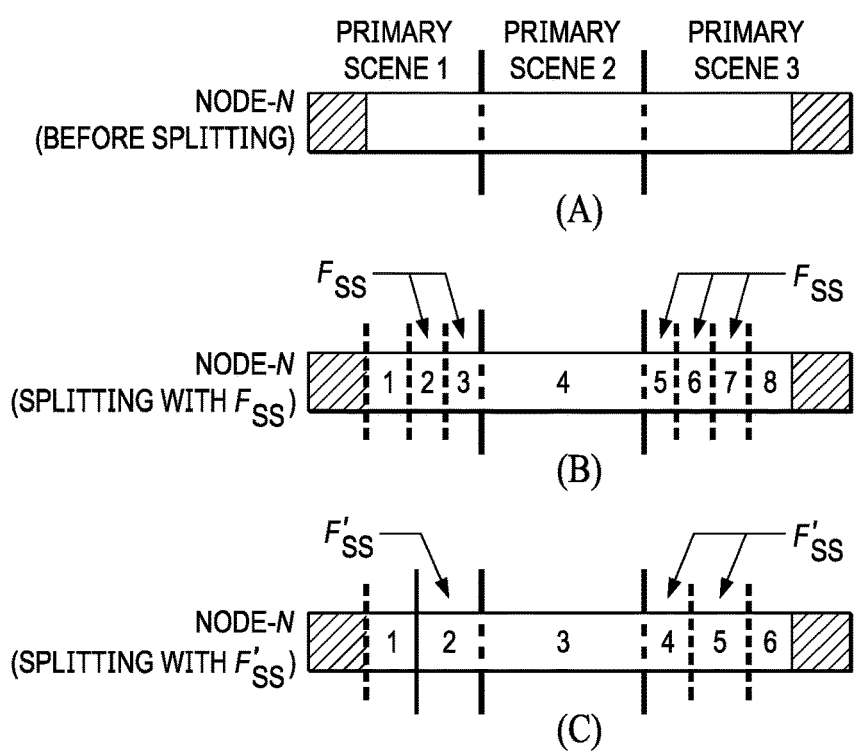
FIG. 3I illustrates example fixed length scene splitting.

However, the scene splitting operations increase the total number of scenes in the segment and hence may lead to average distance constraint violation. FIG. 3I illustrates example fixed length scene splitting of three primary scenes covering a segment and its bumper sections. Suppose the maximum allowed number of scenes—exclusive of its bumper sections—in the segment is six (6) for the purpose of complying with the average distance constraint by video encoding operations of the segment by a node in a multi-node encoding system.

As illustrated in FIG. 3I (b), given the default subscene length of $\mathcal{F}_{SS}$ frames, eight (8) scenes may be generated in the segment in a worst case scenarios after applying the fixed length scene splitting operations to primary scenes 1 and 3 on segment boundaries of the segment.

To respect or comply with the allowed limit of 6 scenes, the default secondary subscene length can be increased to $\mathcal{F}_{SS}'$ for the purpose of reducing the total number of subscenes generated from applying the fixed length scene splitting operations to split primary scenes on the segment boundaries.

As illustrated in FIG. 3I (c), having larger subscenes is equivalent to having fewer subscenes. As will be further explained in detail later, subscenes include anchor subscenes (e.g., subscenes 1 and 8 in FIG. 3I (b), subscenes 1 and 6 in FIG. 3I (c), etc.), which may be given a constant length (or total number) of images/frames such as $D_{min}$.

As a part of the fixed-length scene splitting operations, a worst-case total number of scenes after scene splitting can be estimated and used as a reliable indicator of possible average distance constraint violation.

More specifically, in cases in which the worst-case total number of scenes is still no more than the maximum allowed number of scenes in the segment derived from the average distance constraint, then do nothing. For example, the updated default minimum size $\mathcal{F}_{SS}'$ for a secondary scene (or subscene) can remain the same as the initial default size: $\mathcal{F}_{SS}' = \mathcal{F}_{SS}$.

On the other hand, in cases in which the worst-case total number of scenes is greater than the maximum allowed number of scenes in the segment derived from the average distance constraint, then increase the default size of secondary scenes (or subscenes) to reduce the total number of new secondary scenes—generated from the primary scenes on the segment boundaries—after scene splitting. As noted, both the minimum and average distance constraints are already met or complied with by (non-boundary) primary scenes not on any segment boundary. Increasing the default size of subscenes generated after splitting to a suitable size/length (or a suitable total number of images/frames) ensures that the minimum and average distance constraints are satisfied everywhere in the segment.

Figure 2D:
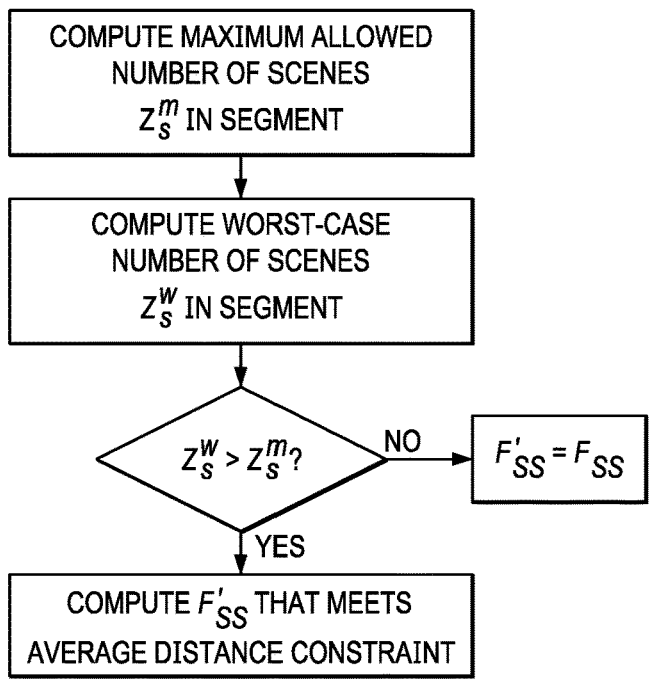
FIG. 2D illustrates an example process flow for preemptive measures to avoid average distance constraint violation.

FIG. 2D illustrates an example process flow for preemptive measures (or treatment) to avoid average distance constraint violation. Preemptive treatment as described herein entails changing the default minimum length of subscene from $\mathcal{F}_{SS}$ to some new length $\mathcal{F}_{SS}'$. More specifically, the maximum allowed number $Z_s^m$ of scenes in a segment is computed. The worst-case total number $Z_s^w$ of scenes in the segment is also estimated or computed with an initial value of the default minimum length $\mathcal{F}_{SS}$ of subscene. It is then determined whether the worst-case total number $Z_s^w$ is no more than the maximum allowed number $Z_s^m$. In response to determining that the worst-case total number $Z_s^w$ is no more than the maximum allowed number $Z_s^m$, the initial value of the default minimum length $\mathcal{F}_{SS}$ of subscene is kept or used to split primary scenes on segment boundaries of the segment. On the hand, in response to determining that the worst-case total number $Z_s^w$ is more than the maximum allowed number $Z_s^m$, the default minimum length $\mathcal{F}_{SS}$ of subscene is changed from the initial value to a larger value $\mathcal{F}_{SS}'$—in place of the initial value of the default minimum length $\mathcal{F}_{SS}$—to split primary scenes on segment boundaries of the segment such that the total number of resultant secondary scenes plus the total number of primary scenes not on any segment boundary in the segment is no more than the maximum allowed number $Z_s^m$.

The process flow may implement a minimum length adjustment algorithm to ingests or receive one or more input parameters and produce a single output as the new minimum length $\mathcal{F}_{SS}$ of subscene.

More specifically, suppose that there are $Z_n$ primary scenes identified in the updated first list of scenes $\Psi_1^N$ for a segment assigned to node N, where the primary scenes are respectively indexed as $\{0, 1, \ldots, Z_n-1\}$ and respectively denoted as $\{P_0, P_1, \ldots P_{Z_n-1}\}$.

For the purpose of illustration only, a primary scene on the left segment boundary of the segment has an index l, whereas a primary scene on the right segment boundary of the segment has an index r. Hence, there are $Z_s = r-l+1$ primary scenes in the segment of node N.

As noted, the worst-case total number $Z_s^w$ of scenes in the segment after scene splitting can be estimated as well as the maximum allowed number of scenes in the segment can be computed as $$Z_s^m = \left\lfloor \frac{L}{D_{avg}} \right\rfloor,$$

where $\lfloor \cdot \rfloor$ is the floor function (or operator) that selects an integer value immediately at or below the value bracketed by the function, and L is the length of the segment.

In response to determining that $Z_s^w > Z_s^m$, the following changes can be made to the default length (or the initial value of the minimum length) $\mathcal{F}_{SS}$ of secondary scene to a new larger value $\mathcal{F}_{SS}'$ to ensure that average distance constraint is met or complied with after scene splitting. The following cases (in which $Z_s^w > Z_s^m$) may be handled in the minimum length adjustment algorithm.

Case 1: (a) the segment is the first segment in a sequence of images/frames processed by multiple nodes of the multi-node video encoding system, and (b) the total number of primary scenes identified by the updated list of scenes in the (first) segment are more than one (1), or $Z_s > 1$.

In this case, as the first primary scene $P_l$ on the left segment boundary is entirely contained in the first segment, there is no need to split the first primary scene. The total number of scenes $Z_s^w$ after splitting only the last primary scene $P_r$ on the right boundary of the (first) segment in a worst-case scenarios with the initial value of the minimum length $\mathcal{F}_{SS}$ (or $D_{min}$) is given as follows:

$$Z_s^w = Z_s - 1 + \left\lfloor \frac{\mathcal{F}_{P_r}}{D_{min}} \right\rfloor \tag{3}$$

where $\mathcal{F}_{P_r}$ represents the total number of images/frames in the (last) primary scene on the right boundary of the (first) segment.

Denote the maximum number of secondary scenes allowed in the (last) primary scene—if the average distance constraint is satisfied by these secondary scenes—as $$Z_{P_r}^m = \left\lfloor \frac{\mathcal{F}_{P_r}}{D_{avg}} \right\rfloor.$$

In order to bring the worst-case total number of scenes $Z_s^w$ no more than the maximum allowed number of scenes $Z_s^m$, the default minimum size of secondary scene can be increased to $\mathcal{F}_{SS}'$, as follows:

$$\mathcal{F}_{SS}' = \max\left(\left\lceil \frac{\mathcal{F}_{P_r} - D_{min}}{Z_{P_r}^m - 1} \right\rceil, D_{min}\right) + 1 \tag{4}$$

As noted, anchor subscenes may be used to facilitate or ensure temporal consistency across different segments processed by different nodes. Every primary scene located on a segment boundary may be assigned or provided with one anchor subscene of length $D_{min}$. For that reason, in expression (4) above, $D_{min}$ is subtracted from the total number of frames $\mathcal{F}_{P_r}$ in the (last) primary scene, which is then divided by $Z_{P_r}^m - 1$ to account for the anchor subscene in the (last) primary scene.

In operational scenarios in which $Z_{P_r}^m = 1$, the new value of the minimum length for subscene may be given as follows:

$$\mathcal{F}_{SS}' = D_{opt} + 1 \tag{5}$$

Given the short scene merging (e.g., in block 206 of FIG. 2B, etc.), a primary scene including the last primary scene here should have more images/frames than both the minimum and average distances. Hence $Z_{P_r}^m$ is at least one. It should be noted that the change in the minimum length/size applies to the segment. Whether any changes are needed or not in any other segments are individually decided for these other segments.

Case 2: (a) the segment is the last segment in a sequence of images/frames processed by multiple nodes of the multi-node video encoding system, and (b) the total number of primary scenes identified by the updated list of scenes in the (last) segment are more than one (1), or $Z_s > 1$.

In this case, as the primary scene on the right segment boundary is entirely contained in the (last) segment, there is no need to split this last primary scene. Only the first primary scene on the left segment boundary (or left end) of the (last) segment is split. The total number of scenes $Z_s^w$ after splitting only the first primary scene $P_l$ on the left boundary of the (last) segment in a worst-case scenarios with the initial value of the minimum length $\mathcal{F}_{SS}$ (or $D_{min}$) is given as follows:

$$Z_s^w = Z_s - 1 + \left\lfloor \frac{\mathcal{F}_{P_l}}{D_{min}} \right\rfloor \quad (6)$$

where $\mathcal{F}_{P_l}$ represents the total number of images/frames in the (first) primary scene on the left boundary of the (last) segment.

Denote the maximum number of secondary scenes allowed in the (first) primary scene—if the average distance constraint is satisfied by these secondary scenes—as $$Z_{P_l}^m = \left\lfloor \frac{\mathcal{F}_{P_l}}{D_{min}} \right\rfloor.$$

In order to bring the worst-case total number of scenes $Z_s^w$ no more than the maximum allowed number of scenes $Z_s^m$, the default minimum size of secondary scene can be increased to $\mathcal{F}_{SS}'$, as follows:

$$\mathcal{F}_{SS}' = \max\left(\left\lfloor \frac{\mathcal{F}_{P_l} - D_{min}}{Z_{P_l}^m - 1} \right\rfloor, D_{min}\right) + 1 \quad (7)$$

As noted, anchor subscenes may be used to facilitate or ensure temporal consistency across different segments processed by different nodes. Every primary scene located on a segment boundary may be assigned or provided with one anchor subscene of length $D_{min}$. For that reason, in expression (7) above, $D_{min}$ is subtracted from the total number of frames $\mathcal{F}_{P_l}$ in the (last) primary scene, which is then divided by $Z_{P_l}^m - 1$ to account for the anchor subscene in the (first) primary scene.

In operational scenarios in which $Z_{P_l}^m = 1$, the new value of the minimum length for subscene may be given in expression (5) above.

Given the short scene merging (e.g., in block 206 of FIG. 2B, etc.), a primary scene including the first primary scene here should have more images/frames than both the minimum and average distances. Hence $Z_{P_l}^m$ is at least one.

Case 3: (a) the segment is an interior segment in a sequence of images/frames processed by multiple nodes of the multi-node video encoding system, and (b) the total number of primary scenes identified by the updated list of scenes in the (interior) segment is one (1), or $Z_s = 1$.

With only one primary scene in the current segment, the worst-case total number of scenes in the segment is as follows.

$$Z_s^w = \left\lfloor \frac{L}{D_{min}} \right\rfloor \quad (8)$$

In order to bring $Z_s^w$ below or equal to $Z_s^m$, the default size (or minimum length) of secondary scene can be increased to $\mathcal{F}_{SS}'$, as follows:

$$\mathcal{F}_{SS}' = \max\left(\left\lfloor \frac{L - 2 \times D_{min}}{Z_s^m - 2} \right\rfloor, D_{min}\right) + 1 \quad (9)$$

This primary scene can be assigned or provided with two anchor subscenes. Adjustments are accordingly made in expression (9) above.

When $Z_s^m \leq 2$, then:

$$\mathcal{F}_{SS}' = D_{opt} + 1 \quad (10)$$

Case 4: (a) the segment is an interior segment in a sequence of images/frames processed by multiple nodes of the multi-node video encoding system, and (b) the total number of primary scenes identified by the updated list of scenes in the (interior) segment is greater than one (1), or $Z_s > 1$.

There are two primary scenes respectively on the two segment boundaries of the segment. The maximum number of subscenes in the first primary scene is $$Z_{P_l}^m = \left\lfloor \frac{\mathcal{F}_{P_l}}{D_{min}} \right\rfloor,$$

whereas the maximum number of subscenes in the last primary scene is $$Z_{P_r}^m = \left\lfloor \frac{\mathcal{F}_{P_r}}{D_{min}} \right\rfloor.$$

The worst-case total number of scenes can be derived as follows:

$$Z_s^w = Z_s - 2 + \left\lfloor \frac{\mathcal{F}_{P_l}}{D_{min}} \right\rfloor + \left\lfloor \frac{\mathcal{F}_{P_r}}{D_{min}} \right\rfloor \quad (11)$$

The default size (or minimum length) of secondary scene can be increased to $\mathcal{F}_{SS}'$, as follows:

$$\mathcal{F}_{SS}' = \max\left(\left\lfloor \frac{\mathcal{F}_{P_l} - D_{min}}{Z_{P_l}^m - 1} \right\rfloor, \left\lfloor \frac{\mathcal{F}_{P_r} - D_{min}}{Z_{P_r}^m - 1} \right\rfloor, D_{min}\right) + 1 \quad (12)$$

When $Z_{P_l}^m \leq 1$ and/or $Z_{P_r}^m \leq 1$, the corresponding terms in expression (12) above may be replaced by $D_{opt}$. More specifically, if $Z_{P_l}^m \leq 1$, then $$\left\lfloor \frac{\mathcal{F}_{P_l} - D_{min}}{Z_{P_l}^m - 1} \right\rfloor$$

is replaced by $D_{opt}$. If $Z_{P_r}^m \leq 1$, then $$\left\lfloor \frac{\mathcal{F}_{P_r} - D_{min}}{Z_{P_r}^m - 1} \right\rfloor$$

is replaced by $D_{opt}$.

Preemptive measures as described herein produce a new default (or minimum) length $\mathcal{F}_{SS}$ for secondary scene. Every secondary scene has at least $\mathcal{F}_{SS}'$ images/frames, except anchor subscenes. The new default (or minimum) length ensures compliance with the average distance constraint even in the worst-case scenario.

Secondary Scene Cuts

FIG. 3J illustrates an example distribution of primary scenes in relation to a segment assigned to a node (e.g., node N, etc.). These primary scenes may be delineated with merged scene cuts after (e.g., short scene, etc.) merging operations. As shown, primary scene 2 is entirely in the segment, and hence can be processed entirely by node N (e.g., with Pass-2 operations of FIG. 2A, etc.). In contrast, primary scenes 1 and 3 are on segment boundaries of the segment. These primary scenes on segment boundaries, which may be referred to as parent scenes, are distributed across multiple nodes and processed by those nodes independently. Special handling may be implemented for primary scenes 1 and 3 to ensure consistent look in boundary images/frames that are encoded by different nodes.

FIG. 3K illustrates an example (simple) scenario in which a parent scene P is distributed across two (adjacent) nodes: node N and N+1, both of which may have access to only respective parts (or respective subsets or windows of the total number of images/frame) of the parent scene to generate forward reshaping statistics. These respective parts of the parent scene may be referred to as forward reshaping statistics windows, as illustrated in FIG. 3K.

In operational scenarios in which these two nodes process and encode their respective portions of the parent scene (without including bumper images in the respective portions), reshaping parameters are computed on different subsets or windows of images/frames of the parent scene. As a result, reshaped SDR images encoded in the video signal and reconstructed EDR generated by applying backward reshaping with composer metadata to the reshaped SDR images—at least for the last image/frame ($f_{(N+1)L-1}$) in the (preceding) segment of node N and the first image/frame ($f_{(N+1)L}$) in the (subsequent) segment of node N+1—may look visually different. Such a visual difference can be manifested in the form of flickering, flashing and sudden brightness change, and referred to as temporal inconsistency across different nodes. Reasons for such temporal inconsistencies are at least partly due to a lack of common images/frames in the forward reshaping statistics windows or portions of images/frames used by the two adjacent nodes to compute forward reshaping statistics and reshaping parameters.

FIG. 3L illustrates example provision/inclusion of bumper images/frames in forward reshaping statistics windows used by nodes to compute forward reshaping statistics and reshaping parameters. These bumper images/frames can be used to compute, generate or complement reshaping statistics used for generating operational parameters of reshaping operations and composer metadata. These operational parameters enable reshaping operations to generate reshaped SDR images and reconstructed HDR images to be implemented or performed with relatively smooth transition across nodes.

Each of the bumper sections may comprise a small total number of images/frames—as compared with the total number of images/frames in the parent scene—that may not be enough to ensure temporal consistency without additional handling.

To solve problems relating to temporal inconsistency and small numbers of images/frames in bumper sections, received/provided portions of the parent scene on nodes N and N+1 can be split into secondary scenes (or subscenes), as illustrated in FIG. 3M. Even if reshaping statistics in a (e.g., parent, primary, etc.) scene may change significantly from start of the scene to end of the scene, reshaping statistics may not change much (e.g., not sufficient to cause perceptible visual artifacts, etc.) from one frame to the next.

Secondary scenes as described herein represent relatively small neighborhoods (or relatively small sub-portions of consecutive images/frames in the primary scene) from which forward reshaping statistics can be generated for the purpose of evaluating or generating reshaping parameters for forward and backward reshaping. Since the reshaping parameters computed with forward reshaping statistics windows in the subscenes do not change much (e.g., not sufficient to cause perceptible visual artifacts, etc.) from one subscene to the next, scene splitting helps achieve temporal consistency. It should be noted that neighboring subscenes as described herein can be on the previous/next node as well.

Scene splitting creates additional scenes and increase the bitrate used to transmit composer metadata. A goal is to achieve temporal consistency using a minimum number of scene splits to help keep the bitrate for composer metadata bitrate relatively low. As noted, the minimum and average distance constraints have to be honored complied with after (e.g., finalized, adopted, etc.) scene splitting. Bumper images/frames and anchor subscenes can play a relatively significant role in guaranteeing a smooth visual transition from images/frames encoded by a given node to frames encoded by the next node to the given node.

Figure 3N:
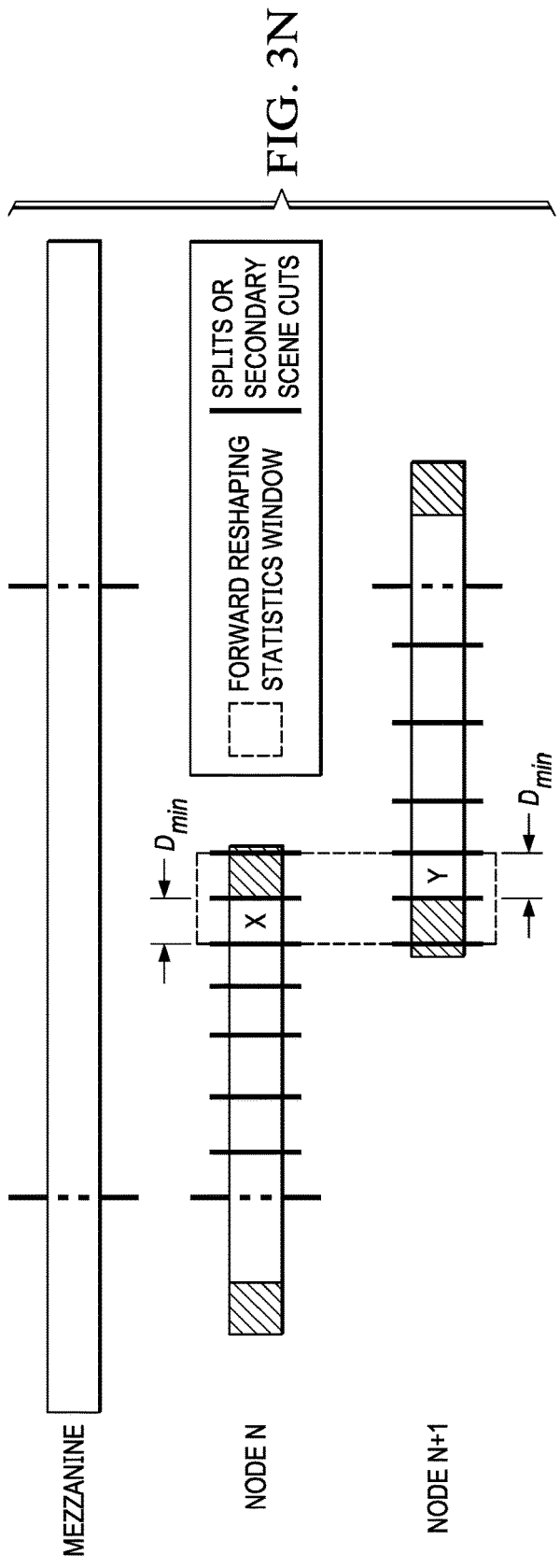
FIG. 3N illustrates example anchor subscenes.

FIG. 3N illustrates example primary scenes in which anchor subscenes are incorporated to provide or support temporal consistency across different adjacent nodes. As shown, a parent scene P (in a sequence of input images/frames of an input video signal "Mezzanine") spans two or more nodes. Anchor subscenes X and Y are assigned or allocated before scene splitting operations commence in the primary scenes on nodes N and N+1. Each of the anchor subscenes has $D_{min}$ images/frames. Hence, anchor subscene X spans a first frame index range $f_{NL-D_{min}} \sim f_{NL-1}$, whereas anchor subscene Y spans a second frame index range $f_{NL} \sim f_{NL+D_{min}-1}$. Both anchor subscenes X and Y use all the images/frames in the combined region of anchor subscenes X and Y to compute forward reshaping statistics and composer metadata. The combined region spans a combined frame index range $f_{NL-D_{min}} \sim f_{NL+D_{min}-1}$. AS a result, exactly same forward reshaping parameters for forward reshaping and backward reshaping parameters (or composer metadata) for backward reshaping are computed by each of nodes N and N+1. Therefore, reshaped base layer has smooth continuity at the segment boundary, even though the images/frames in the first frame index range and the images/frames in the second frame index range are respectively (e.g., independently, without synchronization, etc.) encoded by the two different nodes N and N+1 in isolation. In operational scenarios in which primary scene boundaries (e.g., the vertical dash lines of FIG. 3N, etc.) are too close (e.g., less than $D_{min}$ images/frames, etc.) to one or both of the anchor subscenes, one or both of the anchor subscenes may have more than $D_{min}$ images/frames.

Short scene merging as described herein helps ensure an anchor subscene to have $D_{min}$ or more frames. In other words, primary scene cuts (vertical dotted lines of FIG. 3N) may not be located inside the combined region (corresponding to the combined frame index range $f_{NL-D_{min}} \sim f_{NL+D_{min}-1}$) of the anchor subscenes. A mandatory scene cut does exist at start of the segment.

As illustrated in FIG. 3N, the anchor subscenes exist on both sides of the right segment boundary (or the mandatory scene cut) of the segment assigned to node N. Likewise, one or more anchor subscenes-whether one or two depends whether the segment represents the very first segment of all segments or not—can be present on one or both sides of the left segment boundary (or another mandatory scene cut) of the segment assigned to node N.

Scene splitting operations can start to be performed after the anchor subscenes are assigned or allocated. Scene splitting may include fixed-length scene splitting or variable-length scene splitting.

Fixed-length scene splitting generates secondary scenes or subscenes with fixed, pre-determined lengths (or fixed, pre-determined total numbers of images/frames). Each subscene has $\mathcal{F}_{SS}'$ or more images/frames, except for anchors subscenes. Anchor subscenes have $D_{min}$ or more frames in them.

Variable-length scene splitting can create subscenes with different lengths (or different total numbers of images/frames). Each subscene has $\mathcal{F}_{SS}'$ or more images/frames, whereas anchor subscenes each have $D_{min}$ or more frames.

Fixed Length Scene Splitting

As a general rule, fixed-length splitting produces subscenes that have the same length $\mathcal{F}_{SS}'$, for example as derived in the process flow of FIG. 2D. There may be (e.g., two, etc.) exceptions to this general rule as follows. In an example, subscenes that are close to the primary scene cuts or anchor scenes may have more than $\mathcal{F}_{SS}'$ frames. In another example, anchor subscenes may have $D_{min}$ or more frames.

Figure 3O:
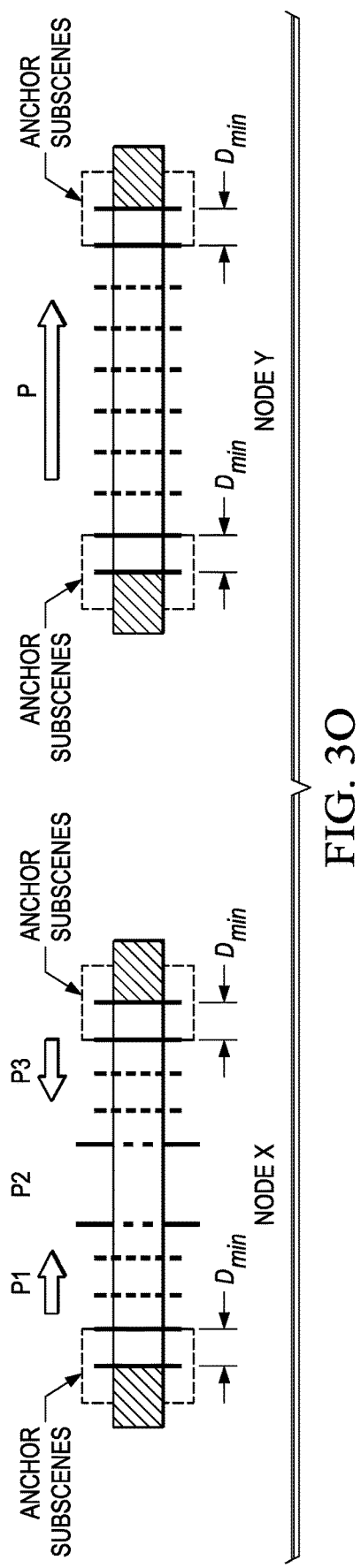

FIG. 3O, FIG. 3P and FIG. 3Q illustrate example fixed length splitting operations. As illustrated, each anchor region comprises two adjacent anchor subscenes anchored or placed on two sides of a segment boundary. Each anchor subscene anchored or placed on a side of a segment boundary has a size equal to $D_{min}$.

A traversal of a primary scene in a segment is to start moving from an anchor subscene in the primary scene and move away from the anchor subscene toward a scene cut delineating the primary scene, if the anchor subscene is the only anchor subscene in the primary scene. If there are two anchor subscenes in the primary scene, then the traversal can be made from left to right or alternatively from right to left. Hence, the direction of a traversal is decided depending (e.g., intrinsically, exclusively, independently, etc.) on location(s) of anchor subscene(s) in the primary scene. No information needs to be communicated from neighboring nodes to a node assigned with the segment containing the primary scene, for the purpose of deciding the direction of traversal. Hence, different nodes are enabled to make these decisions (e.g., intrinsically, exclusively, independently, etc.) on their own, in isolation. This greatly facilitate parallel video encoding operations performed by these nodes.

In a first example, for a primary scene on a right segment boundary of a segment, fixed length splitting operations can start moving from the right anchor subscene (or an anchor subscene anchored or placed on the left side of the right segment boundary; indicated with an arrow underneath in FIG. 3O) to left towards a scene cut delineating the primary scene in the segment, as illustrated with primary scene P3 of node X in FIG. 3O.

In a second example, for a primary scene on a left segment boundary of a segment, fixed length splitting operations can start moving from the left anchor subscene (or an anchor subscene anchored or placed on the right side of the left segment boundary) to right towards a scene cut delineating the primary scene in the segment, as illustrated with primary scene P1 of node X in FIG. 3O.

In a third example, for a single primary scene on both left and right segment boundaries of a segment, fixed length splitting operations can start moving from the left anchor subscene (or an anchor subscene anchored or placed on the right side of the left segment boundary) to right, as illustrated in primary scene P of node Y in FIG. 3O.

In some operational scenarios, a parent scene from which primary scenes in segments are derived by segmenting/partitioning may span or at least partly cover three or more nodes. For example, as illustrated in FIG. 3P, the parent scene may span or at least partly cover nodes N−1, N and N+1. A first primary scene derived from the parent scene may be a first portion—of the parent scene—in the (N−1)-th segment assigned to node N−1. A second primary scene derived from the parent scene may be a second portion—of the parent scene—in the N-th segment assigned to node N. A third primary scene derived from the parent scene may be a third portion—of the parent scene—in the (N+1)-th segment assigned to node N+1.

As illustrated in FIG. 3P, a traversal of the first primary scene in the (N−1)-th segment assigned to node N−1 can start before the right anchor subscene $f_{(N-1)L-D_{min}-1}$ (the anchor subscene anchored or placed on the left side of the right segment boundary of the (N−1)-th segment) and move left towards a left primary scene cut (indicated with a longer vertical dash line) delineating the first primary scene cut. A secondary scene cut (indicated with a shorter vertical dashed line) is inserted after every $\mathcal{F}'_{SS(N-1)}$ images/frames from right to left, so long as such insertion does not create a subscene with fewer than $\mathcal{F}'_{SS(N-1)}$ images/frames. As a result, the secondary scene bounded by the left primary scene cut delineating the first primary scene may have more than $\mathcal{F}'_{SS(N-1)}$ images/frames.

Likewise, as illustrated in FIG. 3P, a traversal of the third primary scene in the (N+1)-th segment assigned to node N+1 can start before the left anchor subscene $f_{(N+1)L+D_{min}}$ (the anchor subscene anchored or placed on the right side of the left segment boundary of the (N+1)-th segment) and move right towards a right primary scene cut (indicated with a longer vertical dash line) delincating the third primary scene cut. A secondary scene cut (indicated with a shorter vertical dashed line) is inserted after every $\mathcal{F}'_{SS(N+1)}$ images/frames from left to right, so long as such insertion does not create a subscene with fewer than $\mathcal{F}'_{SS(N+1)}$ images/frames. As a result, the secondary scene bounded by the right primary scene cut delineating the third primary scene may have more than $\mathcal{F}'_{SS(N+1)}$ images/frames.

A traversal of the second primary scene in the N-th segment assigned to node N can be from left to right or alternatively right to left. For the purpose of illustration only, the left to right direction of traversal is illustrated in FIG. 3P. As the traversal starts from the left anchor subscene (of the second primary scene) corresponding to image/frame $f_{NL+D_{min}}$, secondary scene cuts are inserted after every $\mathcal{F}'_{SS(N)}$ images/frames until the right anchor subscene (of the second primary scene) is reached. The subscene just before the right anchor subscene may have more than $\mathcal{F}'_{SS(N)}$ frames.

FIG. 3Q illustrates example lengths of subscenes in different primary scenes in different segments assigned to different nodes. Minimum lengths $\mathcal{F}'_{SS(N-1)}$, $\mathcal{F}'_{SS(N)}$, $\mathcal{F}'_{SS(N+1)}$ used to generate subscenes may be different on different nodes. As shown in FIG. 3Q, a subscene of the minimum length such as one of $\mathcal{F}'_{SS(N-1)}$, $\mathcal{F}'_{SS(N)}$, $\mathcal{F}'_{SS(N+1)}$ is indicated or pointed to by an arrow. A subscenes with no arrow indication or pointing to in a node may be larger than the minimum size of subscene for that node.

In some operational scenarios, fixed-length scene splitting techniques may be implemented or performed as a default method for scene splitting, and may produce more subscenes than variable-length scene splitting techniques.

Variable Length Scene Splitting

Figure 2E:
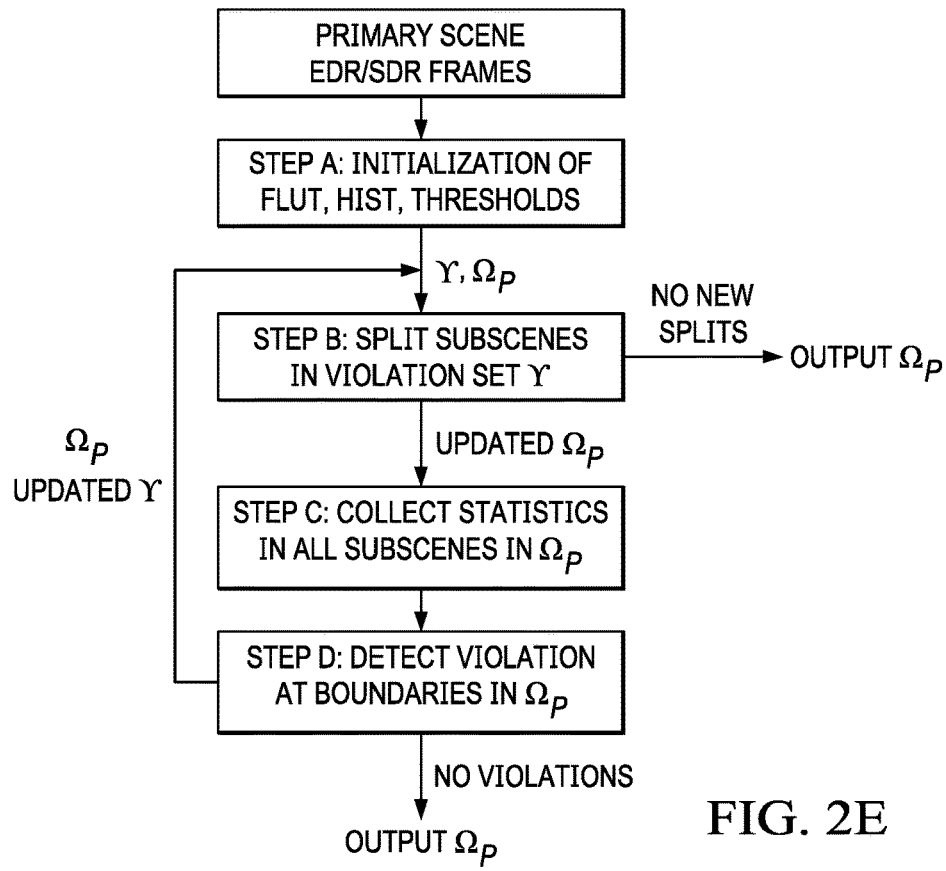
FIG. 2E illustrates an example process flow for variable-length scene splitting operations.

For the purpose of illustration only, FIG. 2E illustrates an example process flow for variable-length scene splitting operations performed on a parent scene (denoted as scene P) that is entirely in one node. Hence, in this example, the parent scene equals a primary scene on that node. The variable-length scene splitting operations illustrated with such a parent scene can be extended or modified for the purpose of performing variable-length scene splitting on parent scenes each of which may be distributed across two or more nodes.

Figure 3R:
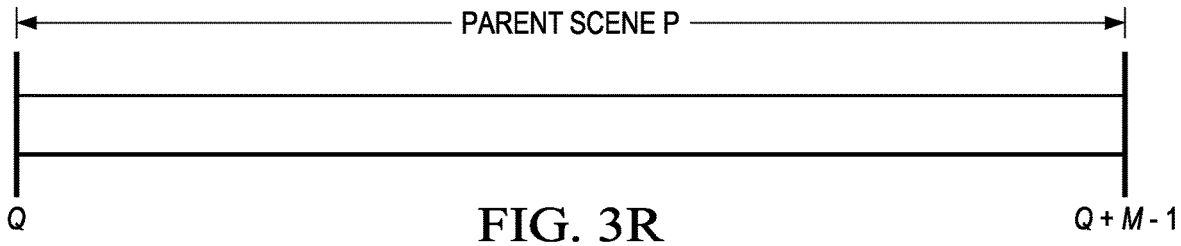
FIG. 3R illustrates an example primary/parent scene entirely in a segment assigned to a node.

As illustrated in FIG. 3R, scene P comprises M images/frames with the first image/frame (denoted as $f_Q$) being located at the Q-th frame index in a sequence of consecutive input images/frames in an input video signal ("Mezzanine").

The variable-length scene splitting operations as illustrated in FIG. 2E can be used or performed to split the parent scene into subscenes for temporal consistency. It should be noted that in some operational scenarios, a parent scene that is entirely in a segment assigned to one node may not need to be split, so this example is only for illustration purpose.

Step A of FIG. 2E comprises accessing SDR and HDR (or EDR) images/frames in the primary scene (P) and initializing FLUT, histogram (or HIST), thresholds in connection with the SDR and HDR images/frames in the primary scene (P), for example in an initialization phase.

The SDR and HDR images/frames may comprise a plurality of HDR and SDR image/frame pairs each of which comprises an HDR image and an SDR image depicting the same visual semantic content depicted in the HDR image.

For example, frame FLUT (denoted as $T^F$ or $T_j^F$) and HDR histogram denoted as $h^v$ or $h_j^v$) are computed for each (HDR and SDR) image/frame (pair) in scene P, as follows:

$$T_j^F, h_j^v \forall j \in [Q, Q+M-1] \qquad (13)$$

where j represents the frame index for the (HDR and SDR) image/frame (pair).

A scene FLUT $T_P^F$ can be constructed for scene P by averaging all the frame FLUTs in the scene, as follows:

$$T_P^F(b) = \frac{1}{M}\sum_{j=Q}^{Q+M-1} T_j^F(b) \qquad (14)$$

where b represents the codeword index (or FLUT entry/element index) in the scene and frame FLUTs.

In some operational scenarios, a frame FLUT for a (HDR and SDR) frame/image (pair) represents a mapping of (e.g., input, pre-reshaped, etc.) HDR codewords in the HDR image of the frame/image (pair) to (e.g., forward, etc.) reshaped SDR codewords in a reshaped SDR image approximating the SDR image of the frame/image (pair). Elements of a FLUT as described herein can be normalized, e.g., $T_j^F(b) \in [0.0, 1.0]$. Example reshaping operations relating to FLUT are described in PCT Application Ser. No. PCT/US2019/031620, filed on May 9, 2019, the entire contents of which are hereby incorporated by reference as if fully set forth herein.

A histogram or bins therein can be set with the same dimension or the same codeword partition as the scene FLUT (or a frame FLUT). The scene FLUT and the (frame) histograms can be used to predict or generate a DC value (denoted as x) for every image/frame (pair) in scene P, as follows:

$$\chi_j = \frac{1}{H \times W}\sum_b T_P^F(b) \times h_j^v(b) \ \forall \ j \in [Q, Q+M-1] \qquad (15)$$

where height and width of the (e.g., HDR, SDR, etc.) image/frame are H and W respectively.

A DC value difference between a frame and its previous frame—or a difference of DC values between the frame and the previous frame—can be used as a threshold (denoted as $\mathfrak{I}_j^{DC}$) for making scene splitting decision(s), as follows:

$$\mathfrak{I}_j^{DC} = \chi_j - \chi_{j-1} \forall j \in [Q+1, Q+M-1] \qquad (16)$$

Thresholds for making scene splitting decision(s) can be calculated once for all frame indexes j in expression (16) above during the initialization phase in Step A of FIG. 2E and used in subsequent steps, for example during scene splitting.

A maximum absolute elementwise difference between the FLUT of an image/frame with the FLUT of its previous image/frame can be computed to generate a threshold (denoted as $\mathfrak{I}_j^{FLUT}$) for detecting smoothness violation, as follows:

$$\mathfrak{I}_j^{FLUT} = \max(\alpha \times \max(\{|T_j^F(b) - T_{j-1}^F(b)| \forall b\}), \beta) \forall j \in [Q+1, Q+M-1] \qquad (17)$$

where $\alpha$ and $\beta$ represent configurable parameters. Example values of $\alpha$ may include, but are not necessarily limited to only, any of 1.8, 1.9, 2.0, 2.1, etc. Example values of $\beta$ may include, but are not necessarily limited to only, any of 0.004, 0.005, 0.006, etc.

Thresholds for detecting smoothness violation(s) can be calculated once for all frame indexes j in expression (17) above during the initialization phase in Step A of FIG. 2E and stored in accessible storage or cache for other operations to access.

Secondary scene cuts denoted as $C_g$ can be collected in a sorted set denoted as $\Omega_P$, where g is an index in the sorted set. The frame index, Q+M acts as the end of the list marker in the sorted set and is not used as a (secondary) scene cut. Secondary scene cuts in the sorted set can be initialized in Step A of FIG. 2E, as follows:

$$\Omega_P = \{Q, Q+M\} = \{C_0, C_1\} \qquad (18)$$

A violation set $\Upsilon$ can be used to store subscenes that violate the smoothness criteria/thresholds and can be initialized as $\Upsilon = \{P\}$ in Step A of FIG. 2E. Only the scenes or subscenes listed in violation set will be split in Step B of FIG. 2E. The initialization phase implemented in Step A generates the thresholds $\mathfrak{I}_j^{DC}$ and $\mathfrak{I}_j^{FLUT}$, the violation set $\Upsilon$ and the sorted set $\Omega_P$ of secondary scene cuts.

Step B of FIG. 2E comprises splitting subscene(s) in the violation set $\Upsilon$. A new round of subscene splitting begins in this step with the violation set $\Upsilon$ and the sorted set $\Omega_P$ of secondary scene cuts as input. All the subscenes in the violation set $\Upsilon$ are iterated and split.

Denote a subscene in the violation set $\Upsilon$ as $P_g$. The subscene $P_g$ spans an image/frame range $[C_g, C_{g+1}-1]$. In response to determining that the subscene $P_g$ has less than $2\times \mathcal{F}_{SS}'$ images/frames, the subscene is not split into two to avoid generating a (new) subscene having fewer than $\mathcal{F}_{SS}'$ frames. Otherwise, in response to determining that the subscene $P_g$ has no less than $2\times \mathcal{F}_{SS}'$ images/frames, a subscene—or scene in the initial or very first round of scene splitting in Step B-FLUT $T_{P_g}^F$ for the subscene $P_g$ is compared with every frame FLUT $T_j^F$ in the subscene $P_g$ to pick or select a specific image/frame at a specific frame index location Cs with the most similarity between the subscene FLUT $T_{P_g}^F$ and a specific FLUT for the specific image/frame, as follows:

$$C_s = \min_j \Sigma_b |T_{P_g}^F(b) - T_j^F(b)| \text{ such that, } C_s - C_g \geq \mathcal{F}_{ss}'$$
$$\text{and } C_{g+1} - C_s \geq \mathcal{F}_{ss}' \quad (19)$$

where the mathematical operator |·| produces the magnitude or absolute value of the factor enclosed in the mathematical operator.

Figure 3S:
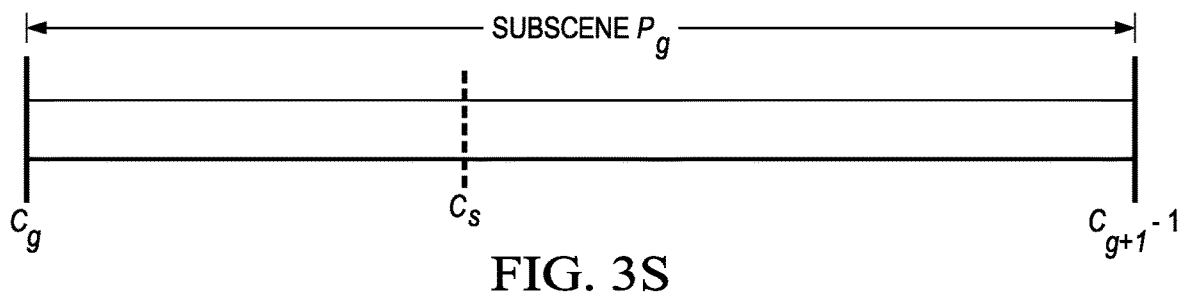
FIG. 3S, FIG. 3T and FIG. 3U illustrate example subscenes split from a primary/parent scene.

After the subscene $P_g$ is divided into two subscenes or secondary scenes as illustrated in FIG. 3S, the splitting index represented by the specific frame index location $C_s$ is inserted into the sorted set $\Omega_P$ at a correct location, as follows:

$$\Omega_P = \Omega_P \cup \{C_s\} \quad (20)$$

A stopping criterion (no new splits) may be used in Step B of FIG. 2E to determine whether final secondar scene cuts have been obtained. Under this stopping criterion, in response to determining that no new scene split is added to the sorted set $\Omega_P$ after iterating through all subscenes in the violation set $\Upsilon$, the stopping criterion is met. Accordingly, the sorted set $\Omega_P$ is outputted as containing the final secondary scene cuts.

On the other hand, in response to determining that at least one new scene split is added to the sorted set $\Omega_P$ after iterating through all subscenes in the violation set $\Upsilon$, the stopping criterion is not met. All the new splits from all the subscenes in the violation set $\Upsilon$ are inserted into the sorted set $\Omega_P$ in a corresponding sorted order. The violation set $\Upsilon$ is reinitialized to empty set, as follows:

$$\Upsilon = \phi \quad (21)$$

The sorted set $\Omega_P$ as updated in Step B can then be passed on to the next step, or Step C of FIG. 2E.

Step C comprises collecting (reshaping related, image content dependent) statistics in all the subscenes identified in the sorted set $\Omega_P$. A subscene FLUT may be computed or established for each secondary scene in the sorted set $\Omega_P$ as updated in Step B. For the purpose of illustration only, the sorted set $\Omega_P$ contains G+1 secondary scene cuts from $C_0$ to $C_G$, as follows:

$$\Omega_P = \{C_0, C_1 \ldots C_g \ldots C_{G-1}, C_G\} \quad (22)$$

There are G subscenes in this round and the frame indices in the sorted set $\Omega_P$ are in a corresponding order such as an ascending order, as follows:

$$Q = C_0 < C_1 \ldots < C_g < \ldots < C_{G-1} < C_G = Q + M \quad (23)$$

Figure 3T:
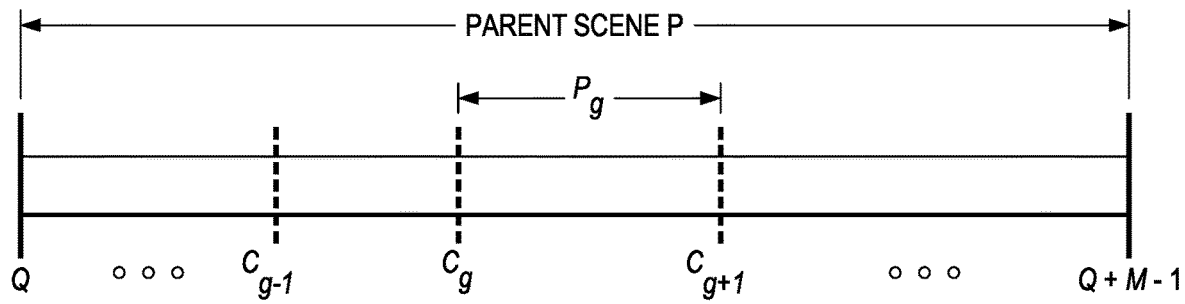

FIG. 3T illustrates an example subscene $P_g$—among one or more subscenes derived from the parent scene P—that spans a frame range $[C_g, C_{g+1}-1]$. Subscene FLUTs $T_{P_g}^F$ for all subscenes $P_g$ with $g \in [0, G-1]$ can be computed or generated for the (current) round, as follows:

$$T_{P_g}^F(b) = \frac{1}{C_{g+1} - C_g} \sum_{j=C_g}^{C_{g+1}-1} T_j^F(b) \quad \forall g \in [0, G-1] \quad (24)$$

Denote a DC value in the current round as $\lambda$. Predict DC values of all frames in the subscene $P_g$ may be computed or generated for the (current) round, as follows:

$$\lambda_j = \frac{1}{H \times W} \sum_b T_{P_g}^F(b) \times h_j^v(b) \quad \forall j \in [C_g, C_{g+1}-1] \quad \forall g \in [0, G-1] \quad (25)$$

DC values for all the frames in the parent scene P are collected after iterating through all the subscenes in the sorted set $\Omega_P$. These DC values can be passed to and used in Step D of FIG. 2E to find or identify threshold violations at the edges/boundaries—each of which separates two adjacent subscenes—of subscenes.

Step D comprises detecting temporal ability violations at subscene edges or boundaries between neighboring/adjacent subscenes.

Figure 3U:
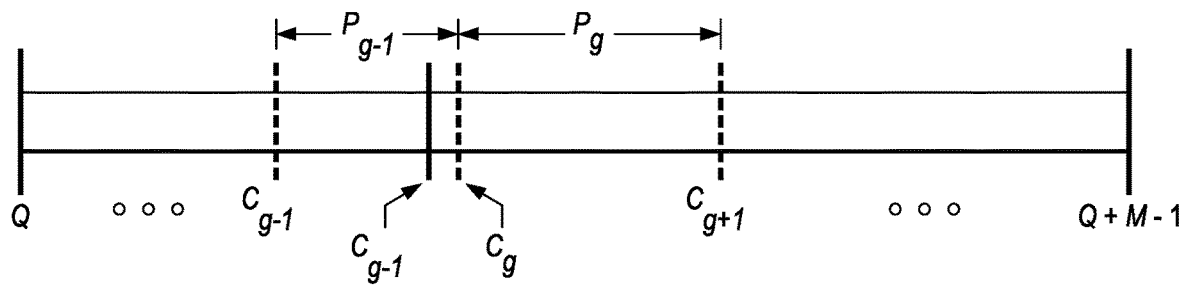

FIG. 3U illustrates an example subscene edge (or boundary) Cg between subscenes $P_{g-1}$ and $P_g$. Several types of violations can be checked to determine whether any one of those types of violations occurs at the subscene edge (or boundary) Cg. In response to determining that a violation check (with respect to any of the types of violations) fails, both the subscenes $P_{g-1}$ and $P_g$ are moved or included in the violation set $\Upsilon$. The same checks can be applied at each subscene boundary $C_g$, except $C_0$, in the parent scene P.

Given the DC values for all the frames in the parent scene P after iterating through all the subscenes in the sorted $\Omega_P$ (e.g., in Step C of FIG. 2E, etc.), DC differences can be computed at every secondary scene cut $C_g$, except $C_0$, in the sorted $\Omega_P$. A DC difference $\Delta_{C_g}$ at a subscene edge (or boundary) can be computed as a difference between DC values of the image/frame with a frame index $C_g$ and its previous frame with index $C_g-1$, as follows:

$$\Delta_{C_g} = \lambda_{C_g} - \lambda_{C_g-1} \quad (26)$$

Violation Check 1 is performed to determine whether an absolute value $|\Delta_{C_g}|$ of the DC difference is greater than a DC threshold $|\mathfrak{I}_{C_g}^{DC}|$ (e.g., as derived for the image/frame with the frame index $C_g$ based on expression (16) above, etc.) plus a non-negative bias w, as follows:

$$|\Delta_{C_g}| > |\mathfrak{I}_{C_g}^{DC}| + \omega \quad (27)$$

where the bias $\omega$ may be a configurable parameter (e.g., with a default value of 0.001 or ¼ codeword in 8-bit video, etc.).

In response to determining that the absolute DC value difference $|\Delta_{C_g}|$ is greater than the DC threshold $|\mathfrak{I}_{C_g}^{DC}|$ plus the non-negative bias w, this violation check is deemed as failed. In other words, a brightness change at the transition point $C_g$ between subscenes $P_{g-1}$ and $P_g$ represents, or is deemed as, a threshold violation; as a result, these subscenes $P_{g-1}$ and $P_g$ are appended to the violation set $\Upsilon$ to be further split in the next round. Otherwise, this violation check is deemed as passed. This criterion or violation check may be a relatively important violation check because of its impact on results of the scene splitting operations.

Violation Check 2 is performed to determine whether a sign of the DC value difference is the same as a sign of the DC threshold, as follows:

$$\text{sign}(\Delta_{C_g}) \neq \text{sign}(\mathfrak{I}_{C_g}^{DC}) \quad (28)$$

A positive DC difference $\Delta_{C_g}$ indicates that there is a DC value increase from previous frame to the current (or next) frame following the previous frame. Conversely, a negative DC difference $\Delta_{C_g}$ indicates that there is a DC value decrease the previous frame to the current (or next) frame. When the underlying trend of DC value increase/decrease in the parent scene P from previous frame to the next frame as indicated or represented by the sign of the threshold $\mathfrak{I}_{C_g}^{DC}$ is maintained the same as in the subscenes as indicated or represented by the sign of the DC value difference $\Delta_{C_g}$, temporal stability is deemed as maintained under this violation check. Otherwise, this violation check is deemed as failed; both the subscenes $P_{g-1}$ and $P_g$ are added or appended to the violation set $\Upsilon$ to be further split in the next round. This criterion or violation check is helpful in maintaining temporal stability in fade in/out, dissolving scenes or any scene with gradual brightness changes.

Violation Check 3 is performed to determine whether a maximum of absolute elementwise difference between FLUTs $T_{P_g}^F$ and $T_{P_{g-1}}^F$ is greater than a threshold $T_{C_g}^{FLUT}$ (e.g., as derived based on expression (17) above, etc.) at $C_g$, as follows:

$$\max(\{|T_{P_g}^F(b) - T_{P_{g-1}}^F(b)| \forall b\}) > \mathfrak{I}_{C_g}^{FLUT} \qquad (29)$$

In response to determining that the maximum of absolute elementwise difference between FLUTs $T_{P_g}^F$ and $T_{P_{g-1}}^F$ is greater than the threshold $\mathfrak{I}_{C_g}^{FLUT}$, this violation check is deemed as failed (or the smoothness constraint is violated); these subscenes $P_{g-1}$ and $P_g$ are included in or appended to the violation set $\Upsilon$ to be further split in the next round. Otherwise, this violation check is deemed as passed (or the smoothness constraint is not violated).

By way of illustration but not limitation, all the violation checks can be at subscene boundaries. If there is a violation, then both subscenes on both sides of a subscene boundary are appended into the violation set $\Upsilon$ to be further split in the next round. The performance of these violation checks ends the scene splitting operations in the current round. If the violation set $\Upsilon$ as possibly updated with these violation checks is not empty, the process flow of FIG. 2E goes back to with the sorted set $\Omega_P$ and the violation set $\Upsilon$ for the next round of scene splitting.

A second stopping criterion (no violations) may be used in Step D of FIG. 2E to determine whether final secondar scene cuts have been obtained. Under this stopping criterion in Step D, in response to determining that no subscene in the parent scene P violates these criteria or violation checks, the stopping criterion is met. Accordingly, the sorted set $\Omega_P$ is outputted as containing the final secondary scene cuts.

While the process flow of FIG. 2E is illustrated with a parent scene that is entirely within a segment, it should be noted that, in various embodiments, some or all of these scene splitting techniques can be extended or adjusted for applying to primary scenes on both sides of a segment boundary such as a parent scene shared by (or present in) two or more segments assigned to two or more nodes.

FIG. 3V illustrates an example parent scene residing on two nodes. Each portion of the parent scene in a node (or a corresponding segment) represents a primary scene for that node (or the corresponding segment). Three anchor subscene cuts in those two primary scenes (indicated by solid vertical lines in FIG. 3V) delineate two anchor subscenes, which together form an overlap window. For node N, an anchor scene cut (or split) is introduced at frame $f_{NL-D_{min}}$, whereas, for node N+1, a second anchor split is introduced at frame $f_{NL+D_{min}}$. These initial subscene cuts (or splits) are already put in place before variable-length scene splitting operations are further performed on these primary scenes.

In this case of a parent scene present in two or more nodes, a relatively minor change or adjustment can be made in the initialization performed in Step A of the process flow of FIG. 2E for scene splitting a primary scene in a segment by including in the sorted set $\Omega_P$ an additional anchor scene cut in the segment to account for an anchor subscene in the primary scene. With these initial anchor scene cuts (splits) in place in adjacent segments, a visually consistent look at the segment transition boundary can be maintained.

Then the process flow of FIG. 2E can directly jump or go to Step C after the initialization with the relatively minor change of adjustment. The previous purpose of Step B—for the previous case of a primary scene present only in a single segment—is to split the primary scene in that previous case. In the present case of a parent scene present in two or more nodes, since a primary scene in each node is already split into two subscenes by an additional anchor scene cut (or split) put in place before the process flow of FIG. 2E, the process flow can move to Step C directly in the very first round. Subsequent rounds of the process flow in the present case of a parent scene present in two or more nodes can operate or proceed in the same manner as the process flow in the previous case of a primary scene present only in a single segment, except the already placed anchor subscenes are not split further in subsequent scene splitting operations, even if violations exist at anchor subscene boundary frames (e.g., corresponding to additional subscene cuts in segment interior, etc.). FIG. 3W illustrates an example outcome of variable length scene splitting for the parent scene P of FIG. 3V.

Variable-length scene splitting may be relatively complicated and computationally intensive as compared with fixed-length scene splitting. However, variable-length scene splitting may bring forth advantages/benefits over fixed-length scene splitting in that a relatively fewer total number of subscenes may be created. In some operational scenarios, fixed-length scene splitting may be used a default in scene splitting.

In some operational scenarios, only primary scenes—each of which is present on both sides of a segment boundary—are split into secondary scenes. Scene cuts (or splits) are collected and appended to the updated first list of scenes, which is in turn used to get or generate the second list of scenes $\Psi_2^N$. The second list is handed over as input to Pass-2 for scene-based encoding. It is possible that temporal violations can occur at scene cut frames in scenes (e.g., unsplit primary scenes, anchor and/or non-anchor subscenes, etc.) identified in the second list of $\Psi_2^N$. In some operational scenarios, before moving to Pass-2, temporal violations and inconsistencies are smoothened with iterative overlapping and FLUT interpolation.

Iterative Overlapping for Secondary Scenes

If scene splitting can be allowed to go down to a single image/frame such that $\mathcal{F}_{SS}' = 1$, then all temporal violations may be possibly removed. However, compliance with the minimum and average distance constraints may lead to temporal violations in images/frames encoded in a video signal.

Figure 2F:
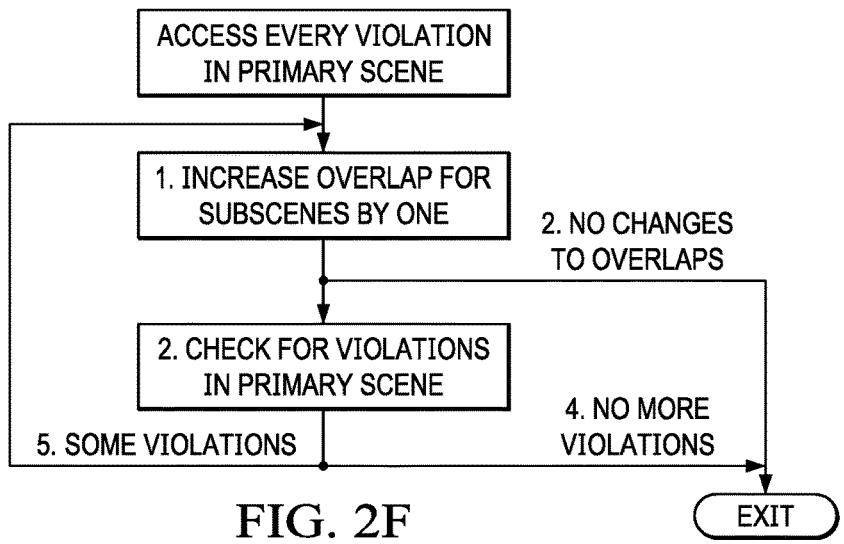
FIG. 2F illustrates an example process flow for iterative overlapping.

FIG. 2F illustrates an example process flow for iterative overlapping to mitigate temporal violations in connection with secondary scenes. The process flow receives the sorted set $\Omega_P$ and the violation set $\Upsilon$ as input and accesses every subscene in the primary scene P as identified in the violation set $\Upsilon$.

A possibility of temporal inconsistencies at subscene boundaries can be evaluated using some or all the criteria or validation checks in Step D of FIG. 2E. Following fixed or variable length splitting, in response to determining that no violation is found or detected as per violation checks 1, 2 and 3 in Step D of FIG. 2E at subscene cuts with frame indices $\{C_0, C_1 \ldots C_g \ldots\}$ in the sorted set $\Omega_P$ for the primary scene P in a segment assigned to node N, the process flow of FIG. 2F can exit. Otherwise, in response to determining that at least one violation is found or detected at a subscene cut, node N can start the very first iteration of an iterative overlapping process as the current iteration.

In the current iteration of the iterative overlapping process, node N access every subscene boundary violation identified in the violation set $\Upsilon$. For example, a violation may be found or detected at the frame index $C_g$ between the subscenes $P_{g-1}$ and $P_g$, as illustrated in FIG. 3U. An overlap length for each subscene adjacent to the boundary or subscene cut identified in the violation set $\Upsilon$ is initialized to the length of each such subscene.

The current iteration of the iterative overlapping process comprises (1) determining or checking, for each boundary or subscene cut identified in the violation set $\Upsilon$, whether an adjacent image/frame is available to increase the overlap length of the left (in reference to the boundary or subscene cut) subscene $P_{g-1}$ on the right of the left subscene $P_{g-1}$ and (2) determining or checking, for that boundary or subscene cut, whether an adjacent image/frame is available to increase the overlap length of the right (in reference to the boundary or subscene cut) subscene $P_g$ on the left of the right subscene $P_g$. No overlap length for a subscene in the segment assigned to node N can go beyond bumper frames available to node N.

In response to determining that no adjacent image/frame is available to increase an overlap length of a subscene such as the left and right subscene $P_{g-1}$ and $P_g$ in the present example, do nothing—the overlap length of the subscene is not incremented or increased. It should be noted that, in some operational scenarios, no overlap length incrementing operation is performed for anchor subscenes.

Otherwise, in response to determining that an adjacent image/frame is available to increase an overlap length of a subscene such as one or both of the left and right subscene $P_{g-1}$ and $P_g$ in the present example, the overlap length is incremented to include the available adjacent image/frame for the subscene on one or both sides of the boundary or subscene cut ("1. Increase Overlap for Subscenes by One" in FIG. 2F). Hence, the overlap length of the right subscene $P_g$ is incremented by one (1) on the left, whereas the overlap length of the left subscene $P_{g-1}$ is incremented by one (1) on the right. The process flow continues to the next violation in the violation set $\Upsilon$ and perform the same overlap length increment operations as described herein.

If no subscene overlap length was updated or changed during this (current) iteration, then the process flow of FIG. 2F exits ("2. No Changes to Overlaps" in FIG. 2F).

The (reshaping related, image content dependent) statistics can be collected for all the subscenes using images/frames in their updated overlap lengths, as illustrated in Step C of FIG. 2E.

The current iteration of the iterative overlapping process further comprises determining or checking for violations ("3. Check for Violations in Primary Scene" in FIG. 2F), as illustrated in Step D of FIG. 2E.

In response to determining that no violations are detected, the process flow of FIG. 2F exits ("4. No More Violations" in FIG. 2F). Otherwise, the process flow of FIG. 2F goes back ("5. Some Violations" in FIG. 2F) to step 1 ("1. Increase Overlap for Subscenes by One" in FIG. 2F) of the iterative overlapping process, increments the iteration count, and starts a new iteration as the current iteration.

A FLUT can be computed for each of these subscenes using a respective overlap length (or window). FLUTs so computed can be stored or cached in data structures to be used in FLUT interpolation. Left and/or right overlap lengths of every subscene can be passed on to the next stage or Pass-2 as a part of auxiliary data.

In a non-limiting illustrative example, a sample parent (or primary) scene with close to 180 frames is divided across three nodes. The parent scene is split into fixed length subscenes having 10 frames or more. These subscenes may include non-anchor subscene specified with $\mathcal{F}_{SS}{}'$, anchor subscenes, anchor subscenes near primary scene cuts possibly having more than the length specified for an anchor subscene, non-anchor subscenes near primary scene cuts possibly having more than $\mathcal{F}_{SS}{}'$ for a non-anchor subscene, etc.

First absolute DC value differences between neighboring images/frames, when these subscenes are processed separately on the three different nodes in isolation, with iterative overlapping, can be computed. To demonstrate the effectiveness of iterative overlapping, second absolute DC value differences between neighboring images/frames, when these images/frames are processed on a single node without splitting primary/parent scenes into subscenes and hence without iterative overlapping, can also be computed.

Iterative overlapping aims to bring the first absolute DC value differences as close as possible to the second absolute DC value differences. A peak in the first and second absolute DC value differences corresponds to large DC value differences in neighboring images/frames. Such a peak is a sign of possible temporal inconsistency. After each iteration of the process flow of FIG. 2F for iterative overlapping, it may be observed that the peaks in the first absolute DC value differences are reduced and become closer and closer (than without iterative overlapping) to the second absolute DC value differences, thereby achieving or improving on temporal smoothness in a video signal encoded by a multi-node video encoding system. It may also be observed that, as overlap lengths are not changed or enlarged for anchor subscenes, most of temporal smoothness violations as indicated by the remaining peaks are seen as occurring close to the anchor subscenes. The total number of iterations in the iterative overlapping may be configurable or pre-configured. A hard limit on the total number may be implemented regardless of whether temporal smoothness violations have been completely eliminated in the iterations. This hard limit may be set to a fixed number such as 15, 20, 25, etc., or may be set based on a number of factors: such as segment length (e.g., how many images/frames in a segment, etc.), minimum and average distance constraints, etc.

Figure 3Z:
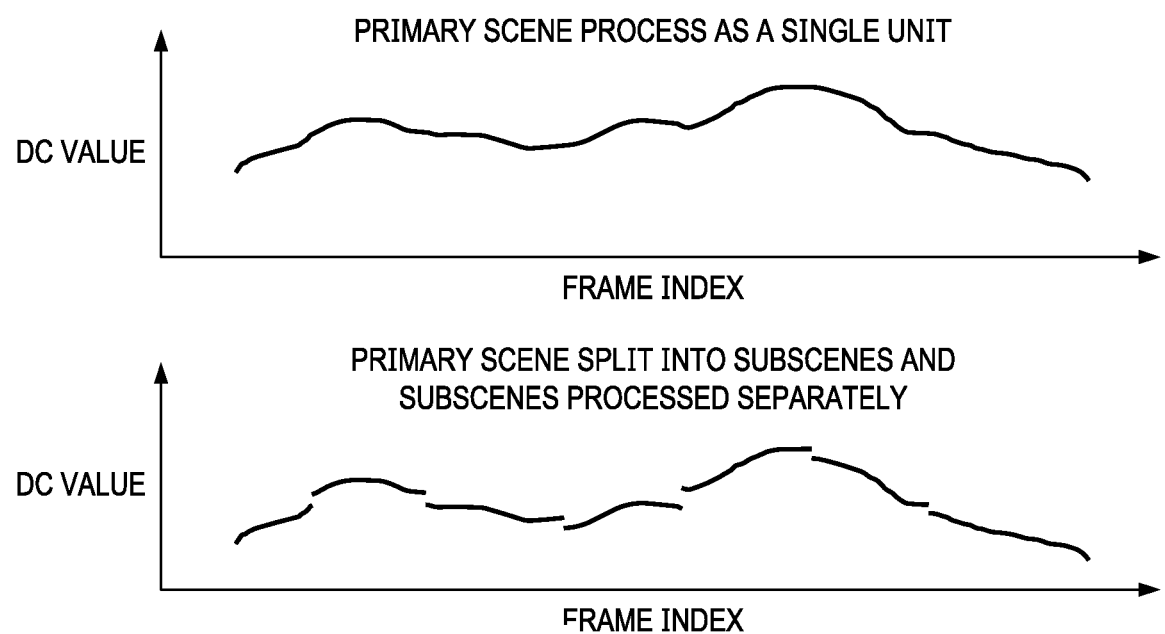
FIG. 3Z illustrates example temporal violations in frame direct-current (DC) values.
Figure 3A:
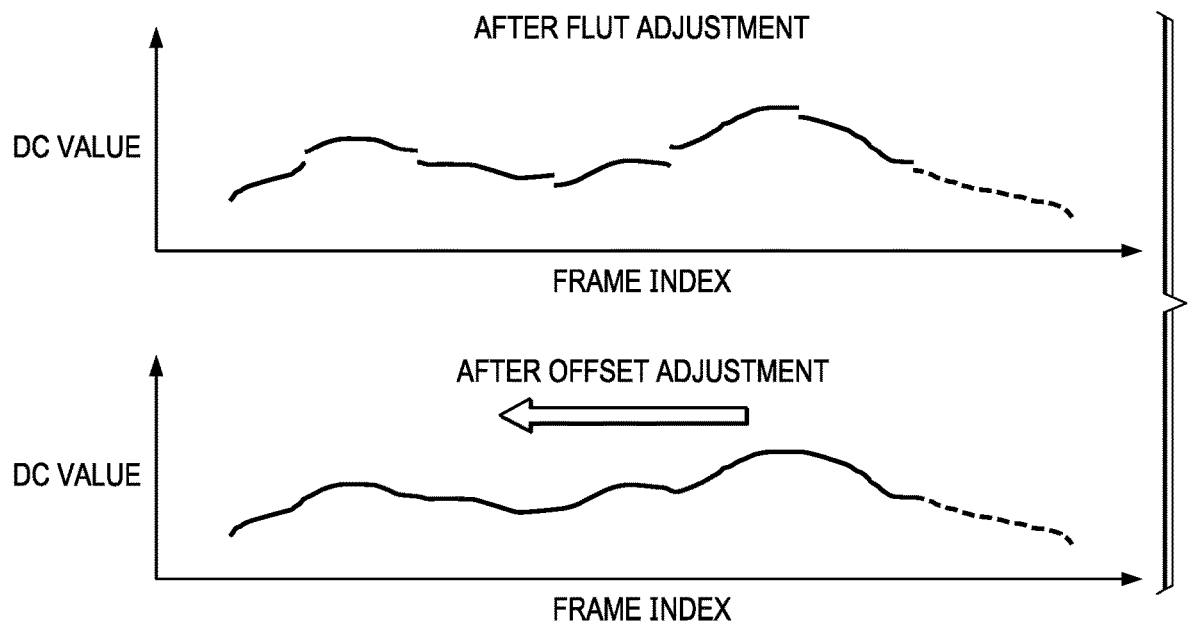
Figure 3A:
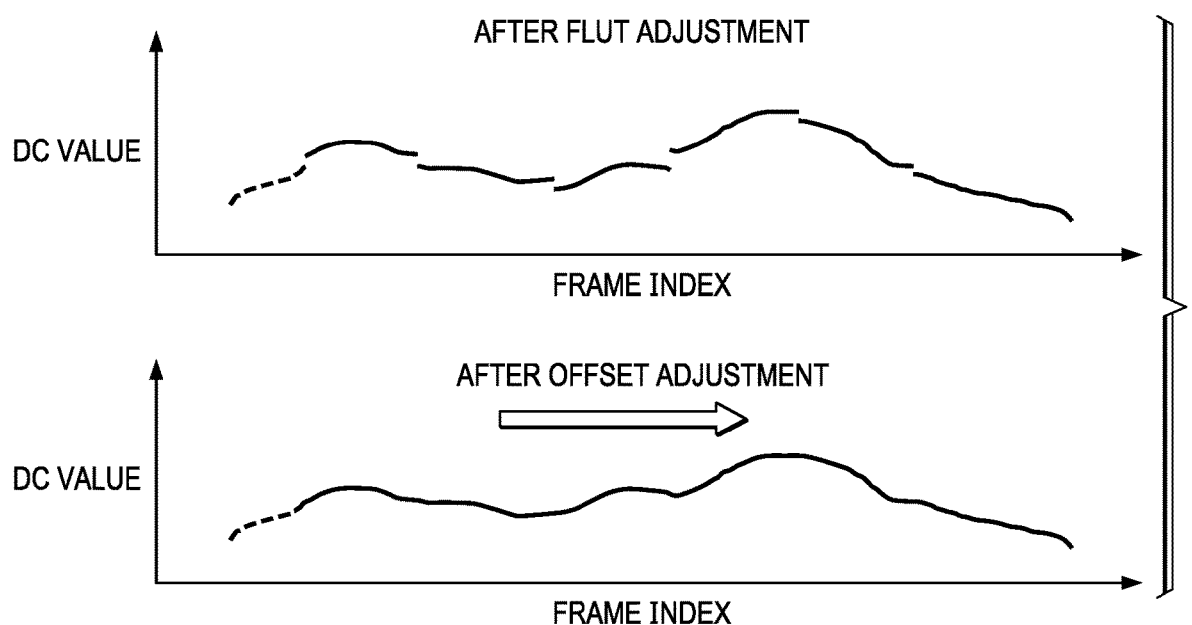
Figure 3A:
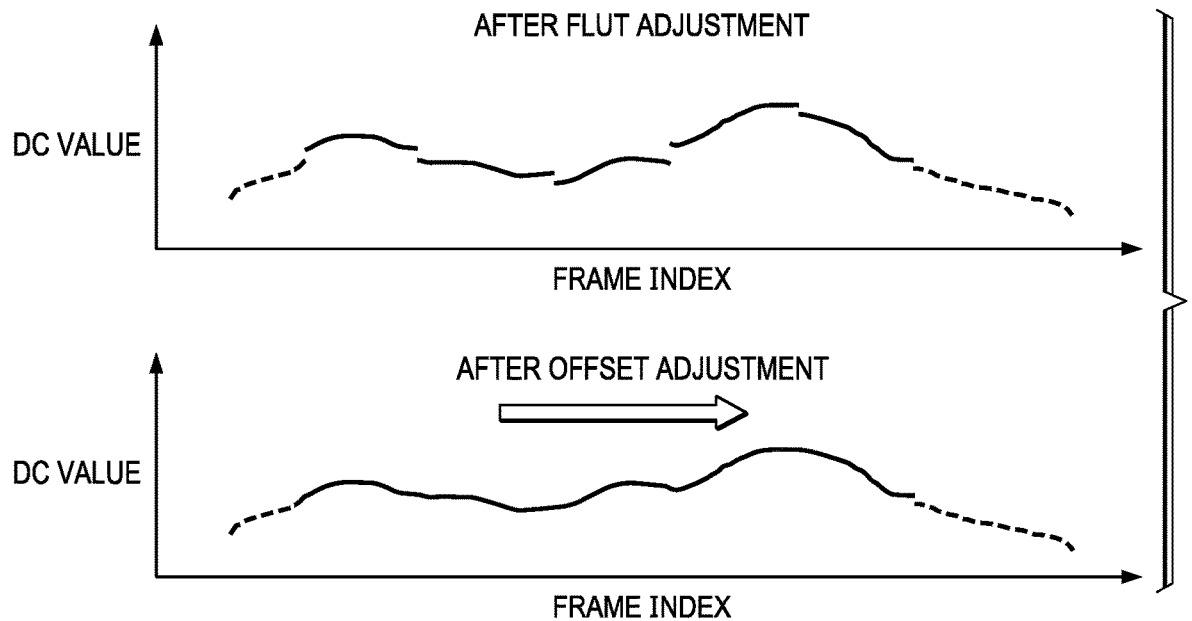
Figure 3A:
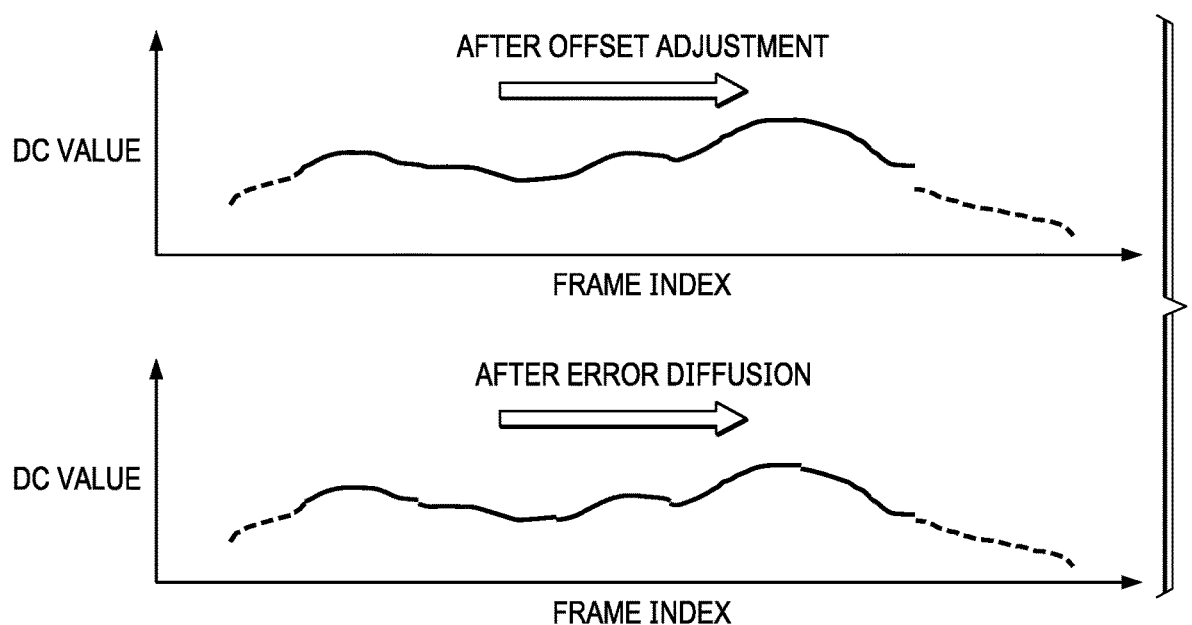

Iterative overlapping makes subscene transitions smoother, but temporal smooth violations (or temporal violations) may still persist. FIG. 3Z illustrates example temporal violations as measured or represented with frame (or per-frame) DC values.

As shown in the plot of the top graph of FIG. 3Z, frame DC values (e.g., of reshaped base layer images, etc.) in a whole primary scene-which is entirely processed, reshaped or encoded by a single node using a single set of forward reshaping parameters for the entire scene-show a continuity. This DC value trend/pattern is considered as normal (e.g., a reference, etc.). Any significant or relatively large deviations from this trend/pattern is an indicator of temporal fluctuations and non-smoothness.

As shown in the plot of the bottom graph of FIG. 3Z, frame DC values (e.g., of reshaped base layer images, etc.) in a primary/parent scene-which is divided into subscenes separately processed, reshaped or encoded using different sets of forward reshaping parameters for subscenes generated from portions of the primary/parent scene-show abrupt DC value changes or many discontinuities. These abrupt DC value changes are seen mainly on the boundaries of the subscenes.

Temporal smoothness violations—e.g., as represented by abrupt DC value changes or discontinuities—can become worse when subscenes in a parent/primary scene are in different segments assigned to and separately processed, reshaped and encoded by different nodes.

FLUT interpolation can be implemented to remedy or avoid abrupt DC value changes—in operational scenarios in which subscenes are processed separately by different nodes—for the purpose of providing a better visual experience relatively free of visual artifacts caused by multi-node video encoding. In response to determining that the temporal smooth violations still persist, FLUT interpolation may be applied after iterative overlapping. Otherwise, FLUT interpolation may be bypassed.

Figure 2G:
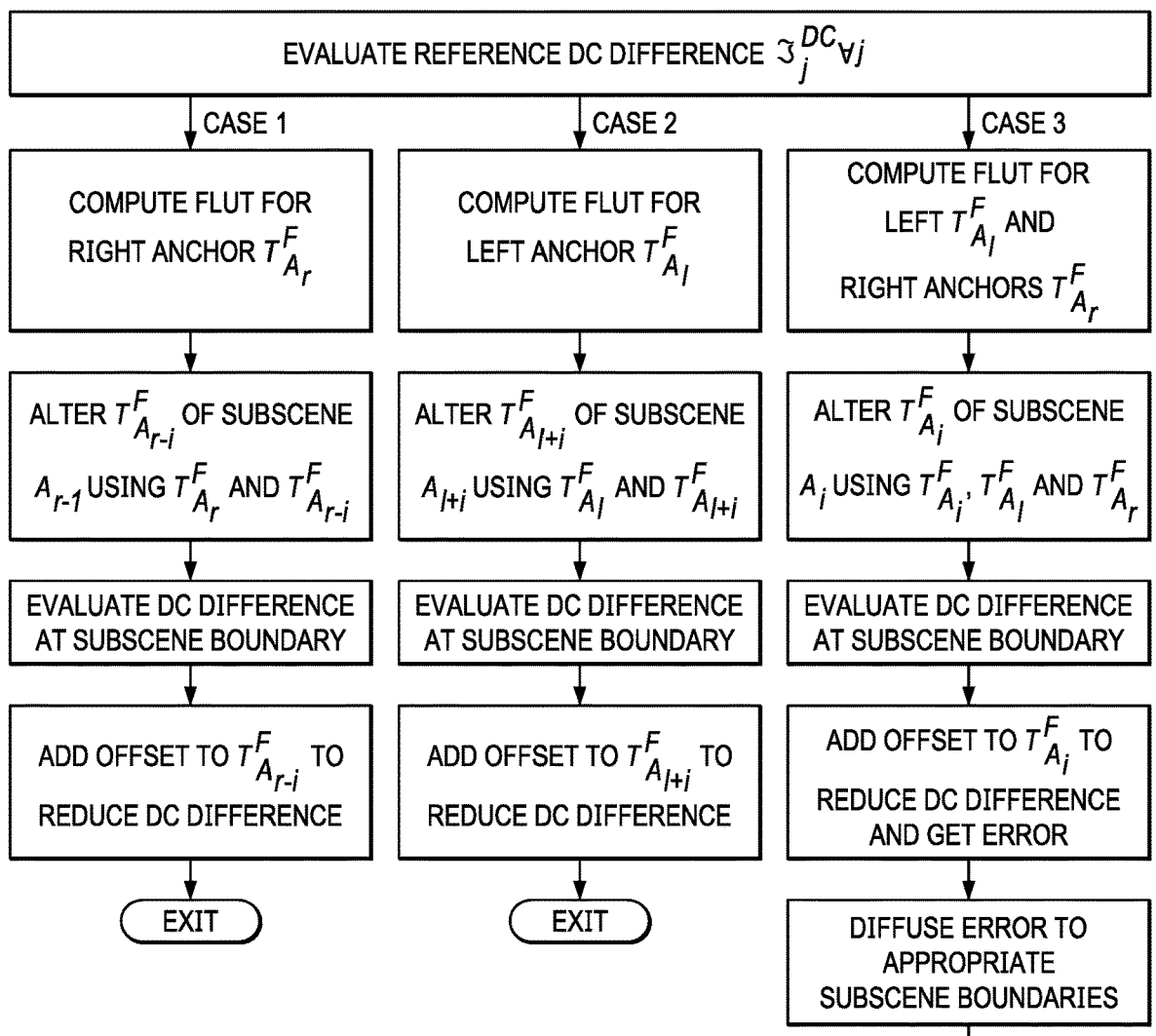
FIG. 2G illustrates an example process flow for forward lookup table (FLUT) interpolation for secondary scenes.

FIG. 2G illustrates an example process flow for FLUT interpolation for secondary scenes (or subscenes) to remedy temporal smoothness violations remaining after iterative overlapping.

As illustrated in FIG. 3AA, a primary or parent scene identified in a list of scenes may be partitioned, segmented or otherwise split among multiple nodes such as nodes N−1, N, and N+1. Each node is assigned with a portion of the scene. These portions of the parent scene, which may also be referred as primary scenes in their respective segments.

A primary scene in a segment with right and left segment boundaries delineating the segment can belong to, or can be classified into, one of three following in-segment primary scene types. First, a primary scene—e.g., in a segment assigned to node N−1 in FIG. 3AA—contains only the right segment boundary. Second, a primary scene—e.g., in a segment assigned to node N+1 in FIG. 3AA—contains only the left segment boundary. Third, a primary scene—e.g., in a segment assigned to node N in FIG. 3AA—contains both of the right and left segment boundaries.

As shown in FIG. 3AA, secondary scene cuts can be formed after scene splitting with anchor subscenes around the segment boundaries.

As shown in FIG. 2G, the three in-segment primary scene types can be handled differently as Cases 1, 2 and 3, respectively, in FLUT interpolation. In some operational scenarios, FLUT interpolation does not affect frame FLUTs in the anchor subscenes. The frame FLUTs in the anchor subscenes serve as references to or with which frame FLUTs in the rest (or non-anchor subscenes) of the subscenes are aligned.

Denote frame DC values—when a primary scene P is processed by a single node as a single unit—as $\chi$. HDR histograms $h_j^v$ and FLUTs $T_P^F$ in the primary scene have the same dimensions or the same total number of indexes or entries, where j denotes a frame index for the j-th image/frame. FLUTs $T_P^F$ can be formed by averaging the FLUTs of all the frame FLUTs for all the images/frames in the scene P. The frame DC value for the j-th image/frame may be computed as follows:

$$\chi_j = \frac{1}{H \times W} \sum_b T_P^F(b) \times h_j^v(b) \tag{30}$$

where b represents an index or entry in the forward LUT. H and W represent height and width of the j-th image/frame respectively.

DC differences ($\mathfrak{I}_j^{DC}$) of every image/frame with its previous image/frame, which is used as reference in FLUT interpolation, may be computed as follows:

$$\mathfrak{I}_j^{DC} = \chi_j - \chi_{j-1} \forall j \in P \tag{31}$$

In Case 1 of FIG. 2G, the primary scene contains only the right segment boundary, for example in the segment assigned to node N−1 of FIG. 3AA. As shown in FIG. 2G, a FLUT in the (right) anchor subscene can be computed first and FLUTs of the rest of the subscenes other than the (right) anchor subscene in the primary scene can be adjusted with respect to the FLUT in the (right) anchor subscene.

Denote the right anchor subscene as A. Denote the subscene just to the left of the right anchor subscene as $A_{r-1}$, then next subscene to the left as $A_{r-2}$ and so on.

FLUT of the anchor subscene $T_{A_r}^F$ is obtained by averaging frame FLUTs $T_j^F$ for images/frames in the anchor subscene. In contrast, FLUTs for other (non-anchor) subscenes $T_{A_{r-1}}^F$, $T_{A_{r-2}}^F$ and so on, are obtained by averaging frame FLUTs in the overlap lengths or windows—which may be extended and hence may contain more images/frames that those—of these subscenes. The FLUTs for these non-anchor subscenes can be initially computed or reused/procured (to the extent available) from results of the iterative overlapping operations that were performed before the FLUT interpolation operations. In some operational scenarios, input and mapped codewords in these FLUTs are represented in a normalized codeword domain, e.g., $T_j^F(b) \in [0, 1.0]$.

As shown in FIG. 2G for Case 1, the FLUTs of some or all the (non-anchor) subscenes (denoted as $A_{r-i}$) to the left of the anchor subscene as follows:

$$T_{A_{r-i}}^F(b) = w_{A_{r-i}} \times T_{A_{r-i}}^F(b) + (1 - w_{A_{r-i}}) \times T_{A_r}^F(b) \tag{32}$$

where i represents an iterator, is equal to 1 for the subscene to the left of the anchor subscene, equal to 2 for the next subscene and so on. The symbol $w_{A_{r-i}}$ represents weights used in expression (32) above for adjusting FLUTs for the (non-anchor) subscenes.

The weights $w_{A_{r-i}}$ can be derived as follows:

$$w_{A_{r-i}} = \min(\theta \times i, 1) \tag{33}$$

where $\theta$ represents a transition rate of the FLUT for the anchor subscene. Example values of $\theta$ may include, but are not necessarily limited to only, 0.10.

With the updated FLUTs for the (non-anchor) subscenes in expression (32) above and the HDR histograms $h_j^v$ for each frame available for each frame in these subscenes, DC values (denoted with a different symbol as $\lambda$) for each image/frame (e.g., the j-th image/frame) in such a (non-anchor) subscene $A_{r-i}$ can be computed as follows:

$$\lambda_j = \frac{1}{H \times W} \sum_b T_{A_{r-i}}^F(b) \times h_j^v(b) \tag{34}$$

The FLUT adjustment in expression (32) above ensures that the FLUT transition is smooth enough from one subscene to the next. However, even after the FLUT adjustment, there may still be abrupt DC changes as illustrated in the plot of the top graph of FIG. 3AB. Offsets can be further applied to the adjusted FLUTs to remove these abrupt DC value changes.

As the FLUT (the rightmost piece in the plots of FIG. 3AB) for the right anchor subscene $A_r$ is fixed, the adjusted FLUTs for the rest of the subscenes can be moved along the vertical axis of FIG. 3AB with (positive or negative) offsets with respect to the FLUT for the right anchor subscene $A_r$.

The moving of the adjusted FLUTs for the subscenes can be made from right to left, starting with subscene $A_{r-1}$. For the purpose of illustration only, the frame index of the first image/frame in the anchor subscene $A_r$ is q. Accordingly, the last image/frame in the adjacent non-anchor subscene $A_{r-1}$ is q−1. In some operational scenarios, overlapping images/frames added to the length of a subscene are not considered as part of the subscene for the purpose of computing temporal violations. At the boundary between (or separating) subscene $A_{r-1}$ and $A_r$, the (actual) DC value difference is given as $\Delta_q = \lambda_q - \lambda_{q-1}$. A reference DC value difference for temporal consistency may be given as $\mathfrak{I}_q^{DC} = \chi_q - \chi_{q-1}$. These two DC value differences can be used to derive or generate an offset $\rho = \Delta_q - \mathfrak{I}_q^{DC}$ to move the FLUT $T_{A_{r-1}}^F$ for the subscene $A_{r-1}$. Adding this offset to the FLUT TA increase the (actual) DC value for image/frame q−1 by ρ. This results in a new (actual) DC value difference at q and q−1 of $\overline{\Delta}_q$, which is exactly equal to the reference DC value difference $\mathfrak{I}_q^{DC}$. This may be deduced or proved as follows:

$$\overline{\Delta}_q = \lambda_q - \lambda_{q-1} = \lambda_q - (\lambda_{q-1} + \rho) = \lambda_q - \lambda_{q-1} - \rho = \lambda_q - \lambda_{q-1} - (\Delta_q - \mathfrak{I}_q^{DC}) =$$
$$\lambda_q - \lambda_{q-1} - \Delta_q + \mathfrak{I}_q^{DC} = \Delta_q - \Delta_q + \mathfrak{I}_q^{DC} = \mathfrak{I}_q^{DC} \quad (35)$$

Hence, adding the offset brings the updated DC value difference $\overline{\Delta}_q$ to the same value as the reference DC value difference SBC. This movement of the FLUT for the subscene $A_{r-1}$ completes the alignment of the FLUT for the adjacent non-anchor subscene $A_{r-1}$ with the FLUT for the anchor subscene $A_r$. Next, the FLUT for the adjacent non-anchor subscene $A_{r-1}$ is fixed; the FLUT for the subscene $A_{r-2}$ adjacent to subscene $A_{r-1}$ is moved with respect to the FLUT for subscene $A_{r-1}$ in a similar manner as described herein. This movement process with offset can be repeated for every non-anchor subscene in the scene at node N−1 until the last subscene on the left is reached, as illustrated in the plot of the bottom graph of FIG. 3AB, thereby completely removing temporal inconsistencies as DC value differences are restored to their (original) values without scene partition/segmentation.

In Case 2 of FIG. 2G, the primary scene contains only the left segment boundary, for example in the segment assigned to node N+1 of FIG. 3AA. As shown in FIG. 2G, a FLUT in the (left) anchor subscene can be computed first and FLUTs of the rest of the subscenes other than the (left) anchor subscene in the primary scene can be adjusted with respect to the FLUT in the (left) anchor subscene.

Denote the left anchor subscene as $A_l$. Denote the subscene just to the right of the left anchor subscene as $A_{l+1}$, then next subscene to the right as $A_{l+2}$ and so on.

FLUT of the anchor subscene $T_{A_l}^F$ is obtained by averaging frame FLUTs $T_j^F$ for images/frames in the anchor subscene. In contrast, FLUTs for other (non-anchor) subscenes $T_{A_{l+1}}^F$, $T_{A_{l+2}}^F$ and so on, are obtained by averaging frame FLUTs in the overlap lengths or windows-which may be extended and hence may contain more images/frames that those—of these subscenes. The FLUTs for these non-anchor subscenes can be initially computed or reused/procured (to the extent available) from results of the iterative overlapping operations that were performed before the FLUT interpolation operations. In some operational scenarios, input and mapped codewords in these FLUTs are represented in a normalized codeword domain, e.g., $T_j^F(b) \in [0, 1.0]$.

As shown in FIG. 2G for Case 2, the FLUTs of some or all the (non-anchor) subscenes (denoted as $A_{l+i}$) to the right of the anchor subscene as follows:

$$T_{A_{l+i}}^F(b) = w_{A_{l+i}} \times T_{A_{l+i}}^F(b) + (1 - w_{A_{l+i}}) \times T_{A_l}^F(b) \quad (36)$$

where i represents an iterator, is equal to 1 for the subscene to the right of the anchor subscene, equal to 2 for the next subscene and so on. The symbol $w_{A_{l+i}}$ represents weights used in expression (36) above for adjusting FLUTs for the (non-anchor) subscenes.

The weights $w_{A_{l+i}}$ can be derived as follows:

$$w_{A_{l+i}} = \min(\theta \times i, 1) \quad (37)$$

where θ represents a transition rate of the FLUT for the anchor subscene. Example values of θ may include, but are not necessarily limited to only, 0.10.

With the updated FLUTs for the (non-anchor) subscenes in expression (36) above and the HDR histograms $h_j^v$ for each frame available for each frame in these subscenes, DC values (denoted with a different symbol as A) for each image/frame (e.g., the j-th image/frame) in such a (non-anchor) subscene $A_{l+i}$ can be computed as follows:

$$\lambda_j = \frac{1}{H \times W} \sum_b T_{A_{l+i}}^F(b) \times h_j^v(b) \quad (38)$$

The FLUT adjustment in expression (36) above ensures that the FLUT transition is smooth enough from one subscene to the next. However, even after the FLUT adjustment, there may still be abrupt DC changes as illustrated in the plot of the top graph of FIG. 3AC. Offsets can be further applied to the adjusted FLUTs to remove these abrupt DC value changes.

As the FLUT (the leftmost piece in the plots of FIG. 3AC) for the left anchor subscene $A_l$ is fixed, the adjusted FLUTs for the rest of the subscenes can be moved along the vertical axis of FIG. 3AC with (positive or negative) offsets with respect to the FLUT for the left anchor subscene $A_l$.

The moving of the adjusted FLUTs for the subscenes can be made from left to right, starting with subscene $A_{l+1}$. For the purpose of illustration only, the frame index of the last image/frame in the anchor subscene $A_l$ is q−1. Accordingly, the first image/frame in the adjacent non-anchor subscene $A_{l+1}$ is q. In some operational scenarios, overlapping images/frames added to the length of a subscene are not considered as part of the subscene for the purpose of computing temporal violations. At the boundary between (or separating) subscene $A_{l+1}$ and $A_l$, the (actual) DC value difference is given as $\Delta_q = \lambda_q - \lambda_{q-1}$. A reference DC value difference for temporal consistency may be given as $\mathfrak{I}_q^{DC} = \chi_q - \chi_{q-1}$. These two DC value differences can be used to derive or generate an offset $\rho = \Delta_g - \mathfrak{I}_q^{DC}$ to move the FLUT $T_{A_{l+1}}^F$ for the subscene $A_{l+1}$. Adding this offset to the FLUT $T_{A_{l+1}}^F$ increase the (actual) DC value for image/frame q by ρ. This results in a new (actual) DC value difference at q and q−1 of $\overline{\Delta}_q$, which is exactly equal to the reference DC value difference $\mathfrak{I}_q^{DC}$. This may be deduced or proved as follows:

$$\overline{\Delta}_q =$$
$$\lambda_q - \lambda_{q-1} = (\lambda_q + \rho) - \lambda_{q-1} = \lambda_q + \rho - \lambda_{q-1} = \lambda_q + (\mathfrak{I}_q^{DC} - \Delta_q) -$$
$$\lambda_{q-1} = \lambda_q - \lambda_{q-1} + \mathfrak{I}_q^{DC} - \Delta_q = \Delta_q - \Delta_q + \mathfrak{I}_q^{DC} = \mathfrak{I}_q^{DC} \quad (39)$$

Hence, adding the offset brings the updated DC value difference $\overline{\Delta}_q$ to the same value as the reference DC value difference $\mathfrak{I}_q^{DC}$. This movement of the FLUT for the subscene $A_{l+1}$ completes the alignment of the FLUT for the adjacent non-anchor subscene $A_{l+1}$ with the FLUT for the anchor subscene $A_l$. Next, the FLUT for the adjacent non-anchor subscene $A_{l+1}$ is fixed; the FLUT for the subscene $A_{l+2}$ adjacent to subscene $A_{l+1}$ is moved with respect to the FLUT for subscene $A_{l+1}$ in a similar manner as described herein. This movement process with offset can be repeated for every non-anchor subscene in the primary scene at node N+1 until the last subscene on the left is reached, as illustrated in the plot of the bottom graph of FIG. 3AC, thereby completely removing temporal inconsistencies as DC value differences are restored to their (original) values without scene partition/segmentation.

In Case 2 of FIG. 2G, the primary scene contains both right and left segment boundaries, for example in the segment assigned to node N of FIG. 3AA. Interior subscenes in this case need to align with both right and left segment boundaries. Denote left and right anchor subscenes as $A_l$ and $A_r$, respectively. Denote FLUTs for these anchor subscenes as $T_{A_l}^F$ and $T_{A_r}^F$, respectively. FLUTs for the interior subscenes can be adjusted as follows:

$$T_{A_i}^F(b) = w_{A_i} \times T_{A_i}^F(b) + w_{A_l} \times T_{A_l}^F(b) + w_{A_r} \times T_{A_r}^F(b) \quad (40)$$

$$\overline{w}_{A_l} = \min(\theta \times (r-i), 1) \quad (41\text{-}1)$$

$$\overline{w}_{A_r} = \min(\theta \times (i-l), 1) \quad (41\text{-}2)$$

$$\overline{w}_{A_i} = \max(1 - w_{A_l} - w_{A_r}, 0) \quad (41\text{-}3)$$

where i represents an iterator, $i \in [l+1, r-1]$. The symbols $w_{A_l}$, $w_{A_r}$, $w_{A_i}$ represent weights used in expression (40) above for adjusting FLUTs for the interior subscenes. The weights $w_{A_l}$, $w_{A_r}$, $w_{A_i}$ can be normalized to WAY, WAY, WAY, respectively, using their sum $w_t = \overline{w}_{A_l} + \overline{w}_{A_r} + \overline{w}_{A_i}$ to bring the total of all the weights to unit, as follows:

$$w_{A_l} = \overline{w}_{A_l}/w_t \quad (41\text{-}4)$$

$$w_{A_r} = \overline{w}_{A_r}/w_t \quad (41\text{-}5)$$

$$w_{A_i} = w_{A_i}/w_t \quad (41\text{-}6)$$

Offsets can be further added to the adjusted FLUTs (in expression (40) above) for the interior subscenes to reduce abrupt DC changes. As there are two anchor subscenes and the FLUTS for both anchor subscenes are fixed, adding offsets to the FLUTs for the interior subscenes to reduce temporal violations is a more constrained problem than adding offsets to FLUTs for a scene with only one anchor subscene present.

Without loss of generality, adding offsets to the FLUTs for the interior subscenes can start from the interior subscene adjacent to the left anchor subscene $A_l$ and traverse towards the right anchor subscene $A_r$. It should be noted that, in other embodiments, adding offsets to the FLUTs can start from the interior subscene adjacent to the right anchor subscene $A_r$ and traverse along a reverse direction toward the left anchor subscene $A_l$.

The DC value of the first frame in the current interior subscene can have continuity with the DC value of the last frame in the left (or previous) subscene, as offsets are added to the FLUTs. However, as soon as the last interior subscene, which is $A_{r-1}$ adjacent to the right anchor subscene $A_r$ in the present example, no offset can be added to the FLUT for the right anchor subscene $A_r$ for the purpose of aligning the right anchor subscene $A_r$ with the last interior subscene $A_{r-1}$. The FLUTs for the anchor subscenes are unadjusted or immutable.

An alignment error (denoted as $\xi$) at the boundary between or separating $A_{r-1}$ and A can be computed as $\xi = \mathfrak{S}_q^{DC} - \Delta_q$, where q is the frame index of the first image/frame of the right anchor subscene $A_r$, as illustrated in the bottom graph of FIG. 3AD.

Node N can determine whether the alignment error $\xi$ is small enough (e.g., if measured below a maximum alignment error threshold, etc.). In response to determining that the alignment error $\xi$ is small enough, the FLUTs may be used for the subscenes without further error diffusion.

On the other hand, in response to determining that the alignment error $\xi$ is small enough, the alignment error $\xi$ at the boundary between or separating $A_{r-1}$ and $A_r$ is diffused toward the left anchor subscene $A_l$ to previous (e.g., interior, etc.) subscenes before the subscene $A_{r-1}$ to avoid a relatively large DC value change occurring at a single place or location.

Error diffusion can be done by adding offsets to other subscene FLUTs while satisfying certain error diffusion related criteria. As noted, the FLUTs for the left and right anchor subscenes remain unaltered.

Before or at the beginning of error diffusion operations, the following error diffusion related data values can be computed or derived:

Number of positive DC differences $\mathfrak{S}_q^{DC} > 0$, denoted by $\mathbb{N}^+$ Number of negative DC differences $\mathfrak{S}_q^{DC} > 0$, denoted by $\mathbb{N}^-$ Total of all positive DC differences $\mathbb{T}^+ = \Sigma \mathfrak{S}_q^{DC}$, where $\mathfrak{S}_q^{DC} > 0$ Total of all negative DC differences $\mathbb{T}^- = \Sigma - \mathfrak{S}_q^{DC}$, where $\mathfrak{S}_q^{DC} < 0$ where q represents a boundary image/frame between or separating any two adjacent subscenes in the scene P. All these parameters $\mathbb{N}^-$, $\mathbb{N}^+$ and $\mathbb{T}^-$, $\mathbb{T}^+$ may be computed as positive values for computation efficiency purposes.

Denote DC value shift as $\mathbb{S}$, which may be used to diffuse or distribute the alignment error to other subscenes as appropriate. Denote residue as $\mathbb{R}$, which represents a remaining error after all options to diffuse the alignment error into the other subscenes safely without introducing any (e.g., additional, new, etc.) violations have been exhausted. These parameters may be computed in advance even before FLUT interpolation, as FLUT interpolation and error diffusion are deterministic. In operational scenarios in which $\xi > 0$, these parameters can be computed (e.g., with an ordered set of expressions, etc.) as follows:

$$\mathbb{S} = \min\left(\frac{\xi}{\mathbb{N}^-}, \omega\right) \quad (42)$$

$$\mathbb{R} = \max(\xi - \mathbb{S} \times \mathbb{N}^- - \mathbb{T}^+, 0)$$

$$\mathbb{S} = \mathbb{S} + \frac{\mathbb{R}}{\mathbb{N}^-}$$

where $\omega$ represents a bias first introduced in Step D of FIG. 2E.

In operational scenarios in which $\xi < 0$, these parameters can be computed (e.g., with an ordered set of expressions, etc.) as follows:

$$\mathbb{S} = \min\left(\frac{-\xi}{\mathbb{N}^+}, \omega\right) \quad (43)$$

$$\mathbb{R} = \max(-\xi - \mathbb{S} \times \mathbb{N}^+ - \mathbb{T}^-, 0)$$

$$\mathbb{S} = \mathbb{S} + \frac{\mathbb{R}}{\mathbb{N}^+}$$

where adjustments are made in comparison with expressions (42) above to keep the residue and DC value shift non-negative in these operational scenarios.

Adding either $$\frac{\mathbb{R}}{\mathbb{N}^+} \text{ or } \frac{\mathbb{R}}{\mathbb{N}^-}$$

to $\mathbb{S}$ in expressions (42) and (43) for $\xi < 0$ and $\xi > 0$ respectively is performed when the remaining error is greater than zero (0), or $\mathbb{R} > 0$. This may introduce temporal violations back at some or all the subscene boundaries to some extent. This ($\mathbb{R} > 0$) arises when there are not enough subscenes to diffuse the alignment error. In some operational scenarios, the average and minimum distance constraints may be relaxed for the current segment for the purpose of alleviating, reducing or avoiding the remaining error in error diffusion.

Without loss of generality, error diffusion can traverse from left to right, starting at subscene $A_{i+1}$ and ending at $A_{r-1}$. A diffusing error offset p used to diffuse the alignment error to the boundary between $A_i$ and $A_{i+1}$ can be initialized to $\rho = \Im_q^{DC} - \Delta_q$, where q is the frame index of the first frame in $A_{i+1}$, and further updated as follows:

If error $\xi > 0$ and $\Im_q^{DC} < 0$, then $\rho = \rho - \mathbb{S}$ (44-1)

If error $\xi > 0$ and $\Im_q^{DC} > 0$, then $\rho = \rho - \Im_q^{DC}$ (44-2)

If error $\xi < 0$ and $\Im_q^{DC} < 0$, then $\rho = \rho - \Im_q^{DC}$ (44-3)

If error $\xi < 0$ and $\Im_q^{DC} > 0$, then $\rho = \rho + \mathbb{S}$ (44-4)

The updated offset $\rho$ is added to $T_{A_{i+1}}^F$ to diffuse the alignment error to appropriate subscene boundaries. FIG. 3AF illustrates an example DC value plot (in the bottom graph) after error diffusion. As compared with a DC value plot (in the top graph of FIG. 3AF and the bottom graph of FIG. 3AD), the DC value plot after error diffusion looks more continuous.

After FLUT interpolation and/or error diffusion, Pass-1 of FIG. 2A is finished. FLUTs for anchor and non-anchor subscenes as well as primary scenes not split into subscenes can be stored as auxiliary data and passed as part of input to Pass-2 of FIG. 2A.

Second List of Scenes

As used herein, "a scene . . . on a (segment) boundary" of a segment may mean that the scene is a parent scene identified before a sequence of (e.g., consecutive, sequential, etc.) images/frames is partitioned or segmented into a plurality of segments to be assigned respectively to a plurality of nodes in a multi-node video encoding system, where the parent scene has images/frames on both sides of the segment boundary. Additionally, optionally or alternatively, the scene may refer to a primary segment—in the segment—derived from such a parent scene.

In a segment assigned to node N, $\Psi_1^N$ represents the updated first list of scenes-which may be referred to as the second list of scenes—obtained after short scene merging, for example in block 206 of FIG. 2B. These scenes may be referred to as primary scenes. A scene cut for a scene may be used to indicate the first frame index (corresponding to the first image/frame) of the scene. The scenes that lay on the segment boundaries are split into secondary scenes or subscenes, for example such as primary scenes 1 and 3 illustrated in FIG. 3AG.

Secondary scenes or subscenes generate additional scenes cuts that are appended to the first list of scenes to generate the updated first list of scenes. The first image/frame $f_{NL}$ of the segment is also deemed as a scene cut, as the node can only start encoding from the first image/frame $f_{NL}$ of the segment. While the last image/frame $f_{(N+1)L-1}$ of the segment is at the end rather than the end of a scene (or the last scene) in the segment, the image/frame (e.g., outside the segment, in a bumper section, etc.) immediately following the last frame $f_{(N+1)L-1}$ may be included in the updated list of scenes as an end marker for the scene cuts. FIG. 3AG illustrates example initial scene cuts after short scene merging in a top graph ("Node-N (First List of Scenes)") and example final scene cuts after scene splitting in a bottom graph ("Node-N(Second List of Scenes)").

After scene splitting, the primary scenes 1 and 3 in the first list do not exist in the second list anymore and are replaced by the secondary scenes in the second list. As shown in FIG. 3AG, there is one primary scene (P) and six secondary scenes (A, B, C, D, E and F) in second list of scenes for node N.

Let $\overline{\Psi}_l^N$ and $\overline{\Psi}_r^N$ represent left and right sets of scene cuts near the left and right segment boundary respectively for node N. The second list of scenes $\Psi_2^N$ can be mathematically represented by the following set operation.

$$\Psi_2^N = \overline{\Psi}_1^N \cup \overline{\Psi}_l^N \cup \overline{\Psi}_r^N \cup f_{NL} \quad (45)$$

In operational scenarios in which a scene is longer than a segment length of a segment, there may not be separate left or right sets, but a single set of secondary scene cuts in the segment.

Denote the starting frame index for the k-th scene in K scenes identified in the list $\Psi_2^N$ for the segment as $S_k$, where k ranges from 0 to K−1. The elements in the second list can be expressed as follows:

$$\Psi_2^N = \{S_0, S_1, S_2 \ldots S_{k-1}, S_k, S_{k+1} \ldots S_K\} \quad (46)$$

where $S_K$ represents a dummy scene cut that is just after the last frame of the segment and is only used as end of list marker.

The second list of scenes $\Psi_2^N$ can be handed over or provided as input to Pass-2 along with auxiliary data.

Auxiliary Data for Subscenes

The second list of scenes $\Psi_2^N$ has detail information about the primary and secondary scenes in the segment. In some operational scenarios, no auxiliary data is provided for the primary scenes from Pass-1 to Pass-2, whereas auxiliary data is provided for the secondary scenes (or subscenes) from Pass-1 to Pass-2. The auxiliary data includes total number(s) of overlapping images/frames on one or both of left and right sides of each secondary scene identifying a specific statistics collection window for the secondary scene as well as FLUTs for each secondary scene.

As noted, a scene in the second list of scenes in a MADC architecture may be either a primary scene or a secondary scene. Pass-2 processes a scene to produce a set of composer metadata parameters for every frame in that scene. Composer metadata or operational parameters therein specify backward reshaping mappings (denoted as "RPU" in FIG. 2A) that can be included in a video signal (denoted as "VES" or video encoded signal) to be received by a recipient device and used by the recipient device to generate backward reshaped or reconstructed (e.g., HDR, etc.) images from forward reshaped images (denoted as "Reshaped SDR" in FIG. 2A), for example encoded in a base layer (denoted as "BL" in FIG. 2A)—of the received video signal. Example forward and backward reshaping respectively using forward reshaping metadata parameters (or simply reshaping metadata or reshaping parameters) and backward reshaping metadata parameters (or composer metadata) are described in U.S. Provisional Patent Application Ser. No. 63/013,063, "Reshaping functions for HDR imaging with continuity and reversibility constraints," by G-M. Su, filed on Apr. 21, 2020, and U.S. Provisional Patent Application Ser. No. 63/013,807 "Iterative optimization of reshaping functions in single-layer HDR image codec." by G-M. Su and H. Kadu, filed on Apr. 22, 2020, the contents of which are entirely incorporated herein by reference as if fully set forth herein.

In forward reshaping operations of Pass-2, reshaping parameters can be computed from all images/frames in a statistics collection window of that scene. For a primary scene, the statistics collection window includes all the images/frames in the primary scene, exclusive of any images/frames outside the primary scenes. In contrast, for a secondary scene, the statistics collection window includes all images/frames in that secondary scene plus some extra images/frames from one or both of previous and next subscenes. These extra images/frames may be referred to as overlapping images/frames.

Hence in terms of statistics collection window, a primary scene does not overlap with any neighboring scene, whereas a secondary scene is allowed to (e.g., partly, etc.) overlap with neighboring secondary scenes. Overlapping images/frames for a subscene does not come from any neighboring primary scene.

FIG. 3AH illustrates example forward reshaping statistics windows (or statistics collection windows) in two segments assigned to nodes N and N+1. As shown, two portions—each of which represents a primary scene in a respective segment—of a parent scene P are present in the two segments. The forward reshaping statistics window (not shown) for subscene A does not have extra images/frames on the left, but may have zero or more extra images/frames on the right, in addition to images/frames in the subscene A. The forward reshaping statistics window (not shown) for subscene H does not have extra images/frames on the right, but may have extra images/frames on the left. The forward reshaping statistics window (not shown) for each of subscenes B, E, F, G may have extra frames on both left and right.

As shown in FIG. 3AH, the forward reshaping statistics window for anchor subscene C has no overlapping images/frames on the left from subscene B, but takes all the images/frames from subscene D on the right by way of a trailing bumper section. The forward reshaping statistics window for anchor subscene D has no overlapping images/frames on the right from subscene E, but takes all the images/frames from subscene C on the left by way of a leading bumper section. Hence, the forward reshaping statistics windows for adjacent anchor subscenes C and D are the same. As a result, same forward and/or backward reshaping parameters can be computed by nodes N and N+1 for the anchor subscenes C and D even if these anchor scenes are (e.g., independently, etc.) encoded in isolation by the two different nodes. This helps achieve a consistent look on neighboring subscenes across nodes.

In some operational scenarios, trim detection and correction are performed while building FLUTs for subscenes. Trim pass correction information generated from the trim detection and correction can be included as a part of the auxiliary data with the FLUTs for the subscenes.

Scene-Based Encoding in Segment

In Pass-2 of MADC operations as illustrated in FIG. 2A, each node in a plurality of nodes in a multi-node video encoding system is allocated, or assigned for scene-based video encoding with, a fixed-length segment (except for the last node in the plurality of nodes). Images/frames in segments are respectively encoded and (e.g., sequentially, etc.) combined by the plurality of nodes into a video signal such as a set of multiple video segments or an overall coded bitstream.

As noted, Pass-1 operations of MADC operations as illustrated in FIG. 2A generates a (e.g., second, updated first, etc.) list of scenes that can help the video signal reduce the bitrate used to transmit or deliver image metadata in the video signal, while maintaining temporal consistency across different portions of the video signal that are encoded by different (e.g., neighboring, etc.) nodes.

A node in Pass-2 uses this (second) list of scenes to perform scene based encoding operations for scenes or subscenes-identified by the list—in the segment. While the node is provided with bumper images/frames in leading and/or trailing bumper sections, the node does not need to encode these bumper images/frames into the video signal. These bumper images/frames including any anchor subscenes therein can be used to collect forward reshaping statistics in forward reshaping related operations for temporal stability.

Figure 2H:
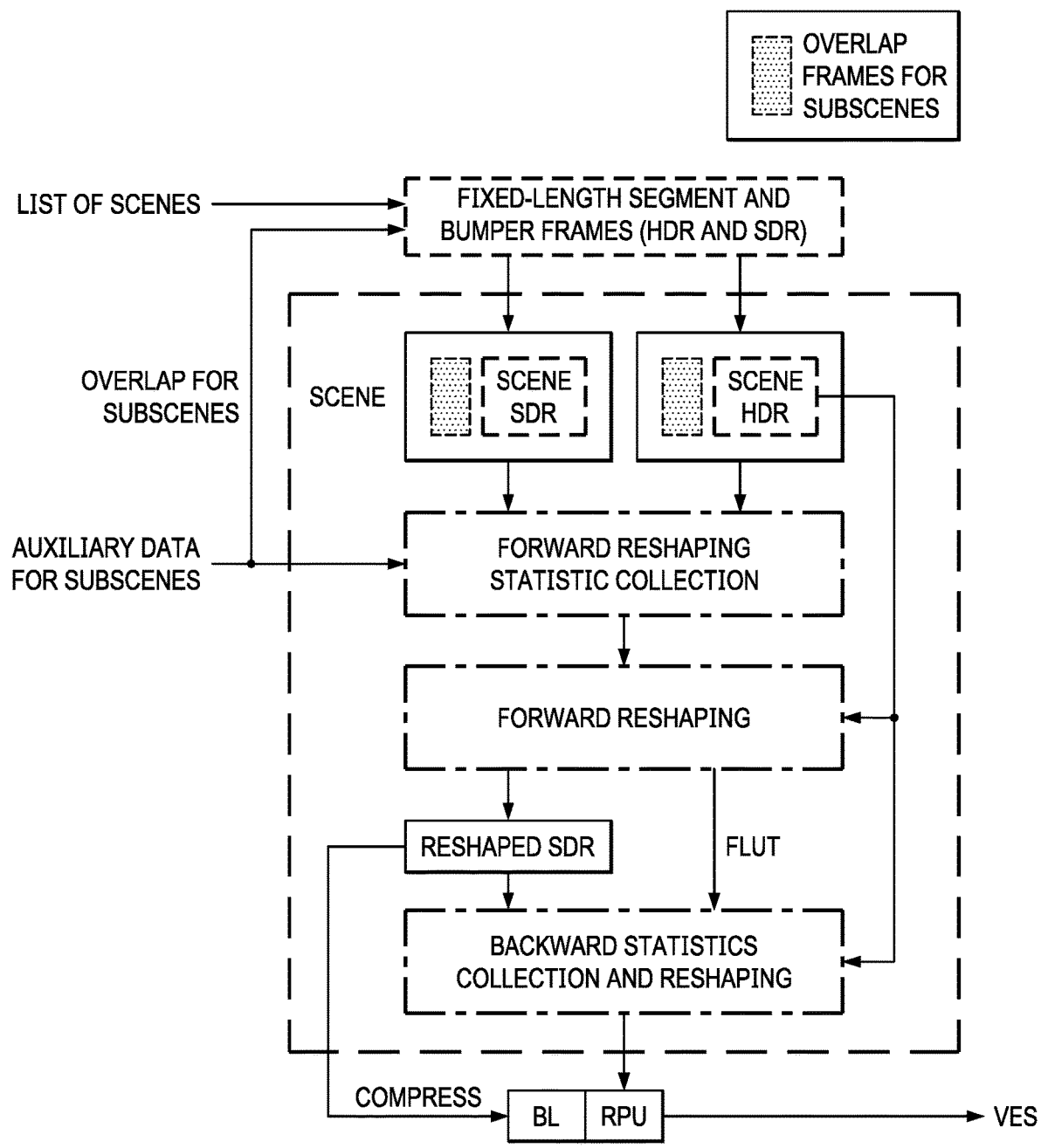
FIG. 2H through FIG. 2K illustrate example process flow for scene-based encoding and related operations.

FIG. 2H illustrates example process flow for scene-based encoding, for example in Pass-2 of FIG. 2A. As shown, the process flow is provided with images/frames in a fixed-length segment and bumper images/frames in leading and/or trailing bumper section(s). In addition, the process flow is provided with a (second) list of scenes—which include primary scenes not subject to scene splitting and subscenes in place of primary scenes subject to scene splitting—and auxiliary data for subscenes, from Pass-1.

The (second) list of scenes may comprise scene cut information that identifies a scene in the segment. The node can access SDR images (denoted as "Scene SDR") and HDR images (denoted as "Scene HDR") in the scene.

In the case that the scene represents a secondary scene (or a subscene), the auxiliary data may comprise a portion for the secondary scene. The node can use the auxiliary data portion for the scene to identify and access extra images/frames in a statistics collection window for the subscene.

A primary scene and a secondary scene can be handled in a similar manner, except for two differences. First, Pass-2 operations performed for the primary scene by the node include building or generating a FLUT, whereas Pass-2 operations performed for the secondary scene by the node include copying (e.g., frame, subscene, both, etc.) FLUTs from Pass-1 through the auxiliary data. In some operational scenarios, codewords represented in a normalized range in the copied FLUTs can be scaled or denormalized to a codeword range/space (e.g., 28 if the video signal of an 8-bit bit depth, 210 if the video signal of a 10-bit bit depth, etc.) available in (a base layer of) of the video signal of a specific bit-depth. Second, the primary scene does not use any overlapping or extra frames for forward reshaping, while the secondary subscene may use overlapping or extra frames in neighboring subscenes.

Backward reshaping process is exactly the same for primary and secondary scenes. There is no overlap in the backward reshaping phase. A composite bitstream consisting of RPU metadata and compressed base layer is generated as the output. Details of each block are described in the following subsections.

Figure 2I:
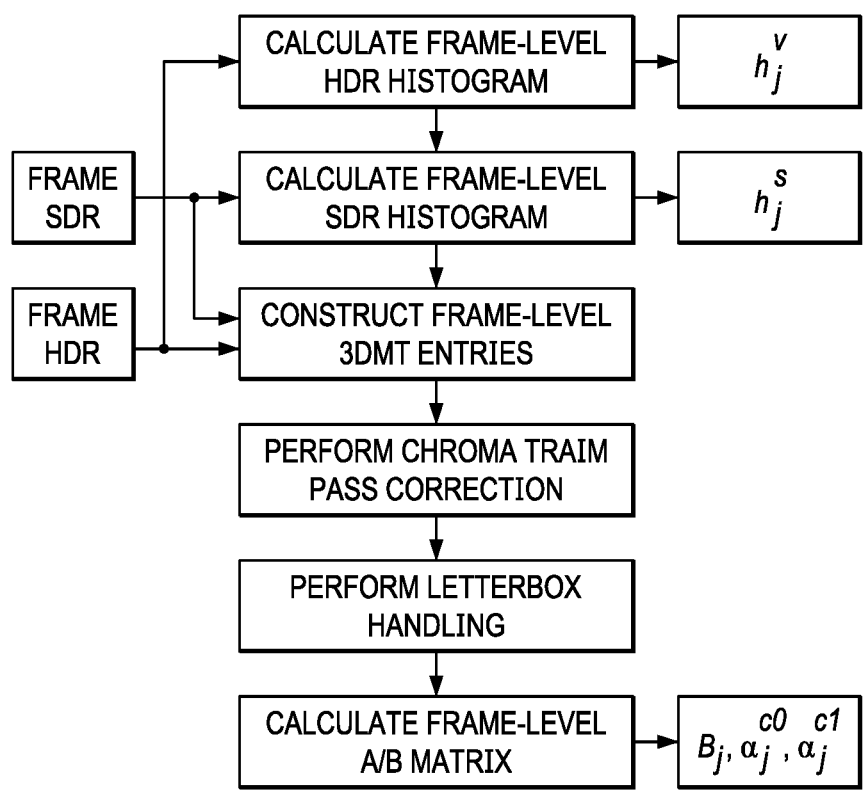
Figure 2J:
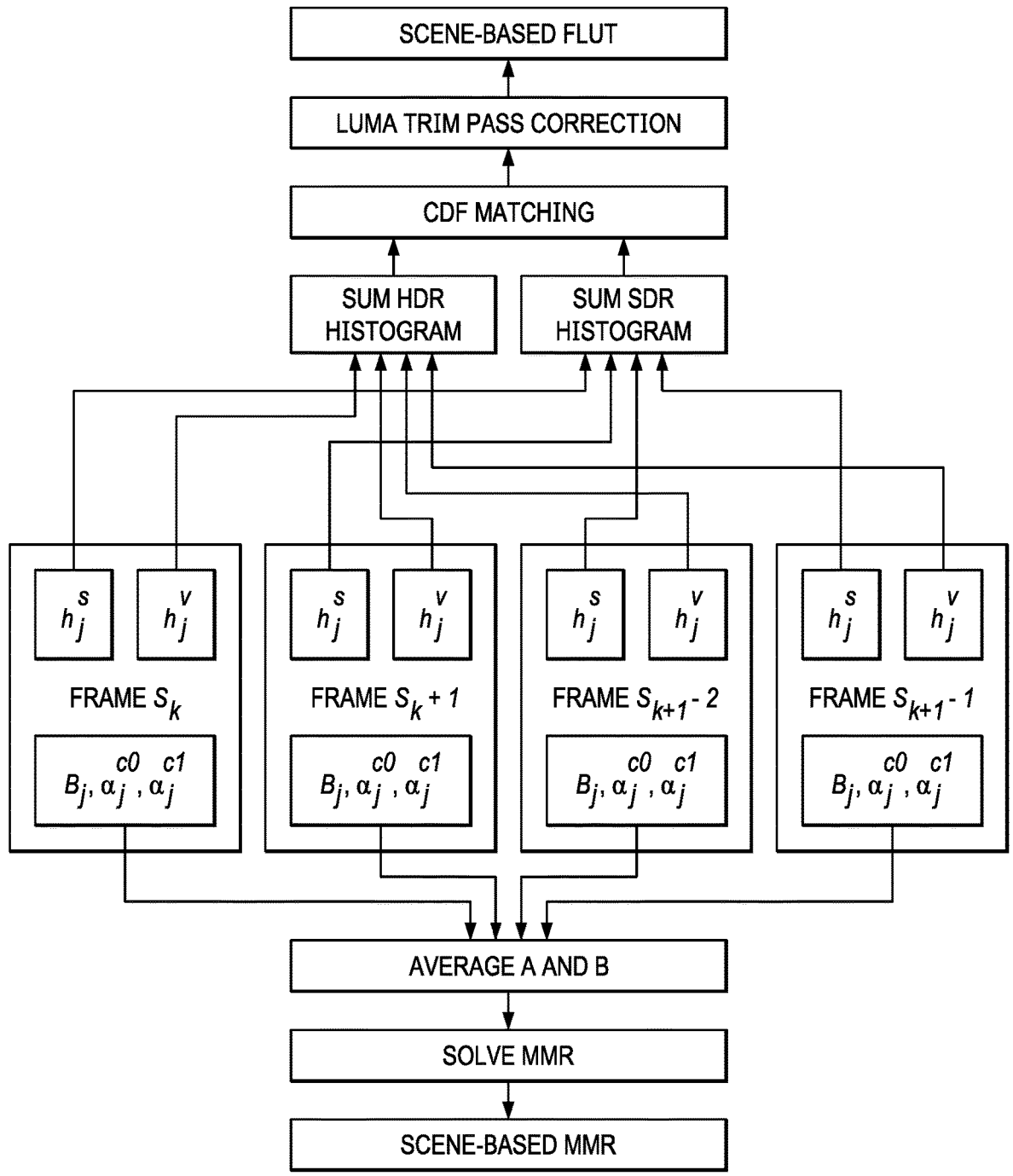

As shown in FIG. 2H, in some operational scenarios, the forwarding reshaping related operations in the scene-based encoding operations include frame-level forward reshaping statistics collection operation as further illustrated in FIG. 2I and frame-level forward reshaping operation as further illustrated in FIG. 2J.

The frame-level forward reshaping statistics collection operation collects image content dependent statistics for each image/frame in the statistics collection window of the scene.

As noted, a statistics collection window for a subscene may include overlapping images/frames in neighboring subscene(s), whereas a statistics collection window for a primary scene only include images/frames in the primary scene may not include overlapping images/frames. As noted, information relating to overlapping images/frames for every subscene can be included in and procured from the auxiliary data.

The image content dependent statistics collected by the frame-level forward reshaping statistics collection operation of FIG. 2H can include statistics for luma (reshaping) as well as statistics for chroma (reshaping), as illustrated in FIG. 2I. The statistics collected for luma (reshaping) can be used to generate scene-level FLUT for reshaping luma codewords, as illustrated in FIG. 2J. The statistics collected for chroma (reshaping) can be used to generate scene-level MMR mappings for reshaping chroma codewords, as illustrated in FIG. 2J. Example MMR based operations are described in U.S. Pat. No. 8,811,490, which are incorporated by reference in its entirety as if fully set forth herein.

Luma Statistics Collection and Luma Forward Reshaping

As shown in FIG. 2I, for luma, a histogram (denoted as $h_j^s(b)$) can be used to cache or store (e.g., in frame buffer, etc.) image dependent statistics from SDR luma codewords in each (or the j-th) SDR image/frame in the collection window, whereas a histogram (denoted as $h_j^v(b)$) can be used to cache or store (e.g., in frame buffer, etc.) image dependent statistics from HDR luma codewords in each (or the j-th) HDR image/frame in the collection window, where b represents a histogram bin index. The j-th SDR image and the j-th HDR image depict the same visual content and form an HDR-SDR pair.

The (frame level) forward reshaping may use a scene-level FLUT to forward reshape HDR codewords in each HDR image in a plurality of HDR images of the scene into reshaped SDR codewords in a corresponding reshaped SDR image in a plurality of reshaped SDR images of the scene.

As illustrated in the upper portion of FIG. 2J, the statistics of each image/frame (or each image/frame pair) within the (current) scene, as collected for luma (reshaping), can be used to compute optimized forward reshaping coefficients of the scene-level FLUT specifically optimized for the scene.

Take the k-th scene from the list of K scenes as an example. Images/frames in this (current) scene may range from frame index $S_k$ to $S_{k+1}-1$. As shown in FIG. 2J, all frame-level SDR histograms for all SDR images/frames in the k-th scene can be collectively used, or aggregated, to generate a scene-level SDR histogram for the scene, as follows:

$$h^s(b) = \sum_{j=S_k}^{S_{k+1}-1} h_j^s(b) \qquad (47)$$

Similarly, all frame-level HDR histograms for all HDR images/frames in the scene can be collectively used, or aggregated, to generate a scene-level HDR histogram for the scene, as follows:

$$h^v(b) = \sum_{j=S_k}^{S_{k+1}-1} h_j^v(b) \qquad (48)$$

As shown in the upper portion of FIG. 2J, having both scene-level histograms, CDF matching may be used to generate or create a luma forward reshaping mapping function from HDR codewords to SDR codewords. Example cumulative density function (CDF) matching operations are described in PCT Application No. PCT/US2017/50980, filed on Sep. 11, 2017; U.S. Provisional Application Ser. No. 62/404,307, filed on Oct. 5, 2016, (also published in Apr. 5, 2018, as U.S. Patent Application Publication Ser. No. 2018/0098094), the entire contents of which are hereby incorporated by reference as if fully set forth herein. For the purpose of illustration only, the luma forward reshaping mapping function (e.g., a scene-level FLUT) $\tilde{T}^F$ obtained through CDF matching is represented as follows:

$$\tilde{T}^F = CDF\_MATHCING(h^v(b), h^s(b)) \qquad (49)$$

A (e.g., scene-level, frame-level, etc.) FLUT generated from CDF matching can be altered to remove or prevent clipping artifacts (or visual artifacts generated from clipping). The clipping artifacts may be caused by trim operations (e.g., manually, etc.) added by colorists.

Operations used to remove or prevent these artifacts may be referred to as trim correction (e.g., luma trim-pass correction as shown in FIG. 2J, etc.), and may be applied to remove or prevent visual artifacts caused by clipping from tone mapping, image editing etc. Trim correction operations for primary and secondary scenes are similar, except that, for a secondary scene (or a subscene), trim corrected frame-level FLUTs $T_j^F$ for images/frames in a statistics collection window of the subscene are averaged to generate a (scene-level or subscene-level) FLUT for the subscene, whereas, for a primary scene, a trim corrected scene-level FLUT is directly used for the primary scene. Hence, trim correction is performed at frame-level for secondary scenes, whereas trim correction is performed at scene-level for primary scenes.

Clipping related statistics can be measured or collected in a primary scene or an image/frame of a subscene. Example trim-pass correction operations including clipping related statistics are described in U.S. Provisional Patent Application No. 63/089,154, "TRIM-PASS CORRECTION FOR CLOUD-BASED CODING OF HDR VIDEO," by HARSHAD KADU et al., filed on 8 Oct. 2020; the entire contents of which are hereby incorporated by reference as if fully set forth herein.

In some operational scenarios, in response to determining that trim-related clipping is not found, trim correction is not performed; hence $T^F = \tilde{T}^F$, where $\tilde{T}^F$ denotes a pre-trim-corrected FLUT and $T^F$ denotes a final FLUT to be used in forward reshaping. Otherwise, in response to determining that trim-related clipping is found, trim correction is performed as follows.

First, a range restricted DM curve (denoted as $\tilde{T}_{rr}^{DM}$) is constructed or built from a reference (e.g., original unrestricted, etc.) DM curve (denoted as $\tilde{T}^{DM}$). Initially, the reference DM curve may be specified or defined based on group values of luminance or luma values from the primary scene or the image/frame of the subscene. For example, initially, the reference DM curve $\tilde{T}^{DM}$ can be constructed using a standard-based or proprietary display management (DM) tone mapping function with minimum, average and maximum HDR luma values ($v_{min}^Y$, $v_{avg}^Y$, $v_{max}^Y$) in the scene or the image/frame as input parameters, as follows:

$$\tilde{T}^{DM} = DM\_TONE\_MAPPING(v_{min}^Y, v_{avg}^Y, v_{max}^Y) \qquad (50)$$

Differential CDF FLUT $\tilde{t}^F$ and DM FLUT $\tilde{t}^{DM}$ are derived from their original counterparts $\tilde{T}^F$ and $\tilde{T}^{DM}$, respectively, as follows:

$$\tilde{t}^F(i) = \tilde{T}^F(i) - \tilde{T}^F(i-1) \text{ for } i \in [v_{min}^Y+1, v_{max}^Y] \qquad (51\text{-}1)$$

$$\tilde{t}^{DM}(i) = \tilde{T}^{DM}(i) - \tilde{T}^{DM}(i-1) \text{ for } i \in [v_{min}^Y+1, v_{max}^Y] \qquad (51\text{-}2)$$

where i represents an entry/index in the FLUT or an array of entries therein. Entry/index values outside the entire index range $[v_{min}^Y, v_{max}^Y]$ can be set to, or indicated as, zero. A differential DM curve can then be bounded, constrained or scaled to the entire SDR range of the differential CDF FLUT curve, as follows:

$$\tilde{t}_{rr}^{DM}(i) = \tilde{t}^{DM}(i) \times \frac{\sum_i \tilde{t}^F(i)}{\sum_i \tilde{t}^{DM}(i)} \quad (52)$$

The bounded differential DM curve as given in expression (52) above may be referred to as a range restricted differential DM curve. A cumulative sum of elements represented in the range restricted differential DM curve provides the previously mentioned range restricted DM curve $\tilde{T}_{rr}^{DM}$, as follows:

$$\tilde{T}_{rr}^{DM}(i) = \tilde{t}_{rr}^{DM}(i) + \tilde{T}_{rr}^{DM}(i-1) \text{ for } i>0 \quad (53\text{-}1)$$

$$\tilde{T}_{rr}^{DM}(0) = \tilde{T}^F(0) \text{ for } i=0 \quad (53\text{-}2)$$

Trim correction can be applied in brightness below the mid point or the midrange of the entire luminance range; in this case, the trim correction may be referred to as low intensity trim correction. Additionally, optionally or alternatively, trim correction can be applied in brightness above the mid point or the midrange of the entire luminance range; in this case, the trim correction may be referred to as high intensity trim correction.

For low intensity trim correction, the CDF and DM curves are merged or combined from $v_{min}^Y$ until a merging point determined for the low intensity trim correction. On the other hand, for high intensity trim correction, the CDF and DM curves are merged or combined from a merging point for the high intensity trim correction onwards. A merging point is an FLUT entry/index value that marks either the end of CDF and DM merging in the low intensity trim correction or the beginning of the CDF and DM merging in the high intensity trim correction.

An initial estimate of a merging point may be made with respect to an entire SDR codeword range. Example operations for estimating merging point(s) are described in the previously mentioned U.S. Provisional Patent Application No. 63/089,154. The operations described therein for secondary scenes (or subscenes) of a segment can be likewise performed herein for primary and secondary scenes of a segment.

Denote the first estimates of merging points as $s_l^{m,1}=s_l^m$ and $s_h^{m,1}=s_h^m$ for low and high intensity regions respectively.

The CDF curve $\tilde{T}^F$ can be used to determine or estimate equivalent merging points ($v_l^{m,1}$ and $v_h^{m,1}$) in the HDR range by reverse mapping SDR codewords representing the first estimates of merging points in the SDR codeword range to HDR codewords, as follows, $$v_l^{m,1} = \max\{i | \tilde{T}^F(i) \leq s_l^{m,1}\} \quad (54\text{-}1)$$

$$v_h^{m,1} = \min\{i | \tilde{T}^F(i) \geq s_h^{m,1}\} \quad (54\text{-}2)$$

These first estimates of the merging points can be refined using the range restricted DM curve to generate a second, more accurate estimate of the merging points in the SDR range, $s_l^{m,2}$ and $s_h^{m,2}$, as follows:

$$s_l^{m,2} = \tilde{T}_{rr}^{DM}(v_l^{m,1}) \quad (55\text{-}1)$$

$$s_h^{m,2} = \tilde{T}_{rr}^{DM}(v_h^{m,1}) \quad (55\text{-}2)$$

The second estimate of the merging point in SDR domain can be reversely mapped to equivalent HDR merging point values, which represent a second, more accurate estimate of the merging points in the HDR range, $v_l^{m,2}$ and $v_h^{m,2}$, as follows:

$$v_l^{m,2} = \max\{i | \tilde{T}^F(i) \leq s_l^{m,2}\} \quad (56\text{-}1)$$

$$v_h^{m,2} = \min\{i | \tilde{T}^F(i) \geq s_h^{m,2}\} \quad (56\text{-}2)$$

Low and high intensity portions of the differential CDF curve can be replaced by corresponding low and high intensity portions of the range restricted differential DM curve to avoid or preventing clipping.

Trim correction can be implemented for the differential FLUT curve at entry/index values located in the low intensity portion below the mid point or mid range as follows:

$$\tilde{t}_{corr}^F(i) = \tilde{t}_{scaled}^{DM}(i) \text{ for } i \in [v_{min}^Y+1, v_l^{m,2}] \quad (57\text{-}1)$$

where, $$\tilde{t}_{scaled}^{DM}(i) = \tilde{t}_{rr}^{DM}(i) \times \frac{\sum_{i=v_{min}^Y+1}^{v_l^{m,2}} \tilde{t}^F(i)}{\sum_{i=v_{min}^Y+1}^{v_l^{m,2}} \tilde{t}_{rr}^{DM}(i)} \quad (57\text{-}2)$$

Trim correction can be implemented for the differential FLUT curve at entry/index values located in the high intensity portion above the mid point or mid range as follows:

$$\tilde{t}_{corr}^F(i) = \tilde{t}_{scaled}^{DM}(i) \text{ for } i \in [v_h^{m,2}+1, v_{max}^Y] \quad (58\text{-}1)$$

where, $$\tilde{t}_{scaled}^{DM}(i) = \tilde{t}_{rr}^{DM}(i) \times \frac{\sum_{i=v_h^{m,2}+1}^{v_{max}^Y} \tilde{t}^F(i)}{\sum_{i=v_h^{m,2}+1}^{v_{max}^Y} \tilde{t}_{rr}^{DM}(i)} \quad (58\text{-}2)$$

No trim correction needs to be implemented for the differential FLUT curve at entry/index values not located in the low and/or high intensity portions below the mid point or mid range as follows:

$$\tilde{t}_{corr}^F(i) = \tilde{t}^F(i) \quad (59)$$

Cumulative sums of the updated or trim corrected differential CDF curve, corr, gives rise to the (e.g., final, trim corrected, etc.) luma FLUT $T^F$, as follows:

$$T^F(i) = \tilde{t}_{corr}^F(i) + T^F(i-1) \text{ for } i>0 \quad (60\text{-}1)$$

$$T^F(0) = \tilde{T}^F(0) \text{ for } i=0 \quad (60\text{-}2)$$

FIG. 3AI illustrates example DM curve and CDF curve before trim correction (on the left), example range restricted DM curve and range restricted CDF curve range (in the middle), and a trim corrected CDF curve representing an hybrid curve after merging CDF and DM curves. As shown, the SDR range of the hybrid curve is the same as SDR range of the CDF curve before trim correction.

As illustrated in the upper portion of FIG. 2J, the SDR and HDR histograms are computed, followed by CDF matching and trim correction in a primary scene. For a secondary scene, a FLUT can be copied form auxiliary data provided from Pass-1.

Chroma Statistics Collection and Chroma Forward Reshaping

For chroma, a chroma forward reshaping mapping used to generate forward reshaped chroma codewords may be represented by an MMR-based forward reshaping mapping. The MMR-based forward reshaping mapping may be defined or specified with (optimized) operational parameters such as MMR coefficients.

A three-dimensional mapping table (3DMT)—or more precisely, a dynamic 3DMT (or d3DMT), where "dynamic" means the 3DMT varies from one HDR-SDR image pair to the next—may be constructed from SDR and HDR codewords in the j-th SDR and HDR images/frames in the HDR-SDR image pair in the collection window.

Example 3DMT or d3DMT construction operations are described in the previously mentioned PCT Application Ser. No. PCT/US2019/031620. After constructing the d3DMT, chroma trim-pass correction can be performed to update or modify the d3DMT at frame level, for example as described in [1]. Additionally, optionally or alternatively, letter box color consistency handling can also be performed to update or modify the d3DMT at frame level, for example as described in the previously mentioned PCT Application Ser. No. PCT/US2019/031620.

Data constructs such as a/B matrixes can be generated at this point from the d3DMT table, as follows:

$$B_j^F = (S_j^F)^T S_j^F \quad (61\text{-}1)$$

$$a_j^{F,ch} = (S_j^F)^T v_j^{F,ch} \quad (61\text{-}2)$$

In some operational scenarios, for chroma, chroma trim correction and letter box handling are done at the frame-level and results of these operations are already incorporated or contained in a/B matrixes. The chroma trim correction can be applied in the same manner to a primary or secondary scene, except that a secondary scene may have extra images/frames as indicated in its overlapping window (or statistics collection window). Some or all information or statistics (e.g., variance, peaks, etc.) obtained from applying luma trim correction may be reused for applying chroma trim correction.

Scene-level a/B matrixes can be generated by averaging all a/B matrixes for all HDR-SDR image pairs in a scene, as follows:

$$B^F = \frac{1}{S_{k+1} - S_k} \sum_{j=S_k}^{S_{k+1}-1} B_j^F \quad (62\text{-}1)$$

$$a^{F,ch} = \frac{1}{S_{k+1} - S_k} \sum_{j=S_k}^{S_{k+1}-1} a_j^{F,ch} \quad (62\text{-}2)$$

The (optimized) MMR coefficients for the MMR-based chroma forward reshaping mapping used to generate forward reshaped (e.g., SDR, etc.) chroma codewords in a reshaped SDR image from HDR codewords in an HDR image (corresponding to or depicting the same visual semantic content as the reshaped SDR image) can be solved or generated via Gaussian elimination, as follows:

$$m^{F,ch} = (B^F)^{-1} a_{F,ch} \quad (63)$$

Base Layer Generation

Optimized forward reshaping functions/mappings generated at scene-level for primary scenes and secondary scenes as identified in the (second) list of scenes can be applied by multiple nodes of the video encoding system to HDR images in a sequence of (e.g., input, consecutive, HDR, etc.) images/frames received with an input video signal to generate corresponding forward reshaped SDR images in a sequence of (e.g., output, consecutive, SDR, etc.) forward reshaped SDR images. These reshaped SDR images (not the original SDR images in HDR-SDR image pairs used to generate forward reshaping statistics) can be encoded into (e.g., a base layer of, etc.) an output video signal. In some operational scenarios, forward reshaping parameters as generated from the (input, original, etc.) HDR-SDR image pairs can be saved or stored in a binary file of a data store. In some operational scenarios, before reshaping mappings/functions are generated, film grain noise can be added or insert into the (e.g., input, original, etc.) HDR images or luma/luminance codewords therein for the purpose of reducing or avoiding banding, false contouring, or compression induced visual artifacts.

Scene-Based Backward Reshaping

The output video signal encoded with the forward reshaped images may include or carry backward reshaping metadata (or composer metadata) to enable a recipient device of the output video signal to generate reconstructed (e.g., HDR, etc.) images, which approximate the input images that were forward reshaped into the forward reshaped images. The backward reshaping metadata may provide scene-level backward reshaping mappings/functions as well as flags/indicators to signal re-using previously transmitted scene-level backward reshaping mappings/functions.

Backward reshaping mappings/functions may be specified in the composer metadata with (e.g., optimized, etc.) operational parameters such as polynomial coefficients, MMR coefficients, etc. Optimization used to generate the operational parameters (e.g., for backward reshaping, in a backward path, etc.) can be performed at frame-level and/or scene-level in the same manner for a primary or secondary scene.

A backward reshaping statistics collection operation may be performed to collect backward reshaping statistics for (backward) luma reshaping in a scene. In some operational scenarios, a (scene-level) forward luma reshaping function may be represented by a single-channel (e.g., mapping in a single channel of three color channels/components of a color space, mapping in a luma/luminance channel, etc.) predictor, which predicts an output codeword in a single channel from an input codeword in a corresponding single channel.

In these operational scenarios, the (scene-level) forward luma reshaping function such as a first polynomial can be reverted to obtain a corresponding (scene-level) luma backward reshaping function such as a second polynomial reverted from the first polynomial. The backward luma reshaping function may be represented by a backward lookup table or BLUT (denoted as $T^B$).

Histogram(s) or histogram bins therein used to generate the BLUT may be used to store backward reshaping statistics collected from input luma (e.g., HDR, input, original, etc.) codewords and forward reshaped luma codewords generated based on the scene-based FLUT made available from the forward path (which implements forward reshaping). As illustrated in the upper portion of FIG. 2K, the BLUT may be constructed from the histogram(s) using a histogram-weighted BLUT construction method/algorithm. Example histogram-weighted BLUT construction operations are described in the previously mentioned PCT Application Ser. No. PCT/US2019/031620.

Figure 2K:
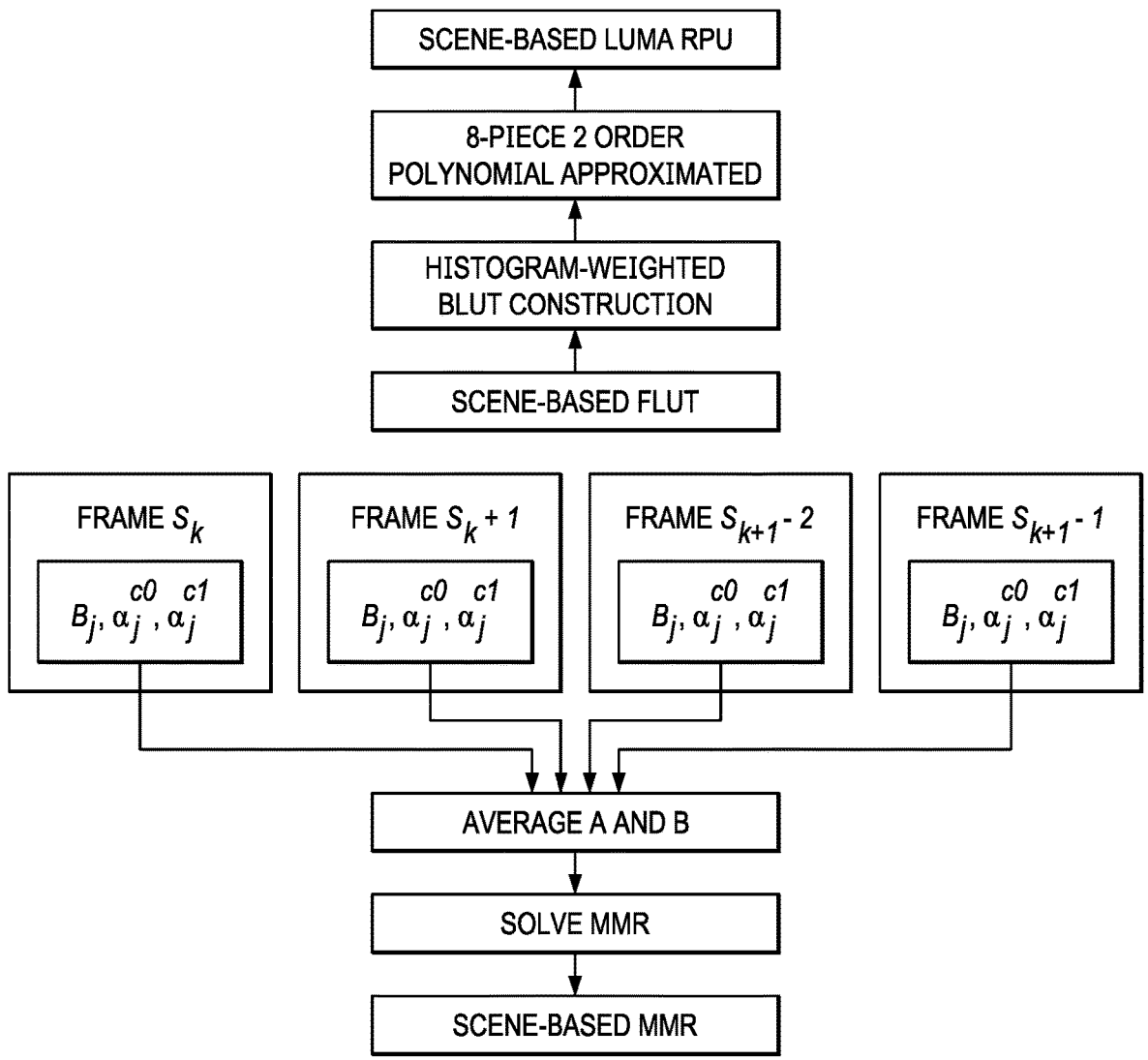

As shown in the upper portion of FIG. 2K, the BLUT may be approximated with a multi-piece polynomial such as an 8-piece second order polynomial. Polynomial coefficients specifying the multi-piece polynomial can be used (in place of the BLUT) as a scene-based backward luma reshaping function/mapping (denoted as Scene-based Luma RPU" in FIG. 2K) as a part of the composer metadata carried in the output video signal.

The recipient device of the output video signal can perform a backward reshaping operation to apply the BLUT to forward reshaped luma (e.g., SDR) codewords in each encoded (e.g., SDR, etc.) image of the scene to generate corresponding backward reshaped or reconstructed (e.g., HDR, etc.) codewords in a corresponding backward reshaped or reconstructed (e.g., HDR, etc.) image of the scene.

The backward reshaping statistics collection operation may also collect backward reshaping statistics for (backward) chroma reshaping in the scene. In some operational scenarios, a (scene-level) backward luma reshaping function may be represented by an MMR-based backward reshaping mapping with operational parameters such as MMR coefficients as follows. These operational parameters can be optimized using the collected backward reshaping statistics for (backward) chroma reshaping.

For example, based on a forward reshaped SDR image and an original HDR image from which the forward reshaped SDR image is derived, a d3DMT may be constructed in a manner similar to how a d3DMT is constructed for chroma forward reshaping. In some operational scenarios, chroma trim-pass correction may have already been performed in the forward path to ensure reversibility between the forward and backward paths. In some operational scenarios, color correction may be performed for letterbox.

Data constructs such as a/B matrices at the frame level can be computed as follows:

$$B_j^B = (S_j^B)^T S_j^B \quad (64\text{-}1)$$

$$a_j^{B,ch} = (S_j^B)^T v_j^{B,ch} \quad (64\text{-}2)$$

Scene level a/B matrices can be obtained by averaging a/B matrices of all forward reshaping images and all the input images in the scene, as follows:

$$B^B = \frac{1}{S_{k+1} - S_k} \sum_{j=S_k}^{S_{k+1}-1} B_j^B \quad (65\text{-}1)$$

$$a^{B,ch} = \frac{1}{S_{k+1} - S_k} \sum_{j=S_k}^{S_{k+1}-1} a_j^{B,ch} \quad (65\text{-}2)$$

The (optimized) MMR coefficients can be solved or generated via Gaussian elimination, as follows:

$$m^{B,ch} = (B^B)^{-1} a^{B,ch} \quad (66)$$

Then, in a decoder, a reconstructed (e.g., backward reshaped, HDR, etc.) image can be generated as follows:

$$m^{B,ch} = (B^B)^{-1} a^{B,ch} \quad (67)$$

Example Process Flows

FIG. 4A illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, a multi-node video encoding system having a plurality of video encoding nodes receives a sequence of input images in an input video signal and one or more input lists of scenes as input. The one or more input lists of scenes collectively identify a plurality of primary scenes in the sequence of input images.

In block 404, the multi-node system divides the sequence of input images into a plurality of non-overlapping segments. Each segment in the plurality of non-overlapping segments is assigned to a respective node in the plurality of video encoding nodes. The respective node receives input images within the segment as in-segment images for the segment and input images in one or two bumper sections of the segment as bumper images for the segment.

In block 406, the multi-node system uses the plurality of primary scenes identified with the one or more input lists of scenes and segment boundaries delineating neighboring segments in the plurality of non-overlapping segments to generate a second list of scenes to ensure compliance with minimum and average distance constraints. The second list of scenes identifies one or more in-segment scenes in the segment. The one or more in-segment scenes include zero or more primary scenes not on any segment boundary of the segment and one or more secondary scenes divided from one or more primary scenes on one or both segment boundaries of the segment.

In block 408, the multi-node system generates one or more scene-level forward reshaping mappings for the one or more secondary scenes. Each scene-level forward reshaping mapping of the one or more scene-level forward reshaping mappings is generated at least in part from reshaping statistics collected from input images in an overlap window determined for a respective secondary scene of the one or more secondary scenes in the segment.

In block 410, the multi-node system, or the respective node therein, encodes forward reshaped images in the segment into an output video signal encoded collectively by the plurality of video encoding nodes. The output video signal includes an image metadata portion generated by the respective node to enable a recipient device to generate reconstructed images from the forward reshaped images in the segment and to render display images derived from the reconstructed images on an image display.

In an embodiment, the video signal represents a single-layer backward compatible signal.

In an embodiment, the plurality of primary scenes identified by the one or more input lists of scenes are generated by (a) merging manually identified scene cuts in an external list (e.g., XML file, non-XML file or data, etc.) with automatically detected scene cuts by an automatic scene detector into combined scene cuts and (b) merging short scenes represented in the combined scene cuts into longer primary scenes.

In an embodiment, the multi-node system implements fixed length scene splitting that comprises: using an average distance constraint to determine a maximum allowed number of primary and secondary scenes for the segment; using an initial secondary scene length to determine a worst-case number of primary and secondary scenes for the segment; in response to determining that the worst-case number is greater than the maximum allowed number, determining a modified secondary scene length to generate the one or more secondary scenes in the segment.

In an embodiment, the multi-node system implements variable length scene splitting that comprises: (a) generating a sorted set of candidate secondary scene cuts in the segment and a violation set and a violation set identifying candidate secondary scenes, in the sorted set of candidate scene cuts, with smoothness violations; (b) splitting the candidate secondary scenes in the violation set into additional candidate secondary scenes to be updated into the sorted list of candidate secondary scene cuts; (c) updating the violation sets to include additional candidate secondary scenes, in the updated sorted list of candidate secondary scene cuts, with the smoothness violations; (d) in response to determining that one or more stopping criteria are not met, repeating (a) through (d) with the updated sorted list of candidate secondary scene cuts and the updated violation set, until at least one of the one or more stopping criteria is met.

In an embodiment, the one or more scene-level forward reshaping mappings are adjusted with one or more of: forward reshaping mapping interpolations between adjacent secondary scenes, offsets, etc.

In an embodiment, the zero or more primary scenes and the one or more secondary scenes comprise a specific scene with an overlap window; the overlap window cover multiple image pairs formed by multiple standard dynamic range (SDR) images and multiple high dynamic range (HDR) images; the multi-node system further performs: generating multiple SDR histograms from luma SDR codewords in the multiple SDR images covered by the overlap window of the specific scene; generating multiple HDR histograms from luma HDR codewords in the multiple HDR images covered by the overlap window of the specific scene; generating a scene-level SDR histogram by averaging the multiple SDR histograms and a scene-level HDR histogram by averaging the multiple HDR histograms; applying CDF matching to the scene-level SDR histogram and the scene-level HDR histogram to generate a CDF matched luma forward reshaping function; applying luma trim correction to the CDF matched luma forward reshaping function to generate a scene-level trim-corrected luma forward reshaping function for the specific scene.

In an embodiment, the zero or more primary scenes and the one or more secondary scenes comprise a specific scene with an overlap window; the overlap window cover multiple image pairs formed by multiple standard dynamic range (SDR) images and multiple high dynamic range (HDR) images; the multi-node system further performs: generating multiple frame-level three-dimensional mapping tables (3dMTs) from SDR codewords in the multiple SDR images covered by the overlap window of the specific scene and from HDR codewords in the multiple HDR images covered by the overlap window of the specific scene; applying trim correction and letterbox handling to the multiple frame-level 3dMTs to generate multiple trim-corrected 3dMTs; using the multiple trim-corrected 3dMTs to derive frame-level a/B matrixes for the multiple image pairs; generating scene-level a/B matrixes from the frame-level a/B matrixes; generating optimized multiple color channel multiple regression (MMR) coefficients by solving an optimization problem formulated with the scene-level a/B matrixes.

In an embodiment, each segment boundary of the segment serves as a scene cut for a scene in the second list of scenes.

In an embodiment, the segment comprises at least one of: a primary scene entirely inside the segment, a subscene derived from a portion of a parent scene representing a primary scene identified in the list of primary scenes, an anchor subscene adjacent to a segment boundary of the segment, a non-anchor subscene not adjacent to any segment boundary of the segment, etc.

In an embodiment, the segment is adjacent to a second segment in the plurality of segments; the second segment is assigned to a second different node in the plurality of video encoding nodes for video encoding; the segment and the second segment share a common anchor subscene overlap window formed by an anchor segment in the segment and a second anchor segment in the second segment.

In an embodiment, the sequence of input images represents a sequence of high dynamic range (HDR) images; the forward reshaped images encoded in the video signal represent standard dynamic range (SDR) images.

FIG. 4B illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 452, an image processing system decodes a sequence of forward reshaped images from a video signal. The video signal has been generated by a plurality of video encoding nodes in a multi-node video encoding system. The video signal includes image metadata generated by the plurality of video encoding nodes. The sequence of forward reshaped images includes forward reshaped images encoded into the video signal by a node in the plurality of video encoding nodes for a segment in a plurality of segments used to partition a sequence of source images.

The sequence of forward reshaped images includes a segment of forward reshaped images that was generated by a node of the multi-node video encoding system using forward reshaping functions for one or more scenes identified in a segment of pre-reshaped source images. The one or more scenes identified in the segment of pre-reshaped source images were ensured by the node to be in compliance with minimum and average distance constraints.

In block 454, the image processing system uses an image metadata portion in the image metadata to generate reconstructed images from the forward reshaped images in the segment. The image metadata portion has been generated by the node.

In block 456, the image processing system renders display images derived from the reconstructed images on an image display.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
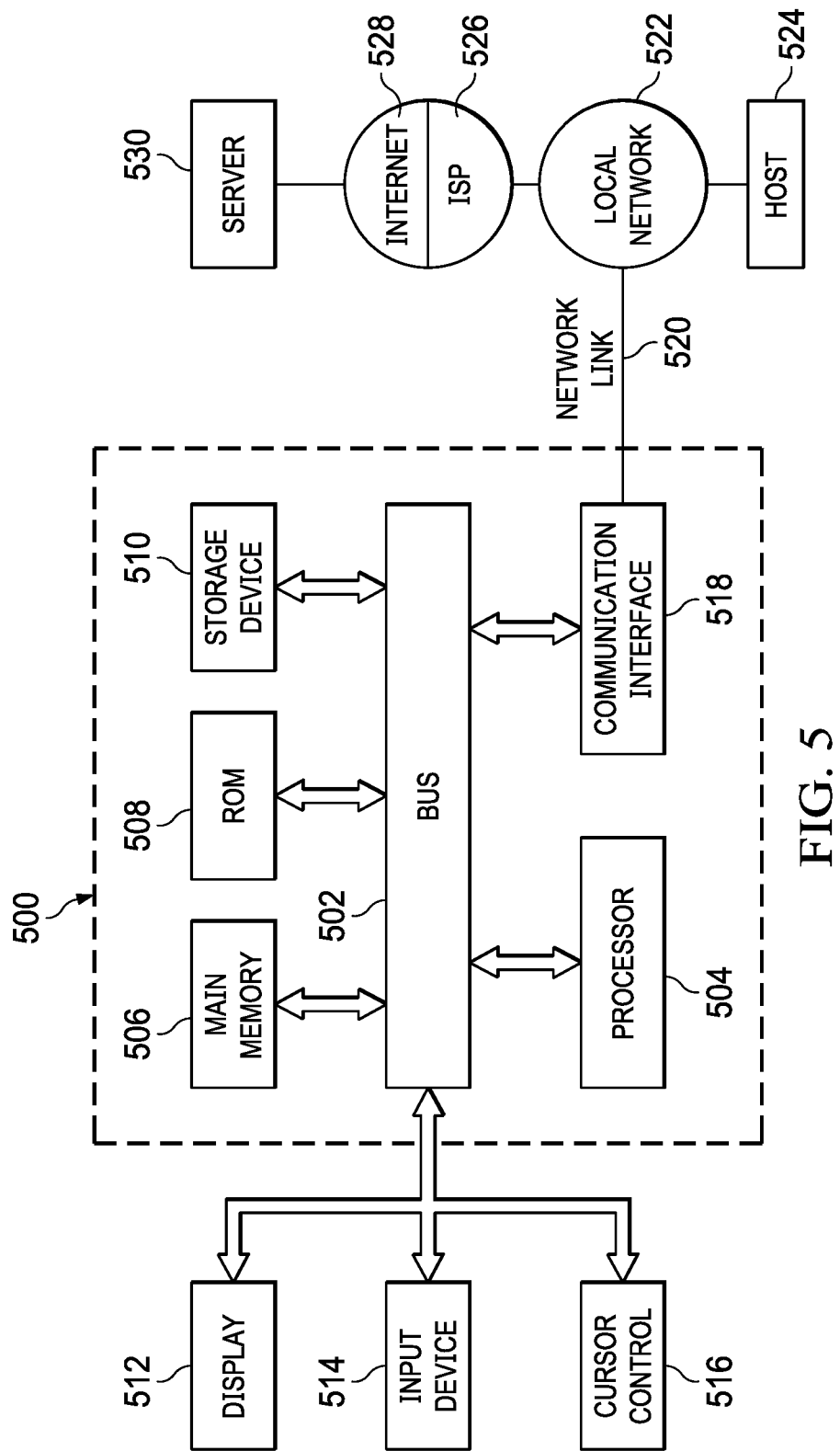
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of embodiments of the present invention.

EEE 1. A method comprising:
  receiving a sequence of input images in an input video signal and one or more input lists of scenes as input to a multi-node video encoding system having a plurality of video encoding nodes, the one or more input lists of scenes collectively identifying a plurality of primary scenes in the sequence of input images;
  dividing the sequence of input images into a plurality of non-overlapping segments, each segment in the plurality of non-overlapping segments being assigned to a respective node in the plurality of video encoding nodes, the respective node receiving input images within the segment as in-segment images for the segment and input images in one or two bumper sections of the segment as bumper images for the segment;
  using the plurality of primary scenes identified with the one or more input lists of scenes and segment boundaries delineating neighboring segments in the plurality of non-overlapping segments to generate a second list of scenes to ensure compliance with minimum and average distance constraints, the second list of scenes identifying one or more in-segment scenes in the segment, the one or more in-segment scenes including zero or more primary scenes not on any segment boundary of the segment and one or more secondary scenes divided from one or more primary scenes on one or both segment boundaries of the segment;
  generating one or more scene-level forward reshaping mappings for the one or more secondary scenes, each scene-level forward reshaping mapping of the one or more scene-level forward reshaping mappings being generated at least in part from reshaping statistics collected from input images in an overlap window determined for a respective secondary scene of the one or more secondary scenes in the segment;
  encoding, by the respective node, forward reshaped images in the segment into an output video signal encoded collectively by the plurality of video encoding nodes, the output video signal including an image metadata portion generated by the respective node to enable a recipient device to generate reconstructed images from the forward reshaped images in the segment and to render display images derived from the reconstructed images on an image display.

EEE 2. The method of EEE 1, wherein the image metadata portion includes backward reshaping parameters generated for the one or more secondary scenes; wherein the backward reshaping parameters are used by the recipient device to generate the reconstructed images at least in part by backward reshaping the forward reshaped images using the backward reshaping parameters.

EEE 3. The method of EEE 1 or 2, wherein the video signal represents a single-layer backward compatible signal.

EEE 4. The method of EEEs 1-3, wherein the plurality of primary scenes identified by the one or more input lists of scenes are generated by (a) merging manually identified scene cuts in an external list with automatically detected scene cuts by an automatic scene detector into combined scene cuts and (b) merging short scenes represented in the combined scene cuts into longer primary scenes.

EEE 5. The method of any of EEEs 1-4, wherein the method implements fixed length scene splitting that comprises:
 using an average distance constraint to determine a maximum allowed number of primary and secondary scenes for the segment;
 using an initial secondary scene length to determine a worst-case number of primary and secondary scenes for the segment;
 in response to determining that the worst-case number is greater than the maximum allowed number, determining a modified secondary scene length to generate the one or more secondary scenes in the segment.

EEE 6. The method of any of EEEs 1-5, wherein the method implements variable length scene splitting that comprises:
 (a) generating a sorted set of candidate secondary scene cuts in the segment and a violation set and a violation set identifying candidate secondary scenes, in the sorted set of candidate scene cuts, with smoothness violations;
 (b) splitting the candidate secondary scenes in the violation set into additional candidate secondary scenes to be updated into the sorted list of candidate secondary scene cuts;
 (c) updating the violation sets to include additional candidate secondary scenes, in the updated sorted list of candidate secondary scene cuts, with the smoothness violations;
 (d) in response to determining that one or more stopping criteria are not met, repeating (a) through (d) with the updated sorted list of candidate secondary scene cuts and the updated violation set, until at least one of the one or more stopping criteria is met.

EEE 7. The method of any of EEEs 1-6, wherein the one or more scene-level forward reshaping mappings are adjusted with one or more of: forward reshaping mapping interpolations between adjacent secondary scenes, or offsets.

EEE 8. The method of any of EEEs 1-7, wherein the zero or more primary scenes and the one or more secondary scenes comprise a specific scene with an overlap window; wherein the overlap window covers multiple image pairs formed by multiple standard dynamic range (SDR) images and multiple high dynamic range (HDR) images; the method further comprising:
 generating multiple SDR histograms from luma SDR codewords in the multiple SDR images covered by the overlap window of the specific scene;
 generating multiple HDR histograms from luma HDR codewords in the multiple HDR images covered by the overlap window of the specific scene;
 generating a scene-level SDR histogram by averaging the multiple SDR histograms and a scene-level HDR histogram by averaging the multiple HDR histograms;
 applying CDF matching to the scene-level SDR histogram and the scene-level HDR histogram to generate a CDF matched luma forward reshaping function;
 applying luma trim correction to the CDF matched luma forward reshaping function to generate a scene-level trim-corrected luma forward reshaping function for the specific scene.

EEE 9. The method of any of EEEs 1-8, wherein the zero or more primary scenes and the one or more secondary scenes comprise a specific scene with an overlap window; wherein the overlap window covers multiple image pairs formed by multiple standard dynamic range (SDR) images and multiple high dynamic range (HDR) images; the method further comprising:
 generating multiple sets of SDR statistics from luma SDR codewords in the multiple SDR images covered by the overlap window of the specific scene;
 generating multiple sets of HDR statistics from luma HDR codewords in the multiple HDR images covered by the overlap window of the specific scene;
 generating a set of scene-level SDR statistics by averaging the multiple sets of SDR statistics and a set of scene-level HDR statistics by averaging the multiple sets of HDR statistics;
 using the set of scene-level SDR statistics and the set of scene-level HDR statistics to generate a luma forward reshaping function;
 applying luma trim correction to the luma forward reshaping function to generate a scene-level trim-corrected luma forward reshaping function for the specific scene.

EEE 10. The method of EEE 8 or 9, further comprising:
 initializing the overlap window for the specific subscene to a length of the specific subscene;
 (a) using a sorted set of candidate secondary scene cuts and a violation set of subscenes that violate one or more smoothness criteria to determine whether the specific subscene with the overlap window still violates at least one of the smoothness criteria;
 (b) in response to determining that the specific subscene with the overlap window still violates at least one of the smoothness criteria, determining whether an adjacent image from an adjacent subscene is available to increment the overlap window;
 (c) in response to determining that an adjacent image from an adjacent subscene is available to increment the overlap window, incrementing the overlap window with the adjacent image from the adjacent subscene;
 (d) repeating (a) through (d) until either the specific subscene with the overlap window does not violate any of the smoothness criteria or an adjacent image from an adjacent subscene is not available to increment the overlap window.

EEE 11. The method of any of EEEs 1-10, further comprising:
 determining whether the segment includes one or both of a left anchor subscene and a right anchor subscene;
 in response to determining that the segment includes only a right anchor subscene, performing:
  computing a right anchor forward reshaping mapping for the right anchor subscene;
  computing a left adjacent forward reshaping mapping for a left adjacent subscene to the right anchor subscene;
  using the right anchor forward reshaping mapping for the right anchor subscene to alter the left adjacent forward reshaping mapping for the left adjacent subscene into an altered left adjacent forward reshaping mapping for the left adjacent subscene;
  using the altered left adjacent forward reshaping mapping for the left adjacent subscenes to evaluate first different current (DC) differences at one or more first subscene boundaries of the left adjacent subscene;
  adding a first offset to the altered left adjacent forward reshaping mapping to reduce the first DC differences at one or more first subscene boundaries of the left adjacent subscene;

in response to determining that the segment includes only a left anchor subscene, performing:
  computing a left anchor forward reshaping mapping for the left anchor subscene;
  computing a right adjacent forward reshaping mapping for a right adjacent subscene to the left anchor subscene;
  using the left anchor forward reshaping mapping for the left anchor subscene to alter the right adjacent forward reshaping mapping for the right adjacent subscene into an altered right adjacent forward reshaping mapping for the right adjacent subscene;
  using the altered right adjacent forward reshaping mapping for the right adjacent subscene to evaluate second DC differences at one or more second subscene boundaries of the right adjacent subscene;
  adding a second offset to the altered right adjacent forward reshaping mapping to reduce the second DC differences at one or more second subscene boundaries of the right adjacent subscene;

in response to determining that the segment includes both left and right anchor subscenes, performing:
  computing a specific anchor forward reshaping mapping for a specific anchor subscene of the left and right anchor subscenes;
  computing an adjacent forward reshaping mapping for an adjacent subscene to the specific anchor subscene;
  using the specific anchor forward reshaping mapping for the specific anchor subscene to alter the adjacent forward reshaping mapping for the adjacent subscene into an altered adjacent forward reshaping mapping for the adjacent subscene;
  using the altered adjacent forward reshaping mapping for the adjacent subscene to evaluate third DC differences at one or more third subscene boundaries of the adjacent subscene;
  adding a third offset to the altered adjacent forward reshaping mapping to reduce the third DC differences at one or more third subscene boundaries of the right adjacent subscene;
  diffusing errors computed as differences between the third DC differences and reference per-frame DC differences each of which is computed for a respective image in the adjacent subscene.

EEE 12. The method of any of EEEs 1-11, wherein the zero or more primary scenes and the one or more secondary scenes comprise a specific scene with an overlap window; wherein the overlap window covers multiple image pairs formed by multiple standard dynamic range (SDR) images and multiple high dynamic range (HDR) images; the method further comprising:
  generating multiple frame-level three-dimensional mapping tables (3dMTs) from SDR codewords in the multiple SDR images covered by the overlap window of the specific scene and from HDR codewords in the multiple HDR images covered by the overlap window of the specific scene;
  applying trim correction and letterbox handling to the multiple frame-level 3dMTs to generate multiple trim-corrected 3dMTs;
  using the multiple trim-corrected 3dMTs to derive frame-level a/B matrixes for the multiple image pairs;
  generating scene-level a/B matrixes from the frame-level a/B matrixes;
  generating optimized multiple color channel multiple regression (MMR) coefficients by solving an optimization problem formulated with the scene-level a/B matrixes.

EEE 13. The method of any of EEEs 1-12, wherein the zero or more primary scenes and the one or more secondary scenes comprise a specific scene with an overlap window; wherein the overlap window covers multiple image pairs formed by multiple standard dynamic range (SDR) images and multiple high dynamic range (HDR) images; the method further comprising:
  generating multiple frame-level mapping tables from SDR codewords in the multiple SDR images covered by the overlap window of the specific scene and from HDR codewords in the multiple HDR images covered by the overlap window of the specific scene;
  applying trim correction and letterbox handling to the multiple frame-level mapping tables to generate multiple trim-corrected frame-level mapping tables;
  using the multiple trim-corrected frame-level mapping tables to derive frame-level a/B matrixes for the multiple image pairs;
  generating scene-level a/B matrixes from the frame-level a/B matrixes;
  generating optimized multiple color channel multiple regression (MMR) coefficients by solving an optimization problem formulated with the scene-level a/B matrixes.

EEE 14. The method of any of EEEs 1-13, wherein each segment boundary of the segment serves as a scene cut for a scene in the second list of scenes.

EEE 15. The method of any of EEEs 1-14, wherein the segment comprises at least one of: a primary scene entirely inside the segment, a subscene derived from a portion of a parent scene representing a primary scene identified in the list of primary scenes, an anchor subscene adjacent to a segment boundary of the segment, or a non-anchor subscene not adjacent to any segment boundary of the segment.

EEE 16. The method of any of EEEs 1-15, wherein the segment is adjacent to a second segment in the plurality of segments; wherein the second segment is assigned to a second different node in the plurality of video encoding nodes for video encoding; wherein the segment and the second segment share a common anchor subscene overlap window formed by an anchor segment in the segment and a second anchor segment in the second segment.

EEE 17. The method of any of EEEs 1-16, wherein the sequence of input images represents a sequence of high dynamic range (HDR) images; wherein the forward reshaped images encoded in the video signal represent standard dynamic range (SDR) images.

EEE 18. The method of any of EEEs 1-17, further comprising:
  partitioning the segment into one or more sub-segments;
  determining whether each sub-segment in the one or more sub-segments represents one of: (a) preceding a bumper section of the segment, (b) overlapping with a trailing bumper section of a previous segment, (c) not overlapping with any of the previous segment and a subsequent segment; (d) overlapping with a leading bumper section of the subsequent segment, or (e) a trailing bumper section of the segment;
  in response to determining the sub-segment represents a bumper section of the segment, merging short scenes in the sub-segment from right to left;

in response to determining the sub-segment overlaps with a trailing bumper section of the previous segment, merging short scenes in the sub-segment from left to right;

in response to determining the sub-segment does not overlap with any of the previous segment and the subsequent segment, merging short scenes in the sub-segment from one of left or right to the other of left or right;

in response to determining the sub-segment does not overlap with a leading bumper section of the subsequent segment, merging short scenes in the sub-segment from right to left;

in response to determining the sub-segment represents a trailing bumper section of the segment, merging short scenes in the sub-segment from left to right.

EEE 19. A method comprising:

decoding a sequence of forward reshaped images from a video signal, the video signal having been generated by a plurality of video encoding nodes in a multi-node video encoding system, the video signal including image metadata generated by the plurality of video encoding nodes, the sequence of forward reshaped images including forward reshaped images encoded into the video signal by a node in the plurality of video encoding nodes for a segment in a plurality of segments used to partition a sequence of source images;

the sequence of forward reshaped images including a segment of forward reshaped images that was generated by a node of the multi-node video encoding system using forward reshaping functions for one or more scenes identified in a segment of pre-reshaped source images, the one or more scenes identified in the segment of pre-reshaped source images were ensured by the node to be in compliance with minimum and average distance constraints;

using an image metadata portion in the image metadata to generate reconstructed images from the forward reshaped images in the segment, the image metadata portion having been generated by the node;

rendering display images derived from the reconstructed images on an image display.

EEE 20. An apparatus comprising a processor and configured to perform any one of the methods recited in claims 1-19.

EEE 21. A non-transitory computer-readable storage medium having stored thereon computer-executable instruction for executing a method with one or more processors in accordance with any of the methods recited in claims 1-19.

The invention claimed is:

1. A method comprising:

receiving a sequence of input images in an input video signal and one or more input lists of scenes as input to a multi-node video encoding system having a plurality of video encoding nodes, the one or more input lists of scenes collectively identifying a plurality of primary scenes in the sequence of input images, wherein each of the plurality of primary scenes identified by the one or more input lists of scenes is generated by (a) merging manually identified scene cuts in an external list with automatically detected scene cuts by an automatic scene detector into combined scene cuts of neighboring scenes or by (b) merging neighboring scenes represented in the combined scene cuts into longer primary scenes, wherein neighboring scenes are merged until the length of the combined scene exceeds a threshold value representing a predetermined average distance to the next neighboring scene such that each combined scene fulfills an average distance constraint;

dividing the sequence of input images into a plurality of non-overlapping segments, each segment in the plurality of non-overlapping segments being assigned to a corresponding node in the plurality of video encoding nodes, the corresponding node receiving input images within the respective segment as in-segment images for the segment and input images in one or two bumper sections of the respective segment, wherein each bumper section comprises a number of images that precede before the first image of the respective segment or succeed after the last image of the respective segment;

generating a second list of scenes from the plurality of primary scenes in the sequence of input images, the second list of scenes identifying one or more of the plurality of primary scenes as in-segment scenes in the respective segment, the one or more in-segment scenes including zero or more primary scenes not on any segment boundary of the respective segment and one or more secondary scenes divided from one or more primary scenes on one or both segment boundaries of the respective segment, the secondary scenes comprising the images of the bumper section on the respective segment boundary, each secondary scene, exclusive of its bumper sections, having a length being greater than or equal to a predetermined minimum distance to the next neighboring scene, thereby each secondary scene fulfilling a minimum distance constraint, the predetermined minimum distance being smaller than the predetermined average distance, and the average length of the scenes in the second list of scenes, exclusive of their bumper sections, being greater than or equal to the predetermined average distance to the next neighboring scene, thereby the scenes in the second list of scenes fulfilling the average distance constraint;

generating a scene-level forward reshaping mapping for each scene of the second list of scenes in the respective segment, the scene-level forward reshaping mapping capable of mapping input images to corresponding forward reshaped images having a Standard Dynamic Range-SDR—that is smaller than a High Dynamic Range-HDR—of the input images, each scene-level forward reshaping mapping being generated at least in part from reshaping statistics collected from input images in an overlap window determined for a respective scene of the second list of scenes in the respective segment inclusive of its bumper sections, the reshaping statistics comprising statistics from (i) luma codewords in an SDR version of each input image in the overlap window aggregated to a scene-level SDR histogram and (ii) luma codewords in each input image in the overlap window aggregated to a scene-level HDR histogram;

applying, by the respective node, the generated scene-level forward reshaping mappings to the input images of the scenes of the second list of scenes for the respective segment exclusive of its bumper sections to generate forward reshaped images of the respective segment;

encoding, by the respective node, the forward reshaped images in the respective segment into an output video signal encoded collectively by the plurality of video encoding nodes, the output video signal including an image metadata portion generated by the respective node to enable a recipient device to generate reconstructed images from the forward reshaped images in the respective segment and to render display images derived from the reconstructed images on an image display, wherein the same image metadata portion is used for all images of an encoded scene such that the image metadata portion fulfills the minimum distance constraint and the average distance constraint.

2. The method of claim 1, wherein the image metadata portion includes backward reshaping parameters generated for the one or more secondary scenes; wherein the backward reshaping parameters are used by the recipient device to generate the reconstructed images at least in part by backward reshaping the forward reshaped images using the backward reshaping parameters.

3. The method of claim 1, wherein the output video signal represents a single-layer backward compatible video signal carrying SDR images that are optimized or color graded for SDR displays in a single signal layer.

4. The method of claim 1, wherein the method implements fixed length scene splitting of the respective scene that comprises:
   using an average distance constraint to determine a maximum allowed number of primary and secondary scenes for the segment;
   using an initial secondary scene length to determine a worst-case number of primary and secondary scenes for the segment;
   in response to determining that the worst-case number is greater than the maximum allowed number, determining a modified secondary scene length to generate the one or more secondary scenes in the segment.

5. The method of claim 1, wherein the method implements variable length scene splitting of the respective scene that comprises:
   (a) generating a sorted set of candidate secondary scene cuts in the respective segment and a violation set identifying candidate secondary scenes, in the sorted set of candidate scene cuts, with smoothness violations, the candidate secondary scene cuts sorted in ascending order according to their image position, a smoothness violation representing a DC value difference between two neighboring images that exceeds a threshold for making a scene splitting decision;
   (b) splitting the candidate secondary scenes in the violation set into additional candidate secondary scenes to be updated into the sorted set of candidate secondary scene cuts;
   (c) updating the violation sets to include additional candidate secondary scenes, in the updated sorted set of candidate secondary scene cuts, with the smoothness violations;
   (d) in response to determining that one or more stopping criteria are not met, repeating (a) through (d) with the updated sorted set of candidate secondary scene cuts and the updated violation set, until at least one of the one or more stopping criteria is met, wherein the one or more stopping criteria comprise at least one of no new splits and no violation sets.

6. The method of claim 1, wherein the one or more scene-level forward reshaping mappings are adjusted with one or more of: forward reshaping mapping interpolations between adjacent secondary scenes, or offsets.

7. The method of claim 1, wherein the respective segment comprises at least one of: a primary scene entirely inside the respective segment, a subscene derived from a portion of a parent scene representing a primary scene identified in the list of primary scenes, an anchor subscene adjacent to a segment boundary of the respective segment, or a non-anchor subscene not adjacent to any segment boundary of the respective segment, wherein an anchor subscene is one secondary scene divided from a primary scene on a segment boundary fulfilling the minimum distance constraint, the anchor subscene ensuring temporal consistency across different segments processed by different nodes.

8. The method of claim 1, wherein the respective segment is adjacent to a respective second segment in the plurality of segments; wherein the respective second segment is assigned to a second different node in the plurality of video encoding nodes for video encoding; wherein the respective segment and the respective second segment share a common anchor subscene overlap window formed by an anchor segment in the respective segment and a second anchor segment in the respective second segment.

9. A method comprising:
   decoding a sequence of forward reshaped images from a video signal, the video signal having been generated by a plurality of video encoding nodes in a multi-node video encoding system according to the method of any of claims 1-8, the video signal including image metadata generated by the plurality of video encoding nodes, the sequence of forward reshaped images including forward reshaped images encoded into the video signal by a node in the plurality of video encoding nodes for a segment in a plurality of segments used to partition a sequence of source images;
   the sequence of forward reshaped images including a segment of forward reshaped images that was generated by a node of the multi-node video encoding system using forward reshaping functions for one or more scenes identified in a segment of pre-reshaped source images, the one or more scenes identified in the segment of pre-reshaped source images were ensured by the node to be in compliance with minimum and average distance constraints;
   using an image metadata portion in the image metadata to generate reconstructed images from the forward reshaped images in the segment, the image metadata portion having been generated by the node;
   rendering display images derived from the reconstructed images on an image display.

10. An apparatus comprising a processor and configured to perform the methods recited in claim 1.

11. A non-transitory computer-readable storage medium having stored thereon computer-executable instruction for executing a method with one or more processors in accordance with the methods recited in claim 1.

* * * * *